United States Patent
Gupta et al.

(10) Patent No.: US 12,236,248 B1
(45) Date of Patent: Feb. 25, 2025

(54) TRANSPARENT MIGRATION OF RADIO-BASED APPLICATIONS

(71) Applicant: Amazon Technologies, Inc., Seattle, WA (US)

(72) Inventors: Diwakar Gupta, Seattle, WA (US); Benjamin Wojtowicz, San Francisco, CA (US); Upendra Bhalchandra Shevade, Washington, DC (US); Ximeng Simon Yang, San Francisco, CA (US); Ishwardutt Parulkar, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 583 days.

(21) Appl. No.: 17/364,788

(22) Filed: Jun. 30, 2021

(51) Int. Cl.
  *G06F 9/445* (2018.01)
  *G06F 8/65* (2018.01)

(52) U.S. Cl.
  CPC .............. *G06F 9/445* (2013.01); *G06F 8/65* (2013.01)

(58) Field of Classification Search
  CPC ..................... G06F 9/445; G06F 8/65
  See application file for complete search history.

(56) References Cited

U.S. PATENT DOCUMENTS

| | | | |
|---|---|---|---|
| 5,381,346 A * | 1/1995 | Monahan-Mitchell | H04B 1/38 455/418 |
| 8,010,673 B2 * | 8/2011 | Dea | G06F 16/10 718/1 |
| 8,539,079 B2 | 9/2013 | Thireault | |
| 9,125,047 B2 | 9/2015 | Sundaresan et al. | |
| 9,703,660 B2 | 7/2017 | Cillis et al. | |
| 9,838,268 B1 | 12/2017 | Mattson | |
| 9,876,851 B2 | 1/2018 | Chandramouli et al. | |
| 10,007,555 B1 | 6/2018 | Kuhne | |
| 10,064,242 B2 | 8/2018 | Pawar et al. | |
| 10,135,702 B2 | 11/2018 | Lahiri | |
| 10,244,507 B2 | 3/2019 | Tarlazzi et al. | |
| 10,257,105 B2 | 4/2019 | Majmundar et al. | |
| 10,355,946 B1 | 7/2019 | Dolas | |
| 10,419,550 B2 | 9/2019 | Nainar et al. | |
| 10,581,717 B2 | 3/2020 | Tejaprakash et al. | |
| 10,594,456 B2 | 3/2020 | Park et al. | |
| 10,608,734 B2 | 3/2020 | Barbieri et al. | |

(Continued)

FOREIGN PATENT DOCUMENTS

WO  2014073949 A1  5/2014

OTHER PUBLICATIONS

U.S. Appl. No. 18/146,126, filed Dec. 23, 2022, Diwakar Gupta.

(Continued)

*Primary Examiner* — Jorge A Chu Joy-Davila
(74) *Attorney, Agent, or Firm* — Robert C. Kowert; Kowert, Hood, Munyon, Rankin & Goetzel, P.C.

(57) ABSTRACT

A portion of a radio-based application (RBA) is executed at a first runtime environment (RTE) launched at a server. The first RTE includes a software program for processing messages between a pair of layers of the RBA. In response to determining that the portion of the RBA is to be executed at a second RTE, at least a subset of state information pertaining to the inter-layer messages is transferred to the second RTE without pausing the RBA. After the state information is transferred, the portion of the RBA is run at the second RTE.

20 Claims, 51 Drawing Sheets

(56) References Cited

U.S. PATENT DOCUMENTS

| | | | |
|---|---|---|---|
| 10,705,808 | B2 | 7/2020 | Chiosi et al. |
| 10,728,091 | B2 | 7/2020 | Zhao |
| 10,749,721 | B2 | 8/2020 | Fertonani et al. |
| 10,750,514 | B2 | 8/2020 | Fujinami |
| 10,817,409 | B2 | 10/2020 | Zeng et al. |
| 10,880,173 | B2 | 12/2020 | Seenappa et al. |
| 10,891,140 | B1 | 1/2021 | Levin |
| 10,944,668 | B2 | 3/2021 | Rajagopal |
| 10,959,098 | B2 | 3/2021 | Cidon et al. |
| 10,999,783 | B2 | 5/2021 | Pateromichelakis |
| 11,115,920 | B1 | 9/2021 | Seetharama |
| 11,190,413 | B1 | 11/2021 | Priya et al. |
| 11,539,582 | B1 | 12/2022 | Gupta et al. |
| 11,544,648 | B2 | 1/2023 | Kass |
| 11,552,842 | B2 | 1/2023 | Barabell |
| 11,720,425 | B1 | 8/2023 | Yang |
| 11,743,117 | B2 | 8/2023 | Gupta |
| 11,800,404 | B1 | 10/2023 | Yang |
| 11,824,943 | B1 | 11/2023 | Krasilnikov et al. |
| 11,916,999 | B1 | 2/2024 | Gupta |
| 11,937,103 | B1 | 3/2024 | Krasilnikov |
| 11,985,065 | B2 | 5/2024 | Shevade et al. |
| 2011/0231839 | A1* | 9/2011 | Bennett ............... G06F 3/0683 718/1 |
| 2012/0127151 | A1 | 5/2012 | Murakami |
| 2018/0041905 | A1* | 2/2018 | Ashrafi ............... H04W 16/10 |
| 2018/0146375 | A1 | 5/2018 | Pawar et al. |
| 2018/0176148 | A1 | 6/2018 | Ku |
| 2018/0365635 | A1 | 12/2018 | Lucrecio et al. |
| 2019/0042326 | A1 | 2/2019 | Chilikin |
| 2019/0158606 | A1 | 5/2019 | Guim Bernat et al. |
| 2019/0165906 | A1 | 5/2019 | Bala et al. |
| 2019/0190785 | A1 | 6/2019 | Power |
| 2019/0213029 | A1 | 7/2019 | Liu et al. |
| 2019/0289497 | A1 | 9/2019 | Rajagopal |
| 2019/0394826 | A1 | 11/2019 | Wang et al. |
| 2019/0372908 | A1 | 12/2019 | Featonby |
| 2019/0391855 | A1 | 12/2019 | Bernat et al. |
| 2020/0142735 | A1 | 5/2020 | Maciocco |
| 2020/0162332 | A1 | 5/2020 | Liguori |
| 2020/0204623 | A1 | 6/2020 | Einkauf |
| 2020/0245229 | A1 | 7/2020 | Horn et al. |
| 2021/0006944 | A1 | 1/2021 | Raghothaman et al. |
| 2021/0073047 | A1 | 3/2021 | Bhandaru |
| 2021/0109789 | A1 | 4/2021 | McWeeney |
| 2021/0109830 | A1* | 4/2021 | Venugopal ............... H04L 67/10 |
| 2021/0144517 | A1 | 5/2021 | Guim Bernat et al. |
| 2021/0144555 | A1 | 5/2021 | Kim et al. |
| 2021/0243770 | A1 | 8/2021 | Roessler |
| 2021/0271517 | A1 | 9/2021 | Guim Bernat |
| 2021/0279161 | A1 | 9/2021 | Tameshige |
| 2021/0320878 | A1 | 10/2021 | Young |
| 2022/0021426 | A1* | 1/2022 | Piirainen ............... H04B 7/0486 |
| 2022/0030117 | A1 | 1/2022 | Young et al. |
| 2022/0046084 | A1 | 2/2022 | Nair |
| 2022/0070734 | A1 | 3/2022 | Rajagopal |
| 2022/0107837 | A1 | 4/2022 | Youn |
| 2022/0312418 | A1* | 9/2022 | Lourdu Raja ....... H04L 27/2602 |
| 2022/0377615 | A1 | 11/2022 | Radunovic |
| 2023/0325266 | A1 | 10/2023 | Yang |
| 2023/0409362 | A1 | 12/2023 | Shevade |
| 2023/0409363 | A1 | 12/2023 | Shevade |
| 2024/0040002 | A1 | 2/2024 | Krasilnikov et al. |
| 2024/0202153 | A1 | 6/2024 | Huang |
| 2024/0202157 | A1 | 6/2024 | Paterra |
| 2024/0205680 | A1 | 6/2024 | Paterra |
| 2024/0236178 | A1 | 7/2024 | Gupta et al. |

OTHER PUBLICATIONS

U.S. Appl. No. 18/067,650, filed Dec. 16, 2022, Jiandong Huang.

U.S. Appl. No. 18/066,943, filed Dec. 15, 2022, Awaiz Ahmad Khan.

U.S. Appl. No. 18/067,654, filed Dec. 16, 2022, Frank Paterra.

U.S. Appl. No. 18/067,551, filed Dec. 16, 2022, Frank Paterra.

U.S. Appl. No. 17/326,218, filed May 20, 2021, Ximeng Simon Yang, et al.

U.S. Appl. No. 17/326,221, filed May 20, 2021, Ximeng Simon Yang, et al.

U.S. Appl. No. 17/364,779, filed Jun. 30, 2021, Diwakar Gupta, et al.

U.S. Appl. No. 17/364,789, filed Jun. 30, 2021, Diwakar Gupta, et al.

U.S. Appl. No. 17/364,791, filed Jun. 30, 2021, Diwakar Gupta, et al.

Li Xin et al: "QoS-Aware Service Selection in Geographically Distributed Clouds", 2013 22nd International Conference on Computer Communication and Networks (ICCCN), IEEE, Jul. 30, 2013, pp. 1-5 [retrieved on Sep. 27, 2013].

U.S. Appl. No. 17/807,341, filed Jun. 16, 2022, Upendra Bhalchandra Shevade et al.

U.S. Appl. No. 17/807,343, filed Jun. 16, 2022, Upendra Bhalchandra Shevade et al.

U.S. Appl. No. 17/807,344, filed Jun. 16, 2022, Upendra Bhalchandra Shevade et al.

U.S. Appl. No. 17/808,518, filed Jun. 23, 2022, Ozgur Dural.

U.S. Appl. No. 18/067,651, filed Dec. 16, 2022, Frank Paterra.

Prados-Garzon, Jonathan, et al., "Handover Implementation in a 5G SDN-based Mobile Network Architecture," 2016 IEEE 27th Annual International Symposium on Personal, Indoor, and Mobile Radio Communications (PIMRC), IEEE, 6 pages.

Ramanathan, Shunmugapriya, et al,. "Demonstration of Containerized Central Unit Live Migration in 5G Radio Access Network," 2022 IEEE 8th International Conference on Network Softwarization (NetSoft), IEEE, pp. 225-227.

Doan, Tung V., et al. "FAST: Flexible and Low-Latency State Transfer in Mobile Edge Computing," IEEE Access, Aug. 24, 2021, vol. 9, pp. 115315-115334.

U.S. Appl. No. 17/461,785, filed Aug. 30, 2021, Diwakar Gupta.

U.S. Appl. No. 17/710,571, filed Mar. 31, 2022, Manjari Asawa.

U.S. Appl. No. 17/806,684, filed Jun. 13, 2022, Benjamin Wojtowicz.

U.S. Appl. No. 17/806,685, filed Jun. 13, 2022, Benjamin Wojtowicz.

Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.

Unknown, "5G; NG-RAN; Architecture Description", Technical Specification, ETSI TS 138 401, Version 16.8.0, Release 16, Jan. 2022, pp. 1-82.

U.S. Appl. No. 17/810,319, filed Jun. 30, 2022, Julius Mueller, at al.

U.S. Appl. No. 17/809,864, filed Jun. 29, 2022, Nikolay Kirschenmann, et al.

U.S. Appl. No. 17/820,542, filed Aug. 17, 2022, Nikolay Kirschenmann, et al.

U.S. Appl. No. 17/548,391, filed Dec. 10, 2021, Ammar Latif et al.

U.S. Appl. No. 18/630,891, filed Apr. 9, 2024, Shevade, et al.

* cited by examiner

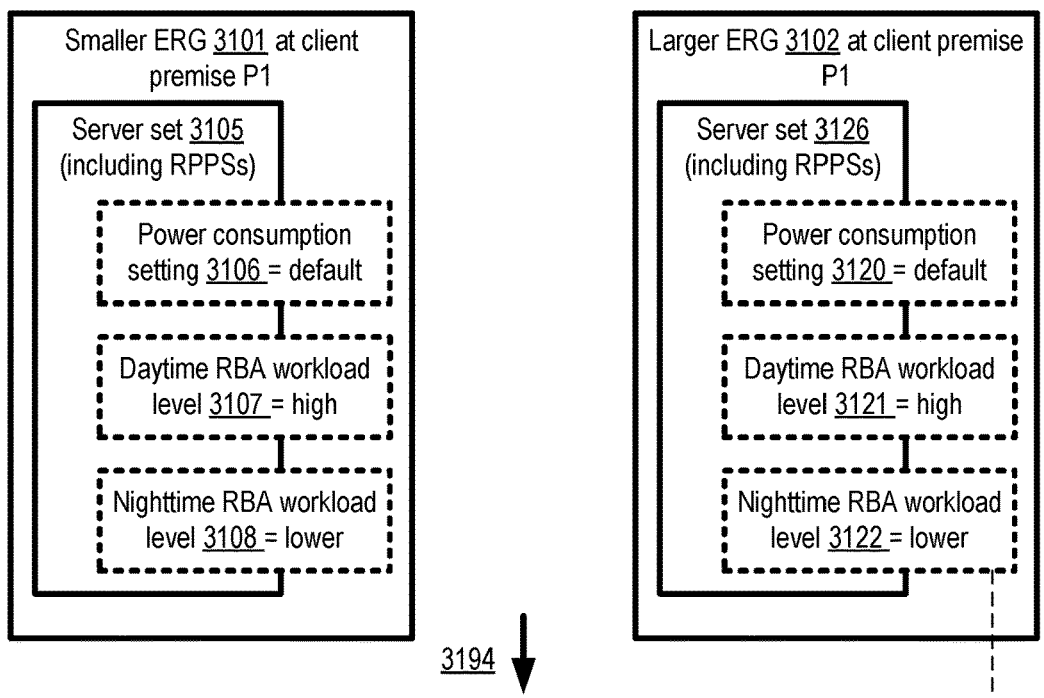
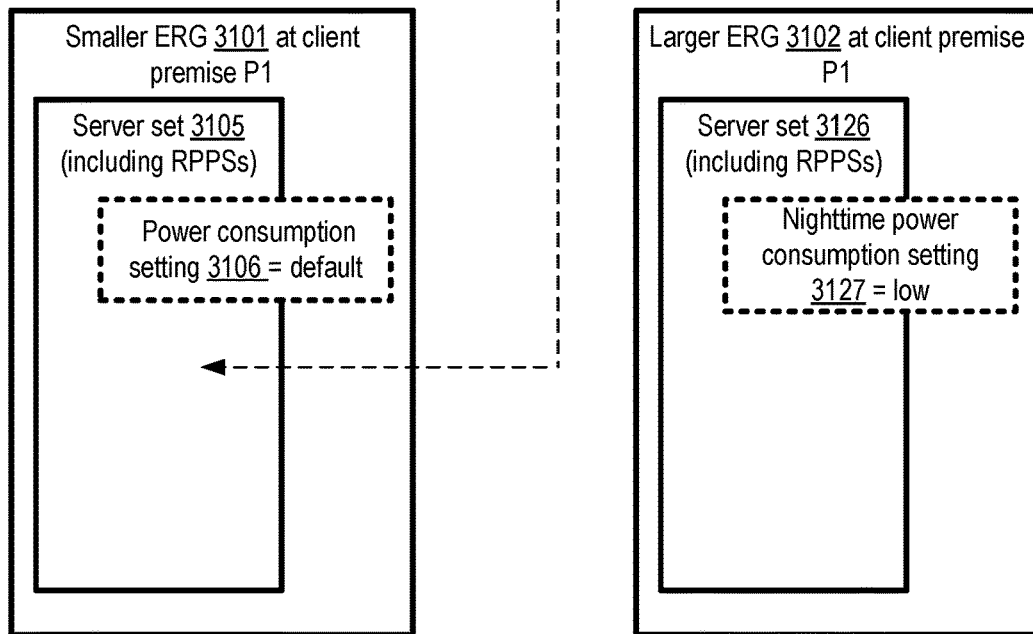
FIG. 31

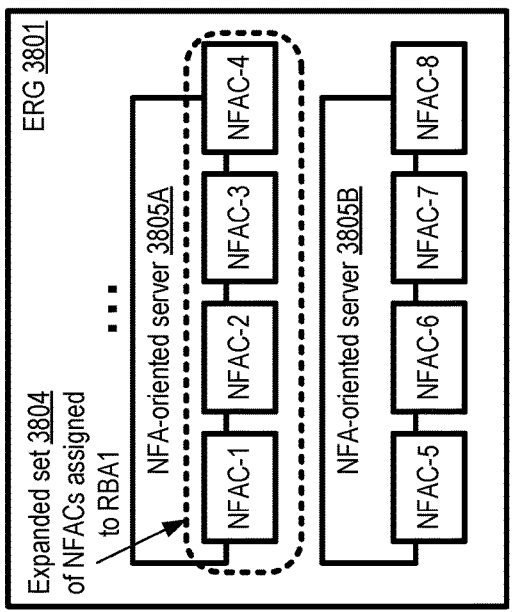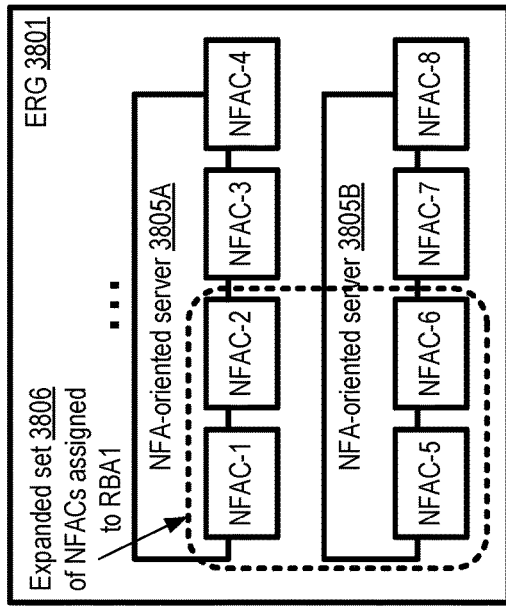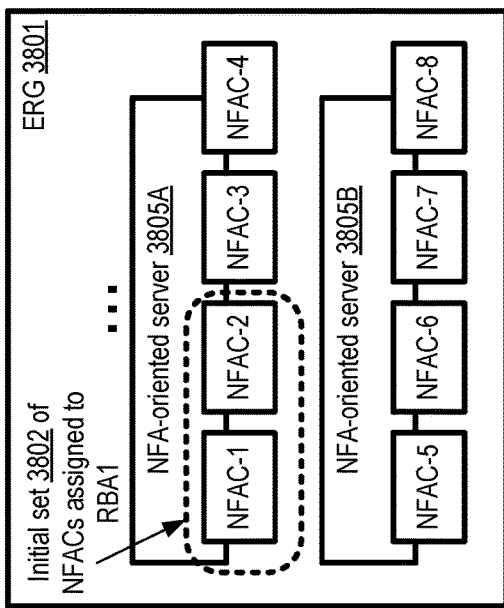
FIG. 38

Determine, at a service Svc1 of a provider network, e.g., based on anticipated workloads, a target configuration of radio-based application pipeline processing servers (RPPSs) to be installed/ utilized at one or more locations, where the RPPSs can each be used to implement portions of radio-based application pipelines efficiently on behalf of one or more clients of Svc1  5004

Cause RPPSs to be installed at selected locations as data plane extensions (extension resource groups) of Svc1; an RPPS may include one or more network function accelerators (NFAs) which run on offload cards so as to reduce load on the primary CPUs of the RPPSs  5007

Establish and verify connectivity between an RPPS and control plane servers of Svc1, located in data centers of the provider network; launch an offloading manager (OM) at the RPPS, e.g., as part of virtualization management component such as a hypervisor  5010

Establish and verify connectivity between RPPS and radio units (RUs) of radio-based application RBA1 (e.g., a client C1's application)  5013

Establish and verify connectivity between RPPS and radio units (RUs) of radio-based application RBA2 (e.g., of a different client C2, or of the same client C1)  5016

Based on a command received at Svc1 control plane, launch a compute instance CI1 at the RPPS which includes an isolated request handler IRH1 for RBA1 pipeline (e.g., at the L1-L2 interface)  5019

Based on a command received at Svc1 control plane, launch a compute instance CI2 at the RPPS which includes an isolated request handler IRH2 for RBA2  5022

When IRH1 receives a request from a different layer of the radio-based technology stack (e.g., L2 in the downlink case) than the layers implemented at the NFAs, a corresponding set of network functions is executed at one or more NFAs of the RPPS, and results are sent to the appropriate destination (e.g., client RBA1's RUs)  5025

When IRH2 receives a request from a different layer of the radio-based technology stack (e.g., L2) than the layers implemented at the NFAs, a corresponding set of network functions is executed at one or more NFAs of the RPPS, and results are sent to the appropriate destination (e.g., RBA2's RUs)  5028

FIG. 50

TRANSPARENT MIGRATION OF RADIO-BASED APPLICATIONS

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. Some 5G cells employ frequency spectrum similar to that of 4G, while other 5G cells may employ frequency spectrum in the millimeter wave band. Cells in the millimeter wave band may have a relatively small coverage area but may offer much higher throughput than 4G. As 5G technology becomes more prevalent, new types of broadband-based applications are likely to be developed and deployed.

BRIEF DESCRIPTION OF DRAWINGS

FIG. 31 illustrates an example technique for conserving electrical power at a collection of extension resource groups configured at a premise of a client of a provider network, according to at least some embodiments.

FIG. 38 illustrates example options for scaling up network function accelerator capacity for a radio-based application in a disaggregated processing environment, according to at least some embodiments.

FIG. 50 is a flow diagram illustrating aspects of operations that may be performed to configure and utilize radio-based application pipeline processing servers for multiple radio-based applications, according to at least some embodiments.

Figure 1:
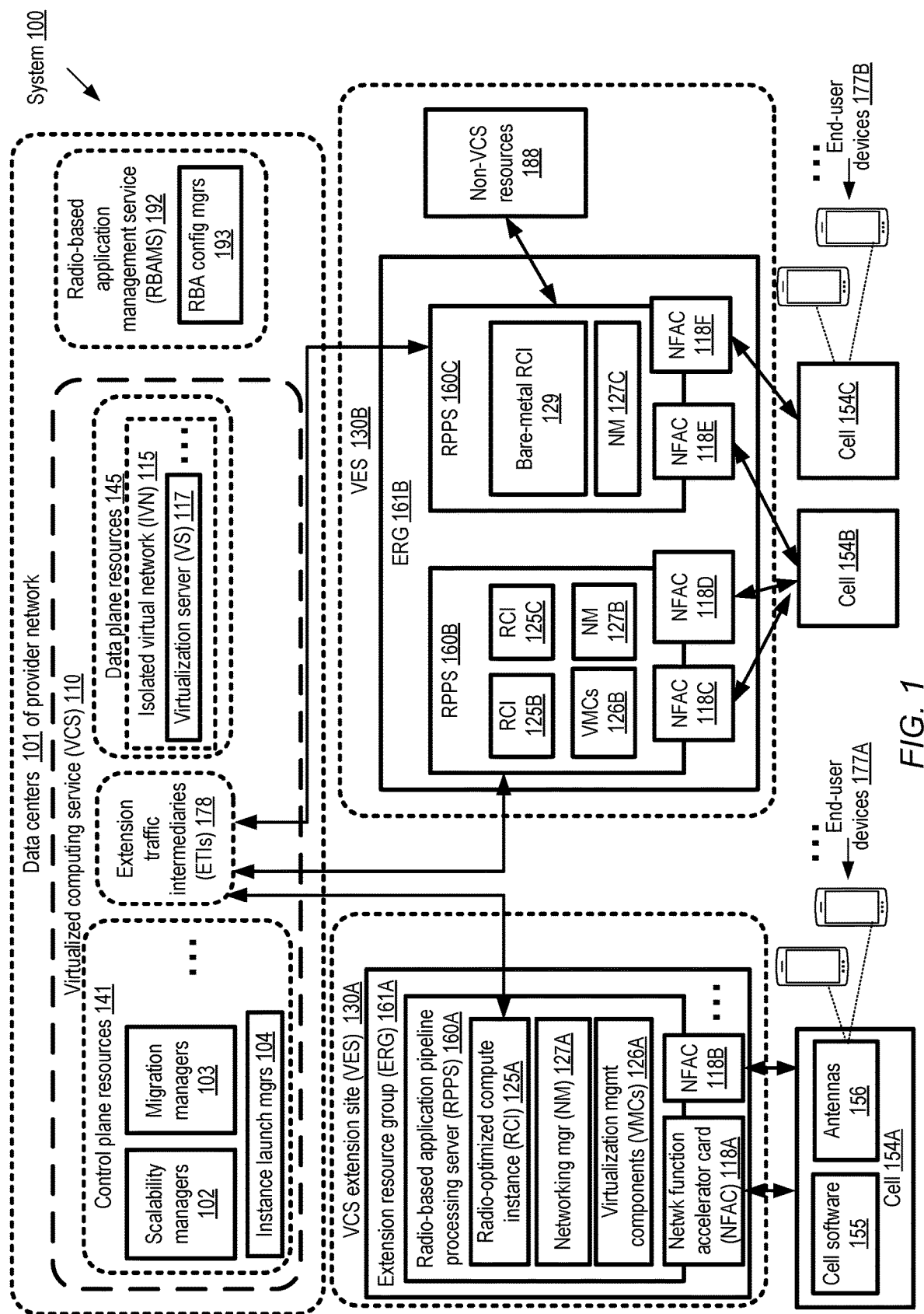
FIG. 1 illustrates an example system environment in which radio-based application pipeline processing servers may be deployed at extension sites of a virtualized computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for managing several aspects of radio-based applications implemented using extension resource groups (ERGs) of provider networks, such as intelligent distribution of IP (Internet Protocol) traffic among different hardware networking devices available at individual servers of the ERGs, transparent migration of radio-based applications between servers to facilitate software and/or hardware upgrades, capacity or scalability management for radio-based applications, as well as disaggregated processing of different subsets of radio-based application workloads using respective subsets of ERG resources. One or more ERGs can be configured at a premise external to the primary data centers of a provider network, e.g., in a location close to a set of cell towers or antennas, in response to requests from clients wishing to run radio-based applications. An ERG can include radio-based application pipeline processing servers (RPPSs) equipped with hardware accelerators cards at which network functions of one or more layers of radio-based or wireless application technology stacks such as 5G-RN (Fifth Generation New Radio) are executed. Such cards are referred to herein as network function accelerator cards (NFACs). In addition to one or more RPPSs equipped with NFACs, an ERG can also include other categories of servers of the provider network, including servers which may not be equipped with NFACs but may nevertheless be employed for a subset of the tasks performed at radio-based applications.

The RPPSs can each include several NFACs if desired, each of which in turn can be virtualized (e.g., carved into multiple logical slices for respective applications as needed) using software from a provider network operator. The NFACs offload configurable portions of the workload of radio-based applications (e.g., various types of broadband cellular applications such as private 5G networks, IoT-based applications, public 5G applications and the like) from the primary processors or CPUs of the RPPSs, thereby leaving a higher proportion of the primary processors available for other subcomponents of the applications than if the accelerated network functions were executed at the primary processors. Furthermore, the NFACs can execute at least some network functions faster, e.g., using custom chipsets designed specifically for the network functions, than may be feasible using the primary processors. RPPSs can be located at a variety of sites or premises as part of radio access networks (RANs) used for a variety of radio-based applications, e.g., in the vicinity of cell towers, IoT sensor locations and the like.

A network function is a functional building block within a network infrastructure, which has well-defined external interfaces and a well-defined functional behavior. Network functions can be chained together to form communications services. Network functions have historically been implemented as a physical network appliance or node, however network functions can be virtualized as well. The core and RAN (radio access network) network functions referenced herein can be based at least partly on the 3rd Generation Partnership Project (3GPP) specifications, European Telecommunications Standards Institute (ETSI) specifications, and/or other wireless communications standards, in some implementations. RAN network functions are used in a radio network, typically running in cell towers and performing wireless signal to IP (Internet Protocol) conversion. Core network functions typically run in large data centers performing subscriber related business logic and routing IP traffic to the internet and back. According to the present disclosure, both core and RAN network functions can additionally or alternatively be run on an edge computing device or RPPS provisioned by a cloud provider, for example an edge device provisioned to a customer to implement a private 5G network, or used by a wireless service provider or the cloud provider to create a public 5G network. The term "radio-based application" (RBA) is used herein to refer to applications in which at least some messages are transmitted using radio frequency signals and associated antennas, such as those used for various generations (4G, 5G and the like) of cellular broadband technologies. RPPSs may also be referred to as radio access network (RAN) pipeline processing servers, RAN servers, RAN application servers, or as radio-based application servers. Note that the techniques described herein are not limited to any particular generation of cellular broadband, nor are they limited to applications that utilize any particular portion of the electromagnetic spectrum for message transmissions.

An RPPS can be configured as a virtualization host of a virtualized computing service (VCS) of a provider network or cloud computing environment, and VCS compute instances (such as virtual machines or bare-metal instances) optimized for radio-based applications can be launched at an RPPS to run portions of the RBAs that are not offloaded to the NFACs, as well as other applications as desired. An RPPS is configured to run various types of virtualized RAN network functions, and can be managed from the control plane or administrative components of the VCS and/or other services of the provider network (such as a radio-based application management service), thereby providing all the benefits of cloud-based services such as automated scalability, high availability, automated metrics collection and health management, and so on. In effect, an RPPS may be utilized as an extension of the data plane of a VCS, which is specially designed for radio-based applications.

An RPPS can serve as a source or destination of several different types of IP traffic, including traffic between different layers of a radio-based technology stack being used for RBAs, traffic to and from other resources within the provider network, traffic to and from resources in client networks established at client premises, traffic to and from the public Internet, and so on. A given RPPS can be equipped with several different kinds of networking hardware devices (NHDs) that can be employed for the IP traffic, including for example default network interface cards, networking chipsets within NFACs, networking chipsets within virtualization management offloading cards, and so on. Network management logic provided by the provider network can be used to intelligently select the most appropriate NHD to be used for a given category of IP traffic of an RPPS during a given time interval, thus enabling the best use of the available IP networking resources of the RPPS to achieve quality of service targets of the applications being run at the RPPS. For example, depending on the types of RBAs being run, a different NHD can be used for front-haul traffic of the radio-based applications than is used for mid-haul traffic for at least some time periods.

Software programs (e.g., programs developed by third-party vendors) which implement part of a RBA can be run within runtime environments (RTEs) such as radio-optimized compute instances or radio-optimized software containers at an RPPS. When such a program is to be upgraded to a new version, a new RTE containing the upgraded version of the program can be launched at an ERG, and the workload of the RBA can be migrated seamlessly to the new RTE after various kinds of application state information are transferred to the new RTE. Much of the state information, including state information pertaining to traffic between layers (such as centralized units (CUs), distributed units (DUs), and radio units (RUs)) of RBAs, can be transferred without pausing the RBAs, thus ensuring that the experience of end users of the RBAs is not affected negatively by the migration and upgrade.

Several different categories of ERGs for RBAs, differing from one another for example in their respective performance capacities for different types of network functions, as well as the amount of physical space needed for the ERGs, can be supported by a provider network. A client of the provider network can request a configuration of a particular category of ERG at a premise at one point in time, and then later request that at least a portion of the RBA(s) being run at that ERG be transferred or migrated to a different category of ERG which is also configured at the same premise on the client's behalf. Such migrations can be accomplished using state information transfer techniques that do not affect ongoing end user interactions of the RBAs—that is, the migrations do not cause interruptions or disruptions to end users. RBAs can be conditionally migrated back and forth between ERGs as workload levels change, e.g., potentially enabling substantial reduction in the total amount of electrical power consumed at the premise.

RBAs can be implemented using a disaggregated processing approach at ERGs. That is, instead of using the primary processors (CPUs) and NFACs of a given server for all the network functions of the application, the primary processors of one server at an ERG can be used in combination with remote NFACs (e.g., NFACs accessed over a network link such as an Ethernet link) for the application. This approach enables substantial flexibility with respect to scaling up (or down) different portions of the RBAs. For example, if the rate at which physical layer network functions are to be executed goes up for an application, but the rate at which network functions at other layers of the radio-based technology stack does not go up as quickly, additional NFACs can be assigned for the application, without having to increase the number of primary processors assigned to the application.

A given RPPS or a given NFAC may be employed for several different RBA pipelines, e.g., on behalf of a single client of the provider network or on behalf of different clients. As a result of such multi-tenancy, the overall amount of computing resources and/or power consumed for implementation of several different RBAs can be reduced substantially. The reduction in the resources used, which can translate into lower costs, in turn enables new entrants into the radio-based application space, and the design of new types of applications.

As one skilled in the art will appreciate in light of this disclosure, certain embodiments may be capable of achieving various advantages, including some or all of the following: (a) enabling new radio-based applications to be brought online quickly and maintained using time-tested resource provisioning, scalability and availability techniques of provider networks, (b) reducing the computing, memory, storage resources and electrical power used for radio-based applications, e.g., by intelligently distributing workloads at various granularities across available resources and sharing resources among multiple applications, and/or (c) improving the user experience of administrators of radio-based applications by simplifying the management and administration of the applications using provider network tools and interfaces.

According to one embodiment, a system may comprise a server (an RPPS) which includes one or more processors configured to run virtualized radio access network (RAN) network functions, and one or more NFACs in communication with the one or more processors. The server may store instructions that upon execution on or across the one or more processors select a particular networking hardware device (NHD) of a plurality of NHDs of the server to transmit at least a portion of traffic of an RBA (referred to as mid-haul traffic) from a distributed unit (DU) of the RBA to a centralized unit (CU) of the RBA. The DU may include one or more virtualized RAN network functions executed at the processors of the server in various embodiments. The plurality of NHDs of the server may include (a) an NHD incorporated within a first NFAC of the one or more NFACs, and (b) an NHD which is not incorporated within the first NFAC (e.g., a default network interface card or NIC, or a networking hardware chipset incorporated within a virtualization management offloading card). The first portion of the mid-haul traffic may be transmitted from the server to the CU via the particular NHD. At least a portion of other traffic of the RBA, referred to as front-haul traffic, may be transmitted from the server to a radio unit (RU) of the application via an NHD incorporated within the first NFAC. In some embodiments, for at least some time periods, the same NHD (e.g., an NHD with multiple ports which can be connected to respective computing devise at which the RU or the CU is run) may be used for both the mid-haul and front-haul traffic. In other embodiments, for at least some time periods, a different NHD may be employed for front-haul traffic than the NHD used for mid-haul traffic.

In some embodiments, a computer-implemented method may comprise causing at least a portion of an RBA to be executed at a first runtime environment (RTE) launched at an RPPS of a provider network. The first RTE may, for example, comprise a compute instance or a software container. The RBA may comprise a plurality of layers including a CU layer, a DU layer and an RU layer, although operations of at least one layer may not necessarily be performed at the RTE. The first RTE may comprise a first version of a software program for processing messages between a first layer of the plurality of layers and a second layer of the plurality of layers. The RPPS may comprise a network function accelerator card at which one or more network functions of the RBA are executed in various embodiments. The RPPS may be located at a premise external to a data center of the provider network in at least some embodiments. In response to determining that the portion of the RBA is to be executed at a second runtime environment, at least a subset of state information of the portion of the RBA may be transferred from the first RTE to the second RTE without pausing the portion of the RBA being executed at the first RTE in various embodiments. The subset of state information may pertain to the messages between the first layer and the second layer of the RBA. After the subset of state information has been transferred, the portion of the RBA which was being executed at the first RTE earlier may be executed at the second RTE.

In at least one embodiment, a computer-implemented method may comprise configuring a first extension resource group (ERG) of a provider network at a premise external to the provider network in response to one or more programmatic requests from a client of the provider network. The first ERG may comprise a first set of servers including a first RPPS which includes one or more processors and a first NFAC. The processors of the first RPPS may be configured to execute a first set of virtualized RAN functions. A first set of network functions of a first RBA may be executed at the first NFAC. A second ERG of the provider network, which includes a different set of servers than the first ERG (e.g., more servers, or servers with greater performance capacity for one or more types of network functions), may be configured at the premise. A second set of network functions of the RBA may be executed at the second ERG (e.g., using a second NFAC for at least some network functions) in various embodiments, e.g., without causing interruptions to end-user interactions of the RBA.

In one embodiment, a computer-implemented method may comprise determining, at a first server of a plurality of servers of an ERG of a provider network, that a first network function of a DU of an RBA is to be executed. The plurality of servers may be located at a premise external to a data center of the provider network. A request for the first network function may be transmitted from the first server to a second server of the ERG. The first network function may be executed at an NFAC of the second server, and a result of the first network function may be transmitted to an RU of the RBA from the second server.

The radio units (RUs) to which an RPPS is connected may implement a portion of the physical layer (the lowest layer) of a technology stack used for radio-based applications, such as a protocol stack used for 5G-NR. A given RU may, for example, include software, firmware and/or hardware components co-located with one or more antennas and/or cell towers in some embodiments, which collectively implement low-level functionality including analog/digital radio frequency (A/D RF) and digital/analog radio frequency (D/A RF) transforms. In some embodiments, an NFAC of an RPPS may be linked to the primary processors of the RPPS via peripheral interfaces such as PCIe (Peripheral Component Interconnect-Express), USB (Universal Serial Bus) or the like. NFACs may be referred to as radio pipeline offloading cards (RPOCs) or radio pipeline acceleration cards (RPACs) in some embodiments.

According to some embodiments, a provider network may comprise a radio-based application management service (RBAMS) which implements programmatic interfaces pertaining to the configuration of ERGs and/or individual RPPSs. An indication of an expected geographical distribution of end-user requests (e.g., cell phone calls, text messages, IoT sensor inbound and outbound messages, etc.) of a radio-based application may be obtained at the RBMAS via such programmatic interfaces. The information about the geographical distribution may be used at the RBAMS to select or recommend one or more premises at which ERGs and/or RPPSs of more categories supported by the provider network should be configured for the client. If the client indicates an approval of the recommendations, one or more ERGs comprising one or more RPPSs may be configured on behalf of the client at such premises and assigned to the clients' applications by the RBMAS in such embodiments. The premises may include, for example, a point-of-presence site of the provider network, a local zone premise of the provider network, or a client-owned premise.

In one embodiment, a given network function accelerator card (NFAC) (or a portion of an NFAC) may be configured for exclusive use for a single client of the provider network (or a single radio-based application of a client on whose behalf multiple radio-based applications are run), e.g., in response to a single-tenancy request from the client. Multiple NFACs of a single RPPS may be employed for a single radio-based application in some embodiments. In one embodiment, NFACs may be configured as backups to other NFACs, e.g., to be used in response to detecting failures or overloads at the other NFACs.

In at least some embodiments, a variety of metrics may be collected from the NFACs and provided to clients via programmatic interfaces if desired; such metrics may include inbound or outbound message transfer counts or message transfer rates, failure rates of NFACs, utilization levels of the local processors, memory and other resources of the NFACs, and so on in different embodiments. In one embodiment, metrics (e.g., resource utilization information) from multiple NFACs at an RPPS may be collected and used to select which particular NFAC should be utilized to execute a particular network function.

As mentioned above, an RPPS may be configured at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a virtualized computing service (VCS) or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which radio-based application pipeline processing servers may be deployed at extension sites of a virtualized computing service, according to at least some embodiments. As shown, system 100 comprises resources and artifacts of a virtualized computing service (VCS) 110, distributed among data centers 101 of a provider network and VCS extension sites (VESs) 130. A radio-based application management service (RBAMS) 192, which includes a set of radio-based application (RBA) configuration managers 193, may also be implemented at least in part at the data centers 101 in the depicted embodiment. A given VES 130, at a location external to the provider network data centers, may comprise one or more extension resource groups (ERGs) 161 in the depicted embodiments, with each extension resource group in turn including one or more servers (such as RPPSs 160) at which compute instances of the VCS (such as radio-optimized compute instances 125) can be launched. For example, ERG 161A may comprise RPPS 160A at VES 130A, while ERG 161B may comprise RPPSs 160B and 160C at VES 130B. Clients of the provider network may select a ERGs of one of more categories of a family of ERG categories supported by the VCS for a given VES, and request installation/configuration of a given ERG via a single programmatic request directed to the VCS control plane in some embodiments. A given ERG may share some administrative resources among its member servers in some embodiment, such as a local agent of the VCS control plane. In at least some embodiments, the servers used for ERGs may be configured by the provider network operator with the appropriate hardware (e.g., including network function accelerator cards), software and firmware and then shipped to the VESs. In some embodiments, at least some of the servers such as RPPSs may require relatively little physical space (e.g., some RPPSs 160, supplied by the provider network operator, may only take up one rack unit (1U) or a small number of rack units in a standard data center rack).

The RBA configuration managers 193, implemented at one or more computing devices, may obtain information from provider network clients about the expected geographical distributions and workload levels of various applications (e.g., private 5G networks, IoT based applications, 5G networks open to the general public, and so on) which are to utilize a radio-based technology stack such as the 5G-NR stack. Such an application may be implemented as a pipeline of stages for processing messages in two directions—from programs implementing higher layers of the technology stack to end-user devices such as phones (referred to as the "downlink" direction), and from the end-user devices to programs implementing higher layers of the technology stack (referred to as the "uplink" direction). A given radio-based application may comprise components (e.g., respective sets of software programs and/or hardware devices) at several layers of the technology stack, including a radio unit (RU) layer, a distributed unit (DU) layer, and a centralized unit (CU) layer in various embodiments. At least a subset of these components (e.g., a portion or all of the DU layer and/or the CU layer) may be implemented at RPPSs in various embodiments.

The RBA configuration managers 193 may analyze the workload and geographical distribution information provided by a client to prepare recommendations regarding one or more VCS extension sites 130, external to the data centers 101, at which ERGs 161 comprising radio-based application pipeline processing servers (RPPSs) can be set up if approved by the client. A given RPPS may be configured in single-tenant mode (in which case only a single radio-based application, or a set of radio-based applications of a single client are run using the RPPS) or in multi-tenant mode (in which radio-based applications of multiple clients can share the RPPS, or several radio-based applications of a single client can share the RPPS), e.g., based on the preferences of the clients. RPPSs may be configured to run numerous types of virtualized RAN network functions in different embodiments, e.g., with some of the virtualized RAN network functions being implemented within the radio-optimized compute instances (RCIs) 125, while others may be implemented at virtualization management components or other components of the RPPSs. The locations of the VESs may be selected based at least in part on the geographical distribution information in the depicted embodiment, and the number and type of ERGs/RPPSs/RCIs at each VES may be determined based at least in part on the anticipated workload levels or preferences indicated by the client. Different categories of RPPSs may comprise respective combinations of one or more network function accelerator cards (NFACs) 118, and the RBA configuration managers may identify the appropriate sets of RPPSs of one or more of the categories which should be configured for the client's needs. A given NFAC may comprise one or more network function accelerators in some embodiments, as well as other components including networking hardware devices (NHDs) equivalent in functionality to network interface cards (NICs) as discussed below in further detail. Example VESs may include point-of-presence (POP) sites of the provider network, premises at which local zones of the provider network are established, cell sites which comprise antennas, client-owned premises including local data centers, co-location facilities at which equipment of several different organizations is located, and so on in different embodiments.

In at least some embodiments, an NFAC 118 may comprise an NHD (the equivalent of an embedded network interface card) which can be connected using one or more cables (e.g., fast Ethernet cables or similar cables) to an RU executing at a cell 154 used for a radio-based application, e.g., to ensure that low latency requirements of the lower layers of the radio-based technology stack can be satisfied. Such an NHD may be referred to as an NFAC-based NHD. An NFAC-based NHD may comprise multiple ports in some embodiments, each of which can be connected via a separate physical link or cable (e.g., an Ethernet cable) to another networking endpoint or device. An RPPS 160 may also include one or more other NHDs, which are not incorporated within an NFAC and hence may be referred to as non-NFAC NHDs, which can also be used for IP traffic or traffic transmitted via other protocols. For example, an RPPS may comprise one or more hardware network interface cards, or hardware network circuitry built in to virtualization management offloading cards of the kind described below in further detail. In embodiments in which the RPPSs are used for DU functions, several different types of network traffic may flow between the RPPSs and other servers/devices. In addition to the traffic between the DUs and RUs implemented at cells 154, network may also transmitted between the DUs and CUs, between an RCI at the RPPS and other data plane components of the VCS at the VCS data centers or at VCSs, between the RPPS and the VCS control plane, and between RPPSs and non-VCS resources 188 at the VESs in various embodiments. In at least some embodiments, respective networking managers (NMs) 127 may be instantiated at the RPPSs to select which particular NHDs (from among the non-NFAC NHDs and the NFAC-based NHDs) should be used for a particular category of traffic. RPPS 160A comprises NM 127A, RPPS 160B comprises NM 127B, and RPPS 160C comprises NM 127C in the depicted embodiment. In some embodiments, for example, while an NFAC-based NHD may be selected for front-haul traffic (traffic between the DU and the RU of an RBA) for at least some time period, a non-NFAC NHD may be used for mid-haul traffic of the RBA. Alternatively, in other embodiments, separate ports of an NFAC-based NHD may be used for front-haul traffic and mid-haul traffic for some time period, while other types of traffic may be transmitted using a non-NFAC NHD. A client may provide traffic distribution policies to the VCS via programmatic interfaces, indicating preferences for the types of NHDs to be used for different categories of traffic, and such policies may be implemented by NMs in conjunction with the VCS control plane.

An RCI represents one example of a runtime environment (RTE) within which software programs implementing portions or all of one or more layers of an RBA (e.g., a DU layer, or a CU layer) may be executed in various embodiments. Another example of such an RTE is a software container, which may itself be run within a compute instance. In some embodiments, one or more of the software programs may be responsible for processing messages between a pair of layers of the RBA—e.g., front-haul messages between DUs and RUs, or mid-haul messages between DUs and CUs. State information pertaining to the inter-layer message flows may be maintained by such a program in various embodiments. In at least some embodiments, the components of an RBA that were running initially at one RTE may be migrated to another RTE, e.g., because the other RTE comprises an upgraded version of software, because of an error or failure encountered at the first RTE, or for other reasons. One or more migration managers 103 of the VCS, which may be implemented using software and/or hardware at the data centers of the provider network and may also comprise migration agents installed at the RPPSs, may orchestrate the migration of RBAs from one RPPS to another in some embodiments. As part of this orchestration, at least a subset of the state information pertaining to the inter-layer messages may be transferred from a migration source RTE to a migration destination RTE (e.g., at the same RPPS or at a different RPPS) without pausing the portion of the RBA which was running at the source RTE. After all the needed state information (which may include additional state information which does not pertain to inter-layer messages, such as device state information and memory content) has been transferred, execution of the portion of the RBA may be initiated at the destination RTE in various embodiments.

In some embodiments, after a client requests the configuration of an ERG of a particular category at a VES premise, and the RPPSs of the ERG are used for the client's RBA(s) for some time (during which various network functions of the RBAs may be executed at the NFACs and/or primary processors of the RPPSs), the requirements or workload levels of the RBA may change. A different ERG (e.g., one containing more RPPSs than the initial ERG) may be configured at the same premise on behalf of the client, and the RBA may be migrated to resources of the new ERG if desired, with the network functions of the RBA being executed using NFACs and/or primary processors of the RPPSs at the new ERG. In some cases, instead of transferring state information from one RTE to another as described above, an entire RTE may be migrated from one RPPS to another with the help of the migration managers.

According to some embodiments, one or more scalability managers 102 of the VCS may model the resources available at an ERG for RBAs of VCS clients as pools of independently scalable NFACs and primary processors of the RPPSs, with the NFACs being used for executing physical layer network functions, and the primary processors being used for executing other network functions of the RBAs. Based on a client's descriptor of their RBA workload, provided by the client via a programmatic interface, a particular count of NFACs and a particular count of primary processors may initially be assigned to the RBA. The scalability manager may then select a set of servers at a given ERG that are to be used for the primary processor part of the RBA workload, and which servers should be used for the NFACs. Later, as workload levels change or if failures are encountered at the original set of resources assigned to the RBA, more NFACs may be assigned without modifying the set of primary processors assigned to the RBA, or more primary processors may be assigned without changing the set of NFACs assigned to the RBA. In some cases, any combination of several different types of servers may be installed at an ERG to facilitate such disaggregated processing-RPPSs which include NFACs and high-performance primary processors which can be used for DU functions, servers which do not include NFACs but do include high-performance primary processors, and servers which include one or more NFACs but have a one or more primary processors which are not suitable for DU functions. In various embodiments, at least some network functions of a DU may be performed at a remote server (i.e., not the server at which the determination that the DU network function needs to be performed is made). In response to a determination at a particular server of an ERG that a DU network function is to be executed for an RBA, a request for executing that DU network function may be sent to a second server in such embodiments. At the second server, the DU network function may be executed (e.g., at an NFAC of the second server), and the results of the DU network function may be transmitted to an RU of the RBA.

In response to programmatic requests from clients of the provider network, via network paths which do not include the RPPSs themselves, instance launch managers 104 of the VCS may launch one or more RCIs at the RPPSs on behalf of the clients in the depicted embodiment. For example, RCI 125A has been launched at RPPS 160A, RCI 125B and RCI 125C have been launched at RPPS 160B. In addition, RPPS 160C may comprise a bare metal radio-optimized compute instance 129, which may be granted permission to access NFACs such as NFAC 118E and 118F without the help of a hypervisor or other virtualization management components. RPPSs 160A and 160B may include a respective set of virtualization management components 126 in the depicted embodiment, such as VMCs 126A of RPPS 160A and VMCs 126B of RPPS 160B. In some embodiments, at least some networking managers 127 may be implemented as part of VMCs. Connectivity between the RPPSs and resources and services of the provider network data centers 101, including control plane resources 141 and data plane resources 145, may be managed by a set of extension traffic intermediaries 178 in conjunction with networking managers of the RPPSs in the depicted embodiment. At least some of the RPPSs 160 may be connected via local network links to resources that are not managed by the VCS control plane, such as servers owned/managed by clients or third parties. Such resources that are owned/managed by other entities may be referred to as non-VCS resources. RPPS 160C and/or other RPPSs may be linked to non-VCS resources 188 at VES 130B in the depicted embodiment, e.g., via NHDs selected by the NMs from among the set of NHDs available at the RPPSs.

The RCIs 125 may be referred to as radio-optimized in the depicted embodiment as they may comprise software designed specifically for executing pipelines of radio-based applications. For example, in some embodiments, respective request handlers may be launched within each RCI 125, which receive API requests for network functions of a radio-based application technology stack, and transmit the requests on to an offloading manager of the RPPS 160 at which the RCI is implemented. In scenarios in which multiple RCIs are run at a given RPPS (on behalf of different clients or the same client) as may be the case at RPPS 160B where RCIs 125B and 125C are run, a respective isolated request handler may thus be run on behalf of each of the respective radio-based applications run at the individual RCIs. In some embodiments, the request handlers may be implemented as privileged threads/processes within the operating system of the RCI.

In at least one embodiment, the offloading manager may comprise one or more threads/processes within a VMC 126 such as a hypervisor—e.g., VMCs 126A and 126B may each comprise an offloading manager. In a scenario in which a bare-metal RCI is used, the offloading manager may be implemented using one or more privileged threads/processes within the compute instance. In at least one embodiment, as indicated above, an RCI may also include one or more programs (e.g., user-mode or kernel mode programs) that implement higher-level functionality of a radio-based technology stack, such as at least a subset of L2 (Layer 2) or DU functionality of a 5G-NR stack, and such programs may transmit the network function requests to the request handlers via APIs. Clients may select the vendors whose programs they wish to use for stages of their radio-based application pipelines which are not processed by the network function accelerators available to the RCIs in various embodiments, and install the programs within their RCIs. In some embodiments such programs (e.g., for L2 functions of the 5G-NR stack) may be pre-installed by the VCS in an RCI, so installation of the programs may not be required from the clients. Clients may also run other applications, which are not part of a radio-based pipeline, at RCIs in various embodiments; as such, while an RCI may be optimized for radio-based application pipelines, additional applications may be run at the RCI as desired. In at least some embodiments, higher-layer components (such as CU components) may also be run at compute instances of RPPSs.

In some implementations, at least some NFACs 118 may comprise multiple network function accelerators (chipsets which can execute network functions independently of one another, and in parallel with one another if needed). A request handler may receive a request for a radio-based application task comprising one or more network functions from a programs running at an RCI, and pass on the request to the offloading manager in at least some embodiments. An offloading manager in turn may transmit a given network function request to a selected network function accelerator of a selected NFAC 118 in the depicted embodiment. At RPPS 160A, accelerators at NFAC 118A or NFAC 118B may be chosen to execute a given network function. Similarly, network functions of various client application pipelines being executed at RCIs 125B or 125C RPPS 160B may be sent to NFAC 118C or NFAC 118D, while network functions of one or more client application pipelines running at bare-metal RCI 129 may be sent to NFAC 118E or 118F. A network function for a downlink pipeline may be executed at an NFAC, and results of the execution may in at least some cases be transmitted to a radio-based application cell 154 (e.g., cell 154A, cell 154B or cell 154C). A given cell may comprise a set of radio antennas 156 and cell software 155, including for example radio units (RUs) of the physical layer of a radio-based application technology stack in the depicted embodiment.

In some embodiments, as discussed below in further detail, a multiplexer may be used as an intermediary between NFACs and RUs, so that network function results of several different applications executed at the NFACs in multi-tenant mode can be sent to the correct RUs. The antennas 156 may be used to transmit messages, generated for example at the cell software 155 based on input received from the NFAC, to an end user device such as devices 177A or 177B. End-user devices may, for example, include cell phones, tablets, laptops, IoT devices, wearable devices, augmented reality devices, virtual reality devices, game consoles, and the like. Messages sent by end-users via the devices 177 may be processed using the reverse path to that described above in various embodiments: e.g., the message contents may be obtained at the antennas, processed initially by cell software 155, sent to an NFAC 118A, and then passed on to other layers of the stack for further processing as part of the uplink path. The RPPSs and the cells may form part of a Radio Access Network (RAN), such as a 5G-RAN in the depicted embodiment. A RAN acts as an intermediary between end-user devices 177 and a network, such as the Internet, which can be used to transmit messages among different end-user devices.

The VCS 110 may comprise control plane resources 141, data plane resources 145, and extension traffic intermediaries 178 in the depicted embodiment. As indicated above, the control plane resources 141 of VCS 110 may include, among others, one or more instance launch managers 104, migration managers 103, as well as scalability managers 102. Each of these control plane resources may be implemented using one or more computing devices in various embodiments. The data plane resources may include a number of isolated virtual networks (IVNs) 115 in the depicted embodiment. An IVN 115 may comprise a set of resources that is logically isolated or separated from the rest of the resources of the VCS with respect to at least some types of networking configuration settings in various embodiments. For example, a given IVN may have one or more subnets with respective security settings, and/or a set of IP addresses, individual ones of which may be assigned to individual compute instances set up at one or more virtualization servers (VSs) 117 in some embodiments. Note that at least in one embodiment, at least some VSs 117 at provider network data centers may be used in a multi-tenant mode, so a given VS may potentially be used for compute instances set up on behalf of several different clients, with compute instances of several different IVNs potentially being instantiated on one VS.

One or more extension traffic intermediaries (ETIs) 178, implemented using one or more computing devices, which may be kept logically (and/or physically) separated from the servers and devices of the VCS control plane, may be used to transmit administrative commands from the VCS control plane to the RPPSs using secure networking channels in various embodiments. ETIs 178 may be configured, e.g., by setting properties of virtual network interfaces appropriately, so as to ensure that administrative messages cannot be directed back to the VCS control plane from the VESs via the secure networking channels in various embodiments, thus preventing administrative operations that could affect other customers from being initiated at a VES. In at least some embodiments, an individual ETI may comprise a virtual machine, with one or more virtual network interfaces attached to the virtual machine. A virtual network interface (VNI) may comprise a set of networking properties, including public and/or private IP (Internet Protocol) addresses, security settings, and the like that can be programmatically attached or associated with virtual machines in various embodiments. In at least some embodiments, the ETIs and/or the control plane servers may verify that secure network connectivity has been established between an RPPS and (a) the VCS control plane servers and (b) one or more radio units (RUs) of a radio-based application of a client, before the radio-based application can begin its normal operations.

In at least one embodiment, IVNs may be set up for internal or administrative use as well as for hosting client-requested compute instances. In some embodiments, for example, one or more of the ETIs 178 used for transmitting commands to RPPSs may be established within an IVN. A given ETI 178 may, for example, be implemented using one or more processes or execution threads within a compute instance of an IVN in some embodiments, and may be programmatically associated with at least one extension resource group comprising one or more RPPSs. In at least some embodiments, configuration settings of an ETI may be chosen such that while commands originating within the VCS control plane may be transmitted via the ETI to an RPPS, messages originating at the RPPS may not be transmitted via the ETI to the VCS control plane, e.g., based on security considerations. For example, in one embodiment security settings of a particular virtual network interface (VNI) attached to a compute instance being used as an ETI may only allow messages to be transmitted from the VCS control plane resources 141 to the ETI, and not in the reverse direction.

At a high level, in various embodiments, ERGs at VCS extension sites may be designed to provide secure data plane functionality of the VCS (e.g., the ability to instantiate compute instances identical to, or at least very similar to, those that can be set up within provider network data centers) at any location selected by a VCS customer that is capable of hosting at least a small amount of hardware equipment and has Internet connectivity. The specific set of hardware devices, associated software and firmware that are included within an ERG at a VES may meet criteria set by (and at least in some cases be pre-configured or pre-installed by) the operator of the provider network in various embodiments.

A number of techniques may be used to ensure that the quality of virtualized computing and other functionality that is provided at VESs (including aspects such as security, performance, availability, and the like) meets the standards of the VCS and the provider network in different embodiments. For example, in at least some embodiments, the RPPSs may comprise a number of hardware, software and/or firmware elements that are especially designed to enable remotely generated virtualization-related administrative commands to be executed in a safe and secure manner, without for example requiring messages to be sent back to the sources (such as control plane resources 141) from which the command were originally issued. In some embodiments, such elements may include offloaded virtualization management components (OVMCs) that include trusted platform modules (TPMs) or other security modules, tamper-resistant storage devices whose contents can only be decrypted as long as the storage devices are physically attached to a particular RPPS, a low-overhead virtualization management software stack, and so on, as discussed below in further detail. In at least some embodiments, an RPPS may comprise a VCS control plane agent that does not make outbound calls and implements an API for inbound commands that is protected using TLS (Transport Layer Security) sessions. Such an API may have strong authorization, authentication and accounting-related controls in various embodiments. In at least some embodiments, no shared secrets associated with virtualization management may be stored within an RPPS itself.

In some embodiments, a secure network channel, such as a virtual private network (VPN) tunnel or VPN connection, may be established between an RPPS 160 and resources located within the provider network data centers, and such a channel may be employed for sending commands from the VCS to the RPPS. In the embodiment depicted in FIG. 1, for example, respective one way secure network channels may be used to transmit commands originally generated at the control plane resources 141 in response to client requests (including requests to launch RCIs 125) via an ETI for eventual execution at an RPPS 160. In one embodiment, a secure channel to be used for such commands may be set up between one or more resources at an RPPS (such as a VCS connectivity manager, not shown in FIG. 1) and one or more resources within an IVN 115 of the client at whose request an RCI is to be launched at the RPPS.

In one example scenario, a client may programmatically submit a request to launch an RCI at an RPPS of a specified VES. A first version of a corresponding instance launch command may be generated at the VCS control plane resources 141 and transmitted to the appropriate ETI 178, and the ETI 178 may transmit a modified version of the command to the RPPS 160. One or more processes on the RPPS 160 may execute the command to launch the requested RCI. Similar workflows may be executed for other types of commands, such as commands to terminate an RCI, modify an RCI, and so on in various embodiments.

In some embodiments, the version of a command received at an ETI from the VCS control plane may be modified at the ETI, e.g., by removing/substituting one or more security-related tokens and the like, resulting in the transmission of a modified version of the command to the RPPS. The modified version of the command may include one or more security artifacts or objects, generated for example at the ETI, which can be authenticated at the RPPS. In at least one embodiment, respective authentication codes such as HMACs (hash-based message authentication codes) may be generated for each command at the ETI and included in the message forwarded to the RPPS, rendering it difficult to tamper with the commands.

In at least some embodiments, a given set of one or more RCIs may be configured as a logical extension of an existing IVN 115 established using at least some resources within the VCS data centers. As such, various networking configuration settings of the IVN, such as the available range of IP addresses, subnet settings, egress/ingress security rules and the like, may also be applied to the RCIs in such embodiments. In various embodiments, two-way data channels (set up for example with the help of networking managers 127 which choose the particular NHD for the channels) may be used to transmit non-administrative or data plane packets between resources within the IVNs and the RPPSs that are configured as extensions of the IVNs. Note that at least in some embodiments, the same set of physical network links and/or the same VPN tunnel or other secure connection may be used both for (a) two-way data traffic between a resource at an IVN at a provider network data center and an RCI and (b) one-way administrative command traffic between the VCS control plane and the RPPS at which the RCI is launched.

In some embodiments, RPPSs of an ERG may be pre-configured and pre-installed in such a way that very little effort may be required from VCS customers to establish connectivity and start using the RPPSs. For example, in one embodiment, as soon as an RPPS is powered up and physically connected to the Internet, a networking manager 127 may automatically start up at the RPPS and initiate connectivity with resources (such ETIs 178, gateways set up to enable VPN tunnels, etc.) at the provider network data centers. The discovery that power and/or an Internet connection is available may thus serve as a trigger signal to start up the network manager and the process of establishing connectivity with the data centers in such embodiments.

In some cases, an ERG whose RPPSs can be utilized for a client may already be set up, e.g., because other clients may also be utilizing the provider network for their own radio-based applications in the same locations, or because the same client already has one or more radio-based applications running at the same location. As such, already-installed RPPSs may be utilized for multiple applications and clients in at least some embodiments. In other cases, one or more new VESs may be established on behalf of a client in response to the geographical distribution and/or workload level information indicated by the client. For new VESs, or in scenarios in which additional RPPSs are to be configured at a pre-existing VES, the RPPS hardware may be shipped/transported to the new VES from the provider network.

Figure 2:
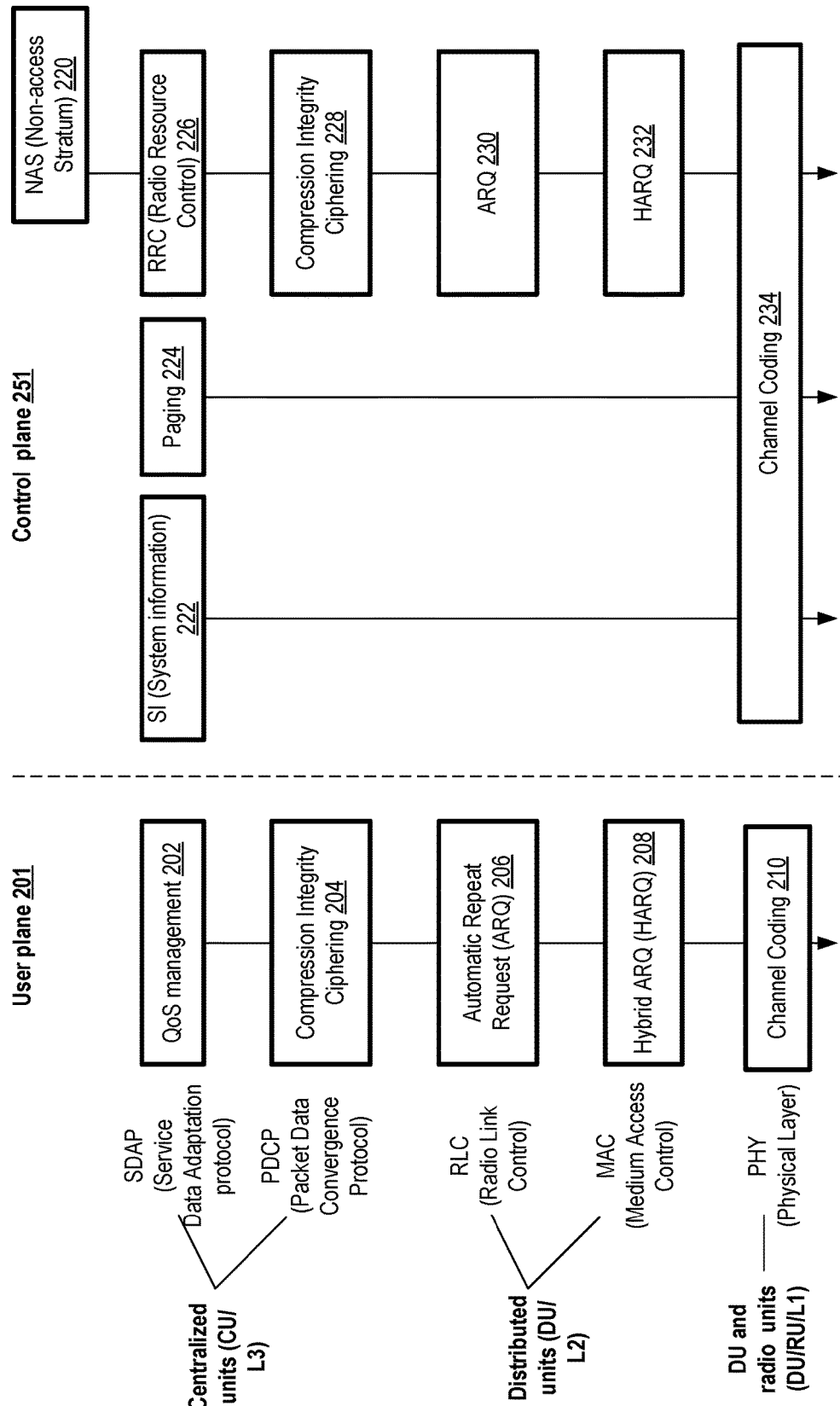
FIG. 2 illustrates an overview of user plane and control plane layers defined in accordance with a radio-based application technology standard, according to at least some embodiments.

FIG. 2 illustrates an overview of user plane and control plane layers defined in accordance with a radio-based application technology standard, according to at least some embodiments. The arrows shown in FIG. 2 represent the downlink communication path (from the higher levels of the standard, often implemented at back-end servers, downwards to the lower levels which are implemented using front-end components such as radio antennas and network function accelerators of the kind introduced above). The depicted layers conform to a 5G-NR standard published by 3GPP (Third Generation Partnership Project), a group of organizations responsible for defining protocols for mobile communications; similar layers are also defined for other generations of cellular communication technology.

In a manner somewhat analogous to the subdivision, discussed above, of a provider network functionality into control plane and data plane functionality, the operations needed for radio-based applications are divided into control plane operations and user plane operations. Control plane operations include connection configuration and other administrative tasks such as monitoring, while user plane operations involve transmission of user data using Internet Protocol (IP) packets.

The 5G-NR protocol stack comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: centralized units (CUs) for L3 operations, distributed units (DUs) used for L2 operations and optionally for some L1 operations, and radio units (RUs) used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). Operations of user plane 201 may include quality of service (QOS) Management 202 and Compression Integrity Ciphering 204 in L3, Automatic Repeat Request (ARQ) processing 206 and Hybrid ARQ (HARQ) processing 208 in L2, and Channel Coding 210 at the PHY layer. Operations of control plane 251 may include Non-access Stratum (NAS) 220 protocol tasks, System Information (SI) 222 tasks, Paging 224, Radio Resource Control (RRC) 226 and Compression Integrity Ciphering 228 in L3, ARQ 230 and HARQ 232 in L2, and Channel Coding 234 in the PHY layer. At least some of the layers and protocols shown in FIG. 2 may comprise the execution of respective sets of network functions. In at least some embodiments, a subset of the network functions corresponding to L1 and L2 may be implemented using accelerators of the kind introduced above.

Figure 3:
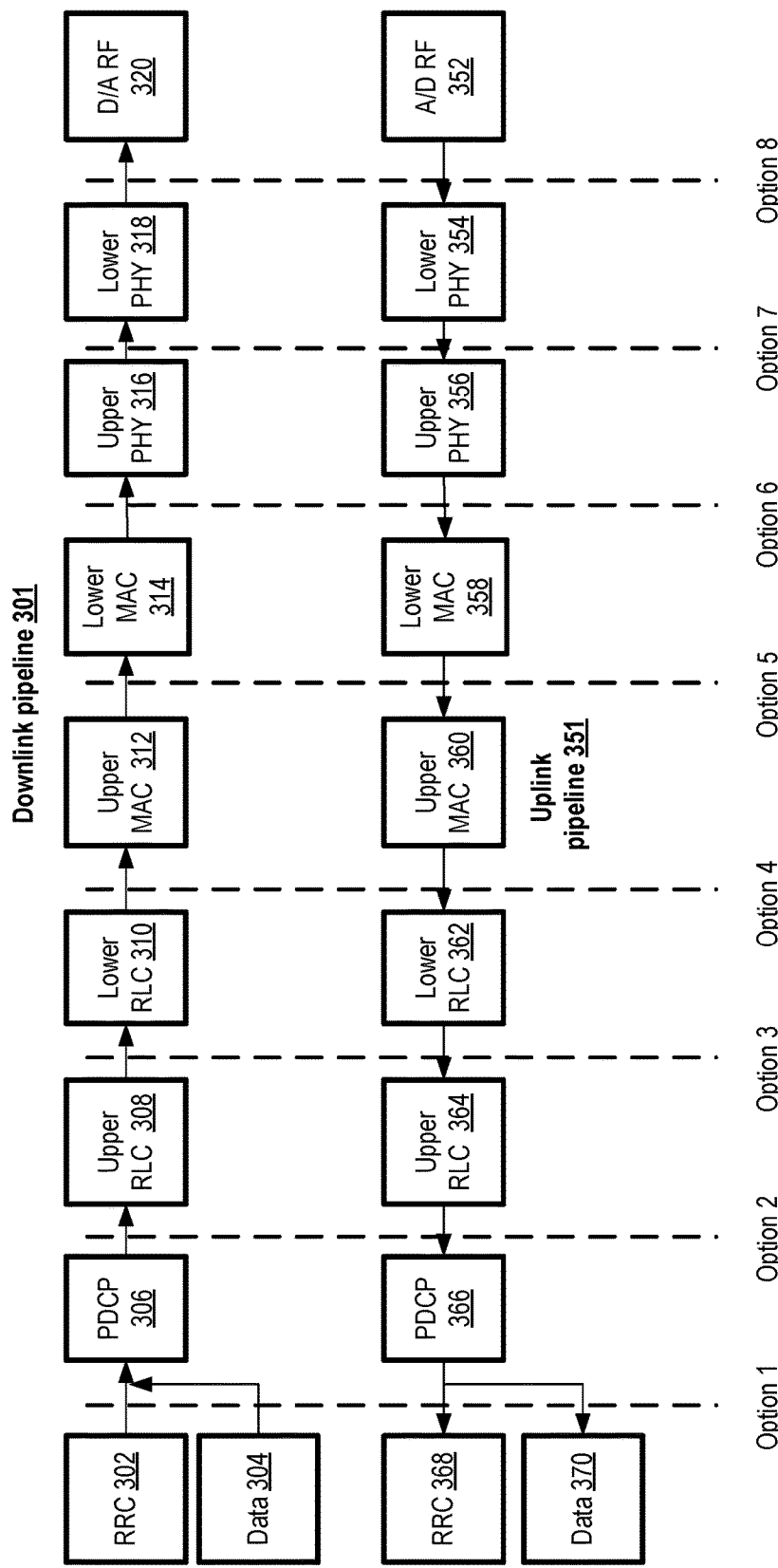
FIG. 3 illustrates example uplink and downlink pipelines of network functions for radio-based applications, according to at least some embodiments.

FIG. 3 illustrates example uplink and downlink pipelines of network functions for radio-based applications, according to at least some embodiments. Standards organizations have define several options for splitting the functions of the pipelines among the CUS (Centralized Units) and DUs (Distributed Units), which are indicated by the dashed line labeled Option 1, Option 2, . . . , Option 8 in FIG. 3. Such splits make it possible to distribute the workload for radio-based applications across several different devices, instead of relying on monolithic devices responsible for performing all the functions. Several more detailed options for splitting physical layer functionality among CUs and DUs, referred to as Options 7-1, Option 7-2 etc. as they are variations based on Option 7, are shown in FIG. 4.

The downlink pipeline 301 starts with RRC (Radio Resource Control) 302 and Data 304 and ends with digital to analog radio frequency (D/A RF) operations 320. In between, the downlink pipeline includes, in sequence, respective sets of network functions for PDCP (Packet Data Convergence Protocol) 306, Upper RLC (Radio Link Control) 308, Lower RLC 310, Upper Medium Access Control (MAC) 312, Lower MAC 314, Upper PHY (physical layer) 316, and Lower PHY 318 are executed. The uplink pipeline 351 starts with analog-to-digital radio frequency (A/D RF) operations 352, and ends with RRC 368 and Data 370. In between, network functions are executed in sequence for Lower PHY 354, Upper PHY 356, Lower MAC 358, Upper MAC 360, Lower RLC 362, Upper RLC 364, and PDCP 366. In various embodiments, at least some network functions of the Upper PHY and/or Lower PHY layers (for uplink and/or downlink) may be implemented using network function accelerators of the kind discussed above. In some embodiments, network functions of the other layers shown in FIG. 3 may also be implemented at the accelerators. In at least some embodiments, network functions of the RLC and MAC layers may be implemented using software running within radio-optimized compute instances (RCIs) of the kind shown in FIG. 1.

Figure 4:
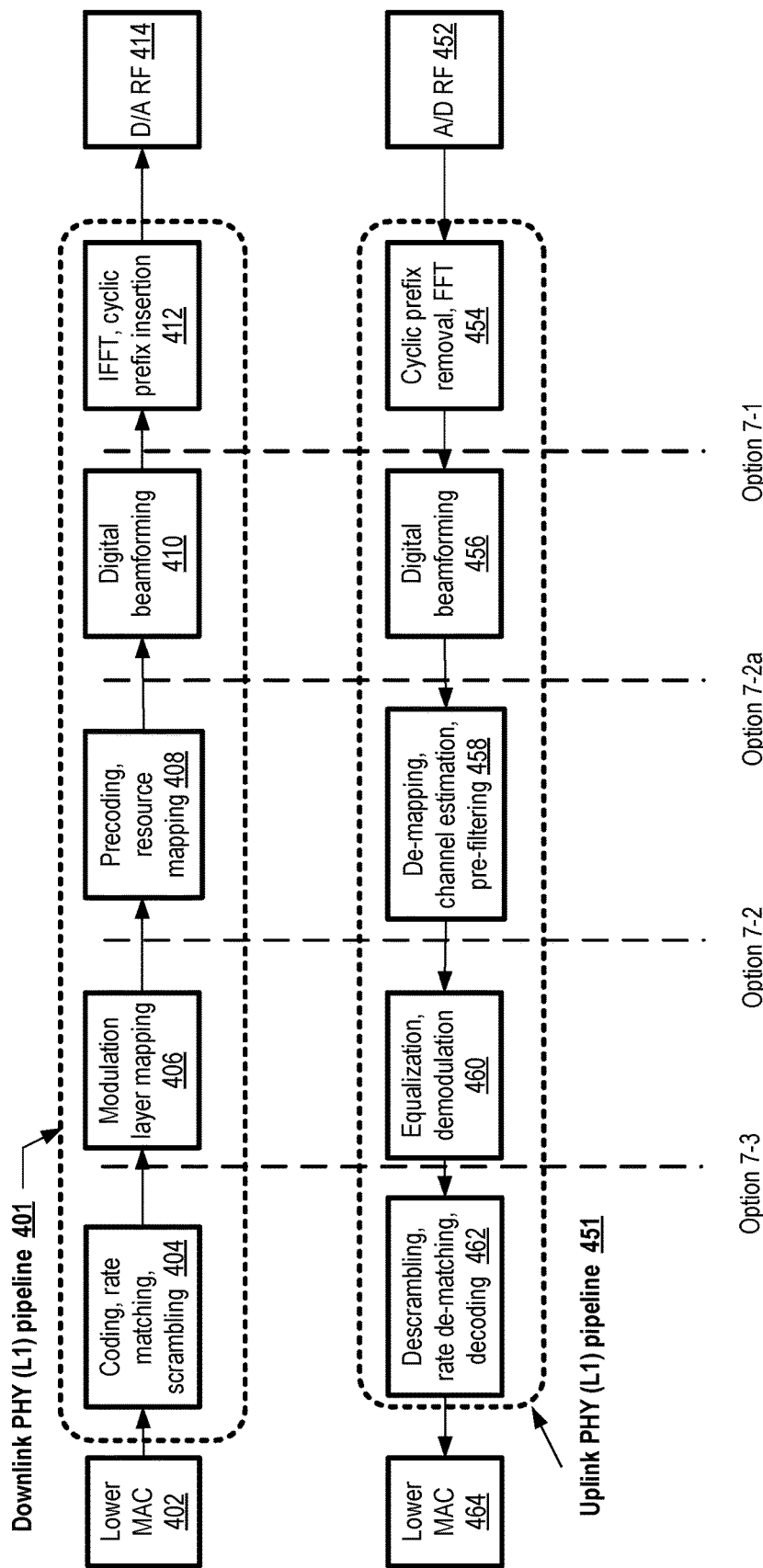
FIG. 4 illustrates example network functions which may be performed at a physical layer of a radio-based application technology stack, according to at least some embodiments.

FIG. 4 illustrates example network functions which may be performed at a physical layer of a radio-based application technology stack, according to at least some embodiments. In the downlink PHY (L1) pipeline 401, in which control and data messages are being sent from higher-layer components towards the RUs, the lower MAC stage 402 (which is part of L2) leads to a coding, rate matching and scrambling stage 404, followed by a modulation layer mapping stage 406. This is followed by a precoding and resource mapping stage 408, a digital beamforming stage 410, and an inverse Fast Fourier Transform (IFFT) and cyclic prefix insertion stage 412 before the digital to analog radio frequency (D/A RF) operations 414 are performed. In the reverse direction, when control signals and data are flowing from the radio units towards the L3 components of the pipeline, an analog-to-digital radio frequency operations (A/D RF) stage 452 is followed by cyclic prefix removal and Fast Fourier Transform (FFT) stage 454 of the uplink PHY (L1) pipeline. This is followed by another digital beamforming stage 456, a de-mapping, channel estimation and pre-filtering stage 458, an equalization and demodulation stage 460, and a descrambling, rate de-matching and decoding stage 462 before the Lower MAC stage 464 of L2 is reached.

Each of the stages in the uplink and downlink pipelines 401 and 451 may require a respective set of network functions to be executed. The split options 7-3, 7-2, 7-2a and 7-1 represent respective proposals for distributing the overall combination of network functions between "upper L1" (implemented at DUs) and "lower L1" (implemented at RUs). The stages of pipelines 401 and 451 to the left of a dashed line indicating a split option are considered part of the upper L1, while the stages to the right are considered part of the lower L1. Thus, in the 7-2 split, stages 408, 410, 412, 454, 456 and 458 may be the responsibility of the RUs, with the remaining stages being the responsibility of DUs. In various embodiments, the network function accelerators utilized at radio-based pipeline processing servers (RPPSs) may execute network functions of at least some of the pipeline stages shown in FIG. 5 using custom chipsets. For example, network functions implemented at an accelerator may include one or more of: a coding function, a rate matching function, a scrambling function, a modulation layer mapping function, a precoding function, a resource mapping function, a digital beamforming function, a Fast Fourier Transform (FFT) function, a cyclic prefix insertion function, a cyclic prefix removal function, an inverse FFT function, a de-mapping function, a channel estimation function, a pre-filtering function, an equalization function, a demodulation function, a descrambling function, a rate de-matching function, or a decoding function. In at least some embodiments, the network function accelerators may implement DU functionality. In some embodiments, at least a portion of CU functionality may be implemented at RPPSs in addition to DU functionality.

Figure 5:
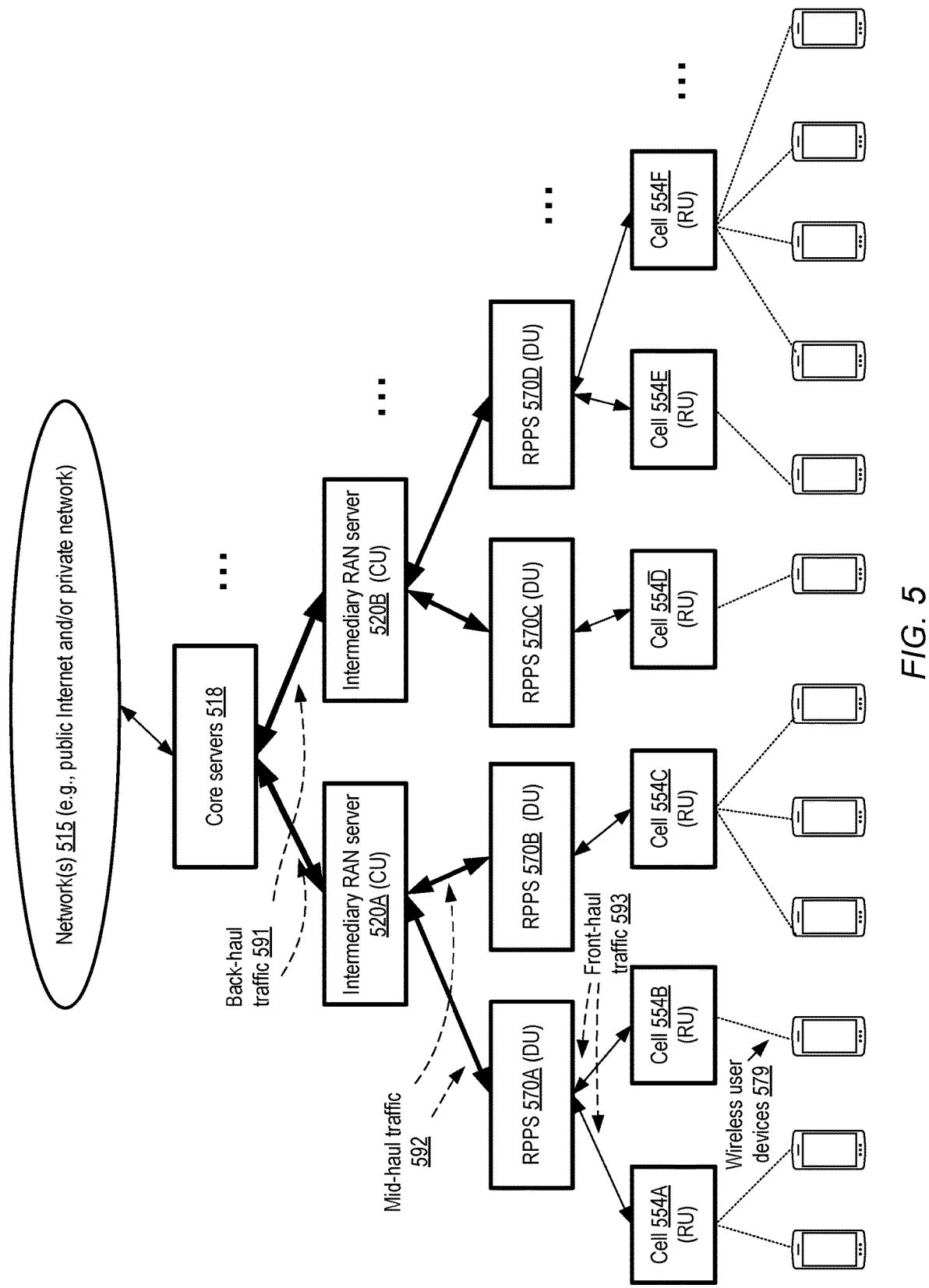
FIG. 5 illustrates an example hierarchy of devices which may be used for radio-based applications, according to at least some embodiments.

FIG. 5 illustrates an example hierarchy of devices which may be used for radio-based applications, according to at least some embodiments. In the depicted embodiment, core servers 518, linked to one or more networks 515 used to transfer the Internet Protocol packets comprising the payloads and control signals of the applications over large distances, may implement a set of back-end functions associated with radio-based applications, enabling different subnetworks of the overall system to communicate with one another. Network functions performed at the core servers (referred to as core network functions) may for example include functions to aggregate data traffic from end user devices, authenticate subscribers, apply personalized policies, and/or manage the mobility of devices prior to routing traffic to operator services or the Internet. A given core server 518 may, for example, be located at a provider network data center in one embodiment. The core server may be connected to one or more intermediary RAN servers 520, such as 520A and 520B in some embodiments, at which additional central unit (CU) functionality may be implemented. The traffic between the core servers 518 and the Intermediary RAN servers 520 may be referred to as backhaul traffic 591 in the depicted embodiment. An intermediary RAN server may, for example, be located within a premise at which one or more VCS extension sites (VESs) similar to the VESs 130 of FIG. 1 are implemented, or at a premise which is located close to such VESs.

In the embodiment depicted in FIG. 5, distributed unit (DU) functionality of the radio-based application technology stack may be implemented at RPPSs 570 (similar in functionality to RPPSs 160 of FIG. 1). Each intermediary RAN server 520 may be linked to one or more RPPSs—e.g., intermediary RAN server 520A may be connected to RPPS 570A and RPPS 570B, while intermediary RAN server 520B may be linked to RPPS 570C and RPPS 570D. The traffic between CUs and DUs may be referred to as mid-haul traffic 592 in various embodiments. Each of the RPPSs in turn may be linked, e.g., using physical network interfaces incorporated within their network function accelerator cards (NFACs), with radio units (RUs) at devices of one or more cells 554. For example, RPPS 570A may be linked to radio units at cell 554A and 554B, RPPS 570B may be linked to radio units at cell 554C, RPPS 570C may be linked to radio units at cell 554D, and RPPS 570D may be linked to radio units at cell 554E and 554F. The traffic between DUs and RUs may be referred to as front-haul traffic 593. Each of the cells may comprise one or more antennas which can be used to receive and transmit radio frequency signals from a variety of wireless user devices 579. In some embodiments in which the radio-based pipeline accelerator cards (NFACs) of the RPPSs comprise physical network interface chipsets for low-latency networking with the RUs, the physical network interface chipsets may be referred to as "front-haul accelerators" or "front-haul traffic accelerators". In some embodiments, RPPSs, intermediary RAN servers, and core servers may all be implemented at least in part using provider network resources. According to one embodiment, an RPPS may be used to run at least some core network functions (the functions run at the core servers 518). In one embodiment, at least some of the functionality of the cells 554 may also be implemented using provider network resources. In at least one embodiment, RPPSs may also be used to implement at least a subset of CU functionality.

Figure 6:
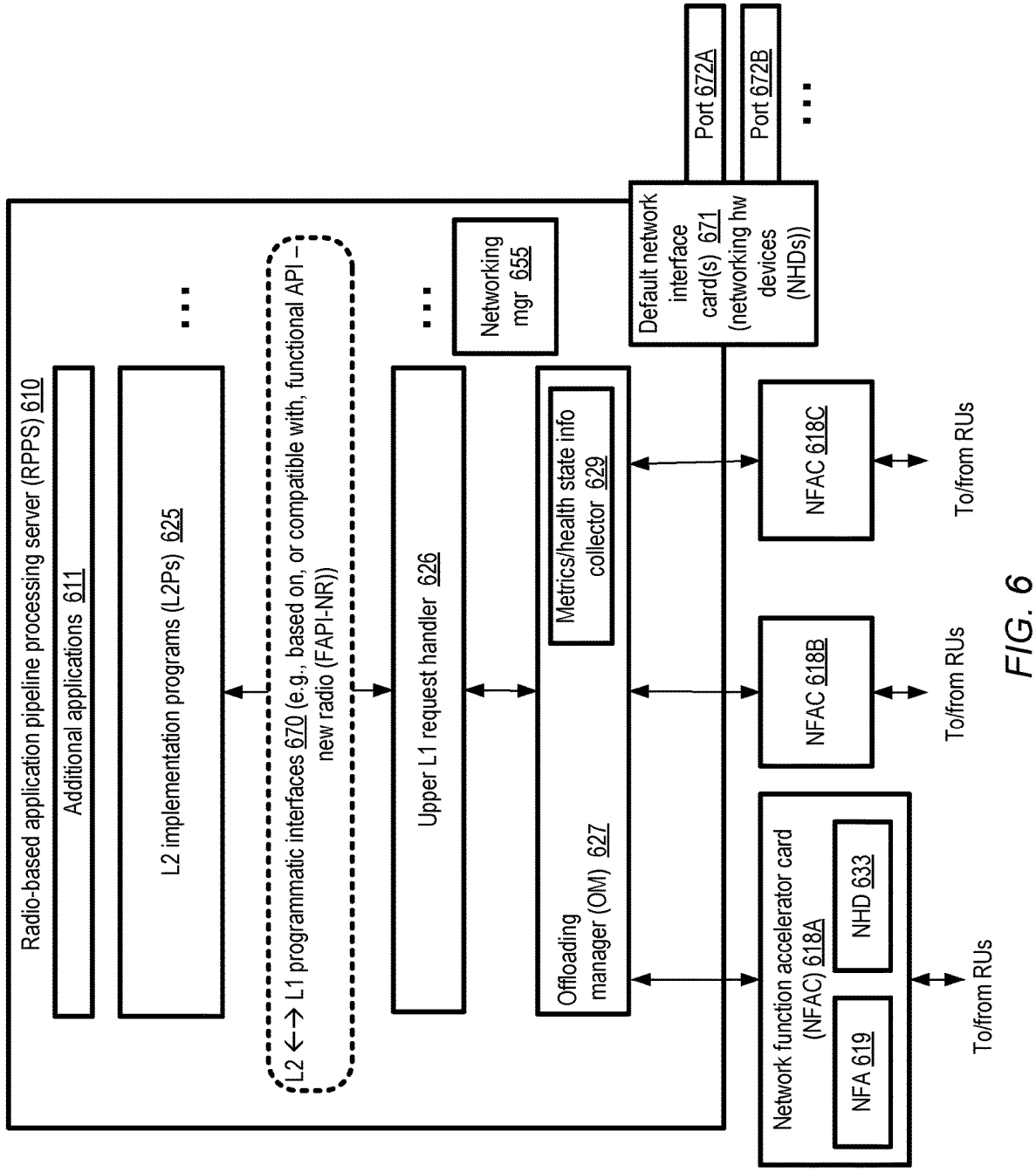
FIG. 6 illustrates example subcomponents of a radio-based application pipeline processing server, according to at least some embodiments.

FIG. 6 illustrates example subcomponents of a radio-based application pipeline processing server, according to at least some embodiments. In the depicted embodiment, a radio-based application pipeline processing server (RPPS) 610 comprises a set of programs for the L2 layer, L2Ps 625, of one or more radio-based application (RBA) pipelines. L2Ps 625 may have been developed by a third-party vendor or software provider in some embodiments, or by the provider network. In at least some embodiments, L2Ps of an RBA pipeline may be launched within a compute instance (such as a radio-optimized compute instance similar to RCI 125A of FIG. 1).

In the embodiment depicted in FIG. 6, a request handler may be launched at the RPPS for the RBA pipeline. Upper L1 request handler 626 may be used for processing/forwarding requests generated at L2Ps 625 for network functions. In embodiments in which the RPPS is being used in multi-tenant mode for multiple RBA pipelines, a respective upper L1 request handler and a set of L2Ps may be instantiated for each of the pipelines. The request handlers may be isolated from one another in respective runtime environments, e.g., as part of respective compute instances or software containers with address spaces that cannot be accessed from other execution environments. In some embodiments, a request handler 626 may comprise one or more privileged threads or processes, running within the same runtime environment as their corresponding L2Ps. Each of the request handlers 626 may comprise software developed at the provider network in the depicted embodiment, e.g., as opposed to the L2Ps which may have been developed by entities other than the provider network operator.

A request handler 626 may receive requests for upper L1 network functions from L2Ps 625 for the downlink portions of the RBA pipeline, e.g., via a set of L2←→L1 programmatic interfaces 670 designed and implemented at the provider network in some embodiments. The programmatic interfaces 670 may, for example, be based on, or compatible with a standard such as FAPI-NR (functional API-new radio) in at least some embodiments. In one embodiment, the programmatic interfaces 670 may be published or otherwise communicated by the provider network to external organizations, thus enabling vendors of L2Ps to develop code which can be used with the RPPS upper L1 request handlers. Note that the number of L2Ps and request handlers executed at a given RPPS 610 may vary, e.g., based on the number of provider network clients which wish to implement their radio-based applications in the same vicinity; for example, more than two L2Ps and corresponding request handlers may be launched at an RPPS, or a single L2P and a single request handler may be launched. In some embodiments, APIs of a different boundary layer of a radio-based technology stack (i.e., not necessarily the L2-L1 interface) may be implemented by request handlers.

An offloading manager (OM) 627 may be launched at the RPPS 610 in at least some embodiments, e.g., as part of a virtualization management component such as a hypervisor. The offloading manager 627 may act as an intermediary between the request handlers and a set of network function accelerators (NFAs) such as NFA 619 implemented at one or more network function accelerator cards (NFACs) 618 of the RPPS 610 in the depicted embodiment, e.g., in a manner somewhat analogous to the way that hypervisors and other virtualization management components at a general-purpose virtualization host or server can act as intermediaries between software and hardware components. An NFAC may be linked to the primary processors (e.g., CPUs) of an RPPS via a peripheral interconnect such as PCIe, USB or the like in at least some embodiments.

The OM may receive L1 network function requests sent from the request handler 626 for all the downlink pipelines being implemented using RPPS 610, determine the particular NFAC and/or the particular NFA which should be utilized for a given network function, and transmit the request to that NFAC/NFA for execution in the depicted embodiment. For example an NFA at NFAC 618A may be selected for one request from request handler 626, and an NFA at NFAC 618B or 618C may be selected for another request from the request handler. The results of the execution of a network function may be transmitted to one or more radio units of one or more cells from the NFAC in some embodiments. For messages flowing from the antennas towards the L2 and L3 layers of the application pipelines (uplink pipeline messages), the workflow may be reversed—the incoming messages may be transmitted to an NFAC from the RUs, one or more network functions may be executed at the NFAC, and the results may be forwarded via the OM and/or the request handlers to the L2Ps. The L2Ps may then transfer the results of L2 processing further up the stack, e.g., to L3 or CU implementation programs at other RPPSs, intermediary RAN servers and/or at core servers.

The OM may include a metrics/health state information collector 629 in at least some embodiments, which keeps track of the resource utilization levels of the NFACs (e.g., including utilization levels of on-card processors, memory and the like), failures (if any) of NFAC components, latencies for completing network function processing at NFACs, and so on. Such metrics may be used to make various configuration decisions, such as which particular NHD or NFAC should be used for a given type of network communication or network function, RBA workload migration decisions, whether a given network function should be executed locally or transmitted for remote execution to another server, and so on in different embodiments.

RPPS 610 may comprise one or more default network interface cards 671 (also referred to as networking hardware devices or NHDs) in the embodiment depicted in FIG. 6. In addition, one or more NHDs may also be implemented as part of NFACs 618, such as NHD 633 of NFAC 618A. RPPS 610 also include a networking manager 655 in the depicted embodiment, responsible for managing network connectivity with a variety of other devices/servers as discussed below in further detail. The networking manager 655 may be responsible for selecting the particular NHD (e.g., a default NIC or a NFAC-based NHD) to be used for traffic directed to a particular category of destination in various embodiments. A given NHD may comprise several different ports, such as ports 672A and 672B in the depicted embodiment, which enable connectivity to be established with several different network endpoints or networking devices such as routers/switches using that NHD.

The specific NFAC or NFA for a given request may be selected by the OM based on any combination of a variety of factors in different embodiments. For example, in some embodiments, a given L2P may be associated with at least one NFAC at the request of the client on whose behalf the L2P is run, so the NFAC selected for a given network function request may be based at least in part on the L2P from which that network function was requested. In some cases, a given NFAC may be assigned for exclusive use on behalf of a given radio-based application or a given client of the provider network. Metrics collected from the NFACs could be used to select the NFAC to which a given network function request is directed in some embodiments, e.g., the NFAC with the lowest recent resource utilization levels may be selected in preference to other NFACs.

Each of the radio-based applications whose pipelines are being executed at the RPPS may belong to one of a set of application areas with respective expectations regarding performance and other quality of service considerations in the depicted embodiment. The ITU-R (International Telecommunication Union-Radiocommunication sector) standards organization has defined at least three such application areas for 5G cellular communication: enhanced mobile broadband (eMBB), massive machine-type communications (mMTC), ultra-reliable and Low Latency Communications (URLLC). An NFAC (or an NFA within an NFAC) may be selected for at least some of the network functions of an application by the OM based on the application area to which the application belongs in some embodiments.

The RPPS may also be used for one or more additional applications 611 on behalf of one or more clients, such as applications that do not require the execution of L1 and L2 network functions. As a result of offloading at least some of the L1 network function workload to NFACs, more of the primary processors (CPUs, GPUs etc.) of the RPPS may become available for such additional applications in various embodiments.

In various embodiments, RPPSs similar to RPPS 610 may provide an implementation of Open Radio Access Network (O-RAN), a disaggregated approach to deploying mobile front-haul and mid-haul networks built on cloud native principles. O-RAN is an evolution of the Next Generation RAN (NG-RAN) architecture, first introduced by the 3GPP. Organizations such as the O-RAN Alliance have developed standards for O-RAN, and the RPPSs may be designed to comply with such standards in at least some embodiments.

Figure 7:
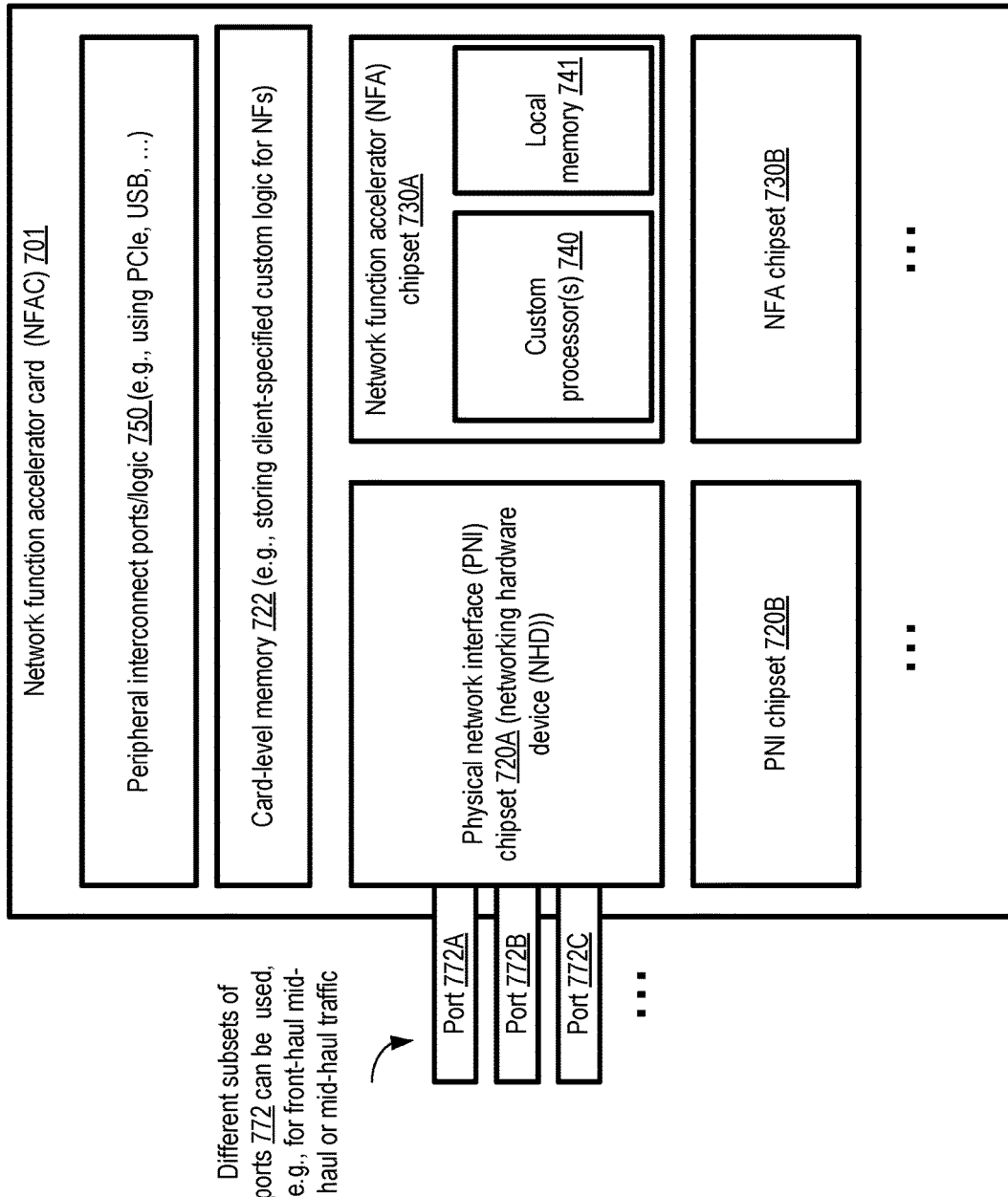
FIG. 7 illustrates example elements of a network function accelerator card which may be employed at a radio-based application pipeline processing server, according to at least some embodiments.

FIG. 7 illustrates example elements of a network function accelerator card which may be employed at a radio-based application pipeline processing server, according to at least some embodiments. As shown, NFAC 701 may comprise peripheral interconnect ports/logic 750, card-level memory 722, one or more physical network interface chipsets 720, and one or more network function accelerator chipsets 730 in the depicted embodiment. The peripheral interconnect ports and logic may be utilized to connect the NFAC to the primary processors of the RPPS in various embodiments. Any of a variety of peripheral interconnects, such as PCIe, USB, or custom interconnects developed by the provider network operator or third parties may be used in different embodiments.

PNI chipsets 720A or 720B may each include components similar in functionality to a network interface card (NIC) of general purpose computing devices in at least some embodiments, and may thus represent one of the networking hardware devices (NHDs) available at an RPPS for IP communications (or communications using other networking protocols). The PNI chipsets 720 may be used for low-latency real-time communications over physical links with the RUs (and/or other components of the cells) of the radio-based applications in the depicted embodiment, and may also be used for communications with CUs at other servers in some embodiments. In the embodiment depicted in FIG. 7, a given PNI chipset 720 may comprise multiple hardware ports such as ports 772A, 772B and 772C. Different subsets of the ports 772 may be utilized for respective types of network traffic of an RPPS—e.g., some ports may be used for front-haul traffic, others for mid-haul traffic, and so on. In some embodiments, the physical links attached to the ports for network connectivity may for example include Ethernet cables. In at least one embodiment, the latency requirement or limit for messages between the NFAC and the RUs, satisfied using the PNI chipsets 720, may be as low as a single millisecond or even a fraction of a millisecond.

NFA chipsets 730, such as 730A or 730B may include custom processors 740 (e.g. including digital signal processors (DSPs), custom application-specific integrated circuits (ASICs), field-programmable gate arrays (FPGAs)) or the like, as well as local memories 741 in at least some embodiments, storing the instructions that may be used for the network functions. The card-level memory 722 may be shared among the NFA chipsets of the NFAC in some embodiments, and may for example be used at least temporarily to store at least some custom logic specified by clients for implementing network functions at the NFAs. In some embodiments, an NFAC may comprise only a single PNI chipset and/or only a single NFA chipset. In at least one embodiment, a card-level memory may not be incorporated within an NFAC. In some embodiments, at least a portion of an NFAC may be implemented as a system on a chip (SOC).

Figure 8:
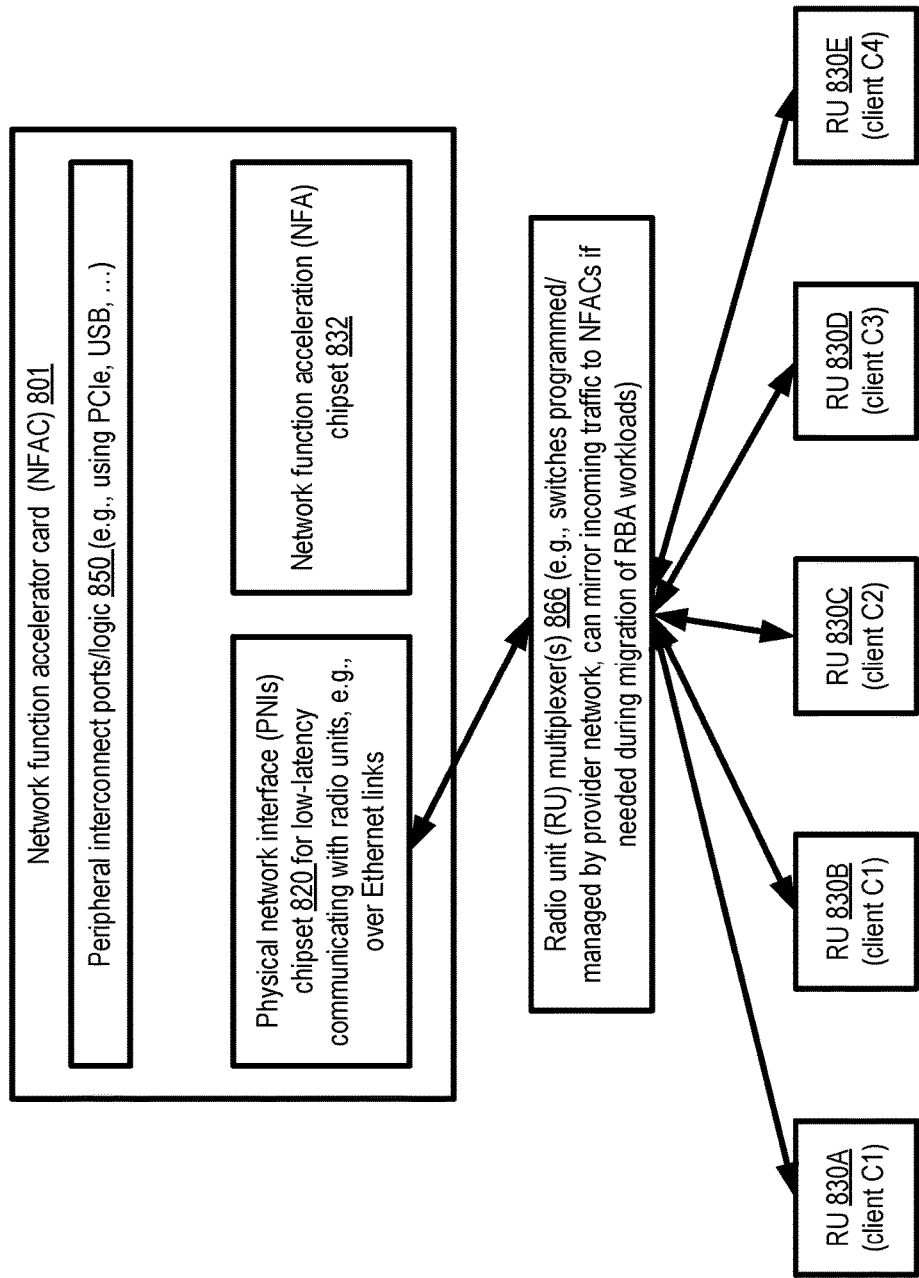
FIG. 8 illustrates an example configuration in which a multiplexing device may be configured for communication between a network function accelerator card and a plurality of radio units, according to at least some embodiments.

As indicated above, a given RPPS may comprise several different NFACs, and a given NFAC may in some cases be used for applications of several different clients, which may require communication with multiple cells and multiple RUs. In order to enable such multi-way communications, in some embodiments intermediary devices may be deployed between the NFACs and the RUs. FIG. 8 illustrates an example configuration in which a multiplexing device may be configured for communication between a network function accelerator card and a plurality of radio units, according to at least some embodiments. One or more radio unit (RU) multiplexers 866 (e.g., switches programmed and managed by the provider network operator) may be set up in the depicted embodiment for messages transferred in either direction between an NFAC 801 and a set of RUs 830 of the clients on whose behalf NFAC 801 is being utilized.

NFAC 801 may include at least peripheral interconnect ports/logic 850, a PNI chipset 820 and an NFA chipset 832 in the depicted embodiment. The NFAC 801 may be utilized for executing network functions on behalf of several different clients, such as C1, C2, C3, and C4, each of whom may have at least one cell with one or more radio units implemented at each of the cells. In a scenario in which a result of a network function executed at the NFA chipset 832 is to be transmitted to an RU (i.e., for a downlink), the NFA may transmit the result to the PNIs, e.g., along with an indication of the particular client and/or the particular RU to which the result should be forwarded. The result may then be transmitted, along with the indication of the destination client or RU, to a multiplexer 866, and from the multiplexer to an RU. In the example scenario depicted in FIG. 8, five RUs may be connected via physical links to the multiplexer 866—RUs 830A and 830B of client C1, RU 830C of client C2, RU 830D of client C3, and RU 830E of client C4. Messages in the reverse direction (from the RUs to the NFAC and to higher layers of the stack) may also need to be multiplexed in some embodiments, e.g., if several different NFACs are configured at the same RPPS as NFAC 801. The RU multiplexers 866 represent another beneficial aspect of multi-tenant support for radio-based applications provided by the provider network in various embodiments, as the set of RUs that can be used in conjunction with a given NFAC or a given RPPS may be determined dynamically and flexibly based on client needs. In at least some embodiments, an RU multiplexer may be programmable to implement traffic mirroring, a technique which may be helpful during migrations of RBAs between runtime environments at different RPPSs as discussed below in further detail.

Figure 9:
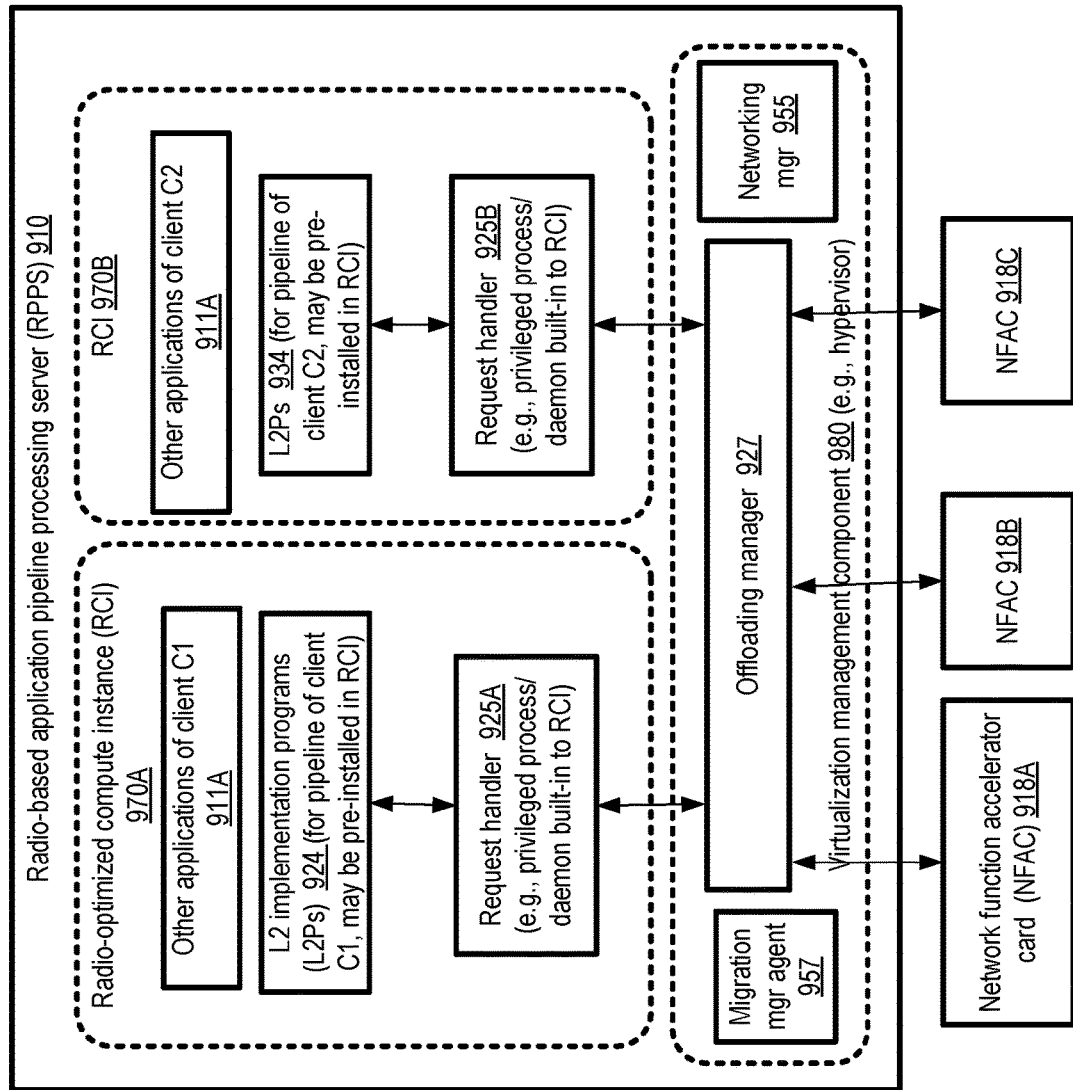
FIG. 9 illustrates an example configuration in which an offloading manager may be implemented at a virtualization management component of a radio-based application pipeline processing server, according to at least some embodiments.

FIG. 9 illustrates an example configuration in which an offloading manager may be implemented at a virtualization management component of a radio-based application pipeline processing server, according to at least some embodiments. An RPPS 910 comprises a plurality of radio-optimized compute instances (RCIs) 970 in the depicted embodiment, with RCI 970A created at the request of a client C1 of a provider network, and RCI 970B created at the request of another client C2. RCI 970A comprises L2Ps 924 for L2 network functions of a radio-based application pipeline of client C1, while RCI 970B comprises L2Ps 934 for L2 network functions of a radio-based application pipeline of client C2. In at least some embodiments, L2Ps may be built-in or pre-installed within RCIs; for example, the provider network may offer its clients the option of launching an RCI with L2 software from a specified vendor. Alternatively, in some embodiments, clients may launch L2 software programs of their choice at an RCI after the RCI has been launched at an RPPS.

In the depicted embodiment, RCI 970A comprises a request handler 925A used for forwarding at least some L1 network function requests of client C1's pipeline to NFACs via an offload manager 927. RCI 970B comprises a request handler 925B used for forwarding at least some L1 network function requests of client C2's pipeline to NFACs via the offloading manager 927. The request handlers may be implemented as privileged processes, threads or daemons in some implementations within the operating systems used for the RCIs. Because the request handlers are run within distinct RCIs, they may in effect be isolated from one another, since each RCI may be implemented as a distinct virtual machine with its own address space. As a result, it may not be feasible for data or network function requests of client C1's pipeline to be accessed by request handler 925B, and similarly, it may not be possible for data or network function requests of client C2's pipeline to be accessed by request hander 925A, thus enhancing security for the different pipelines. RCI 970A may also be utilized, if desired, to run one or more other applications 911A of client C1. RCI 970B may also be utilized, if desired, to run one or more other applications of client C2.

The offloading manager which acts as an intermediary between the request handlers and a set of NFACs 918 of RPPS 910, such as NFAC 918A, 918B or 918C, may be implemented as one or more processes or threads within a virtualization management component 980 of the RPPS in the depicted embodiment. In some embodiments, for example, the offloading manager may be implemented as part of a hypervisor. Communications with the offloading manager 927 may require special privileges or permissions, which are granted to request handlers 925 but not to other processes or threads in at least some embodiments.

In some embodiments, software containers may be used as the isolated runtime environments (also referred to as execution environments) for respective combinations of L2 programs and request handlers instead of RCIs. Thus, for example, an L2 implementation program and a request handler for client C1's pipeline may be incorporated within one software container SC1 running at an RPPS, while an L2 implementation program and a request handler for client C2's pipeline may be incorporated within another software container SC2 running at the same multi-tenant RPPS. In the embodiment depicted in FIG. 9, a migration manager agent 957 and a networking manager 955 may also be instantiated at the RPPS 910, e.g., as part of a virtualization management component 980. The migration manager agent may help coordinate the migration of an RCI (or an RTE) from one RPPS to another, or the migration of a radio-based application workload from one RTE to another in various embodiments. The networking manager 955 may be responsible in the depicted embodiment for connectivity with various types of other endpoints, and may for example choose the particular NHD to be used for a particular type of network traffic such as mid-haul traffic or front-haul traffic.

Figure 10:
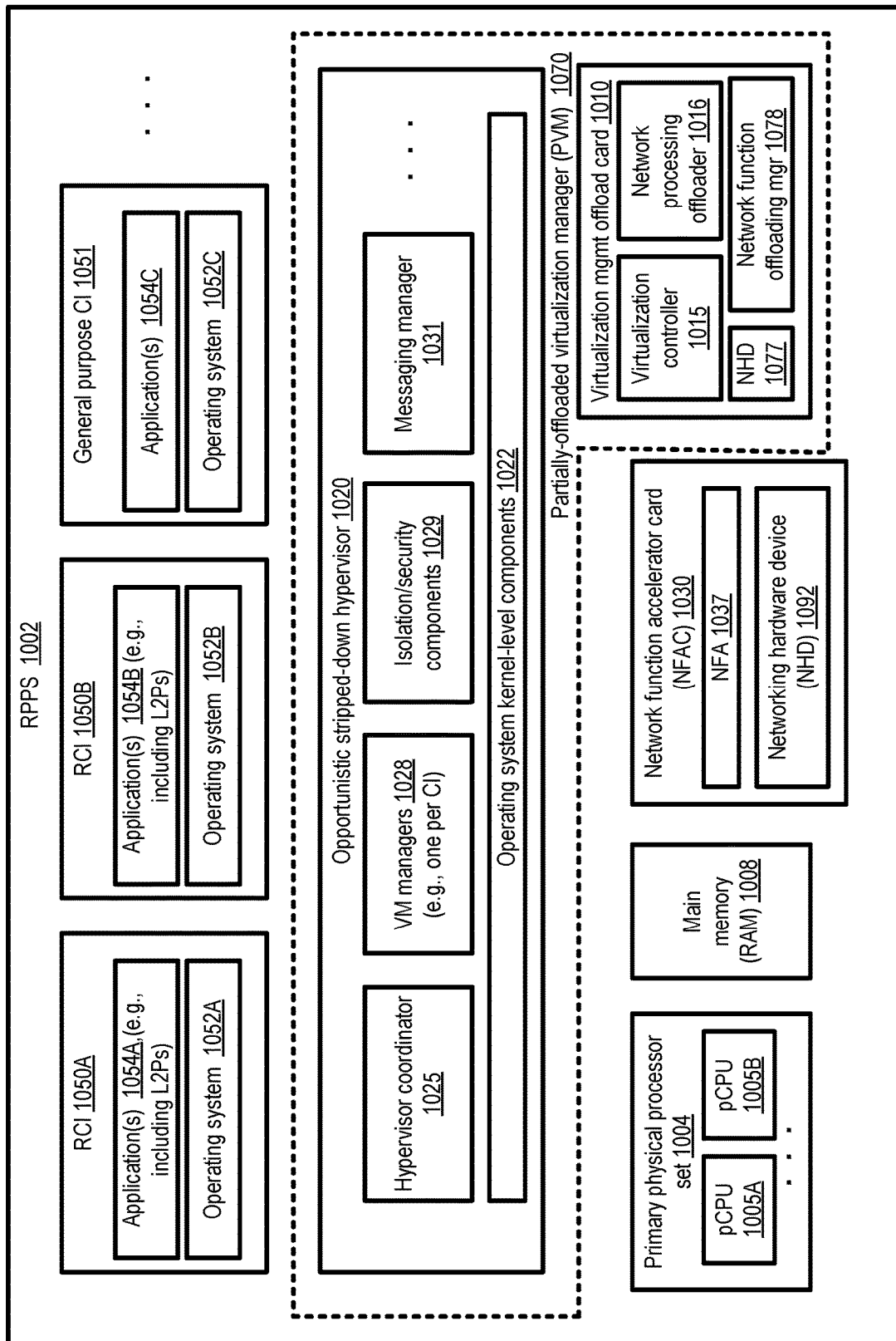
FIG. 10 illustrates an example configuration in which a partially offloaded virtualization manager may be implemented at a radio-based application pipeline processing server, according to at least some embodiments.

FIG. 10 illustrates an example configuration in which a partially offloaded virtualization manager may be implemented at a radio-based application pipeline processing server, according to at least some embodiments. As shown, RPPS 1002 may comprise a primary physical processor set 1004, a main memory (e.g., one or more modules of random access memory or RAM) 1008, a network function accelerator card (NFAC) 1030, a partially-offloaded virtualization manager (PVM) 1070 and one or more radio-optimized compute instances (RCIs) 1050, such as RCIs 1050A and 1050B. In some embodiments, a given RPPS may also be used to run one or more general purpose compute instances, such as general purpose CI 1051, which may not be optimized for radio-based applications. NFAC 1030 may include an NFA 1037 and a networking hardware device (NHD) 1092 in the depicted embodiment. RPPS 1002 may also comprise a number of other components, e.g., various persistent storage devices, which are not shown in FIG. 10. The primary physical processor set 1004 may comprise a number of physical CPUs (pCPUs, also referred to as primary processors), including pCPUs 1005A and 1005B in the depicted embodiment. Virtualized versions of the pCPUs, called vCPUs or virtual CPUs, may be allocated to individual RCIs and/or general-purpose CIs by the PVM 1070 during the lifetime of the compute instances. Each compute instance may comprise a respective instance of an operating system (e.g., operating systems 1052A-1052C) and a set of applications (e.g., 1054A-1054C) being run on behalf of clients of a virtualized computing service (VCS) with functionality similar to VCS 110 of FIG. 1.

The PVM 1070 may comprise an opportunistic stripped-down hypervisor 1020 (which uses the pCPUs) and one or more offloaded virtualization manager components (OVMCs) which do not use the pCPUs in the depicted embodiment. OVMCs may include, for example, a virtualization controller 1015 and a network processing offloader 1016. The network processing offloader may perform some of the functions of a networking manager (such as networking managers 127 of FIG. 1) in some embodiments. Individual ones of the OVMCs may be implemented using a respective system-on-chip design in some embodiments, e.g., incorporated within a virtualization management offload card 1010. Although the virtualization controller 1015 and the network processing offloader 1016 are shown as being incorporated within a single offload card 1010 (e.g., a PCIe card) in the depicted embodiment, other approaches regarding the arrangement and organization of the OVMCs may be employed in different embodiments. For example, in one embodiment, a single system-on-chip implementation may be used to perform the functions of the virtualization controller and the network processing offloader, thereby eliminating the need for two different OVMCs. In another embodiment, respective offload cards may be used for the virtualization controller 1015 and the network processing offloader 1016. The virtualization controller, as suggested by its name, may be responsible for organizing or orchestrating much of the virtualization management work performed at the RPPS 1002 in the depicted embodiment—e.g., it may be the first of the components of the PVM to boot, trigger the launches of the other components of the PVM, communicate with the VCS control plane, make memory allocation decisions with respect to compute instances, and so on. The network processing offloader 1016 may be responsible for implementing one or more networking protocols (including for example an encapsulation protocol used within the VCS) and acting as an intermediary between the compute instances and at least some networking endpoints outside the RPPS in the depicted embodiment. In at least one embodiment the network processing offloader may select a particular NHD (e.g., an NHD 1077 at the VMOC 1010, or an NHD 1092 at an NFAC) to be used for a particular category of RPPS traffic.

Hypervisor 1020 may be described as being stripped-down in the depicted embodiment because much of the work performed by at least some conventional hypervisors may be handled at the virtualization management offload card 1010, thereby reducing the complexity and size of the hypervisor 1020. In addition, hypervisor 1020 may be designated as opportunistic because, under most circumstances, it may wait until a compute instance voluntarily relinquishes control of a pCPU 1005 before the hypervisor uses CPU cycles. Thus, for example, when a particular compute instance 1050 or 1051 issues an I/O request (where the I/O is expected to take approximately time T1 to complete) and gives up a pCPU until a response to the I/O request is received, the hypervisor may make use of this opportunity to use the pCPU to perform one or more virtualization management tasks (which may typically take time T2, where T2<<T1) while the compute instance is not expecting to use the pCPU. As such, the hypervisor 1020 may have a minimal impact on the performance of applications 1054 (which may include radio-based applications) in the depicted embodiment.

The hypervisor 1020 may itself comprise a number of subcomponents in the depicted embodiment, including a set of operating system kernel-level components 1022, a hypervisor coordinator 1025, one or more virtual machine (VM) managers 1028, isolation/security components 1029, and/or a messaging manager 1031. The hypervisor coordinator 1025, individual ones of the VM managers 1028, the isolation/security components 1029 and/or the messaging manager 1031 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by compute instances, etc.).

The kernel-level components 1022 may provide support for various low-level operations such as the initial responses to VM exit instructions issued by the compute instances (e.g., when a compute instance gives up a pCPU). The hypervisor coordinator 1025, as implied by the name, may be responsible for orchestrating operations of the other subcomponents. The hypervisor coordinator 1025 may, for example, implement an API which can be used for communications between the offloaded virtualization management components 1015 and 1016 and the hypervisor, initiating compute instance launches and terminations (e.g., at the request of the virtualization controller), exposing metrics collected by the VM managers, providing debugging capabilities, and so on.

Each VM manager 1028 may be responsible for launching or instantiating a respective compute instance based on a specification provided by the coordinator 1025, monitoring metrics and logs of the compute instance, and so on. In some embodiments a VM manager 1028 may also help with compute-instance-requested I/O operations for certain devices, e.g., by trapping I/O requests and translating them to memory-mapped I/O operations completed with the help of an offloaded virtualization management component.

The messaging manager 1031 may act as an intermediary between the virtualization controller 1015 and the hypervisor, e.g., by translating commands issued using a queue-based protocol by the virtualization controller into pipe messages within the hypervisor. The security and isolation components 1029 may be responsible, for example, for scrubbing or cleaning up compute instance memory when a compute instance terminates, so that inadvertent sharing of data across compute instances can be avoided.

L2 implementation programs of the kind discussed earlier may be run as part of the applications 1054A or 1054B of the RCIs in the depicted embodiment. In some embodiments, programs implementing L3 or CU functions may also or instead be run at RPPS 1002, e.g., as part of applications 1054A, 1054B or 1054C. Request handlers of the kind shown in FIG. 6 may be implemented in some embodiments as daemons within the operating systems 1052A or 1052B. In the embodiment shown in FIG. 10, a network function offloading manager 1078, similar in functionality to the offloading managers discussed earlier, may be implemented at the virtualization management offload card. In other embodiments, as indicated earlier, such an offload manager may be implemented within the hypervisor 1020.

Figure 11:
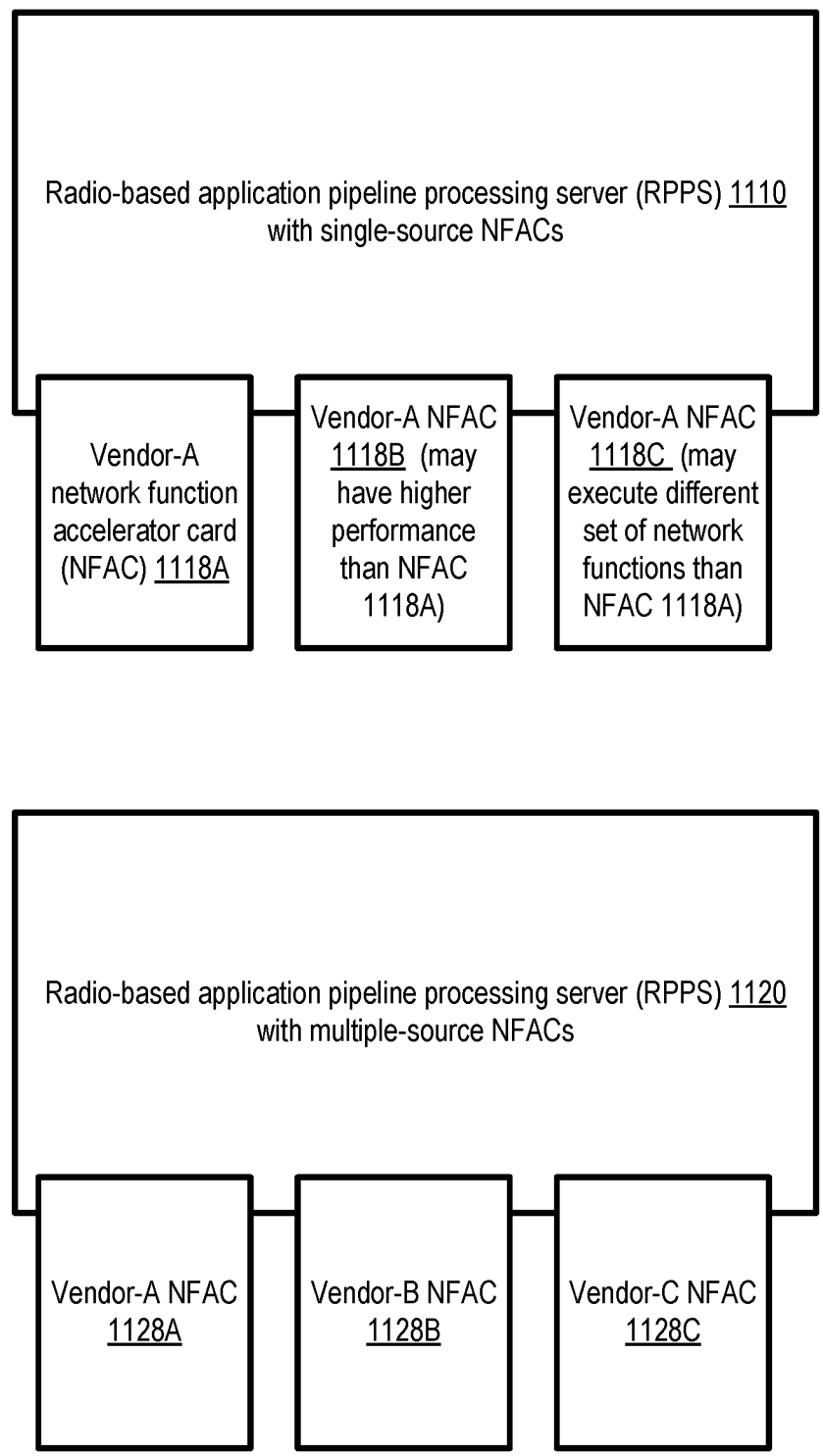
FIG. 11 illustrates examples of combinations of network function accelerator cards from different sources that may be utilized at a radio-based application pipeline processing server, according to at least some embodiments.

FIG. 11 illustrates examples of combinations of network function accelerator cards from different sources that may be utilized at a radio-based application pipeline processing server, according to at least some embodiments. RPPS 1110 represents an example of a single-source NFACs configuration in the depicted embodiment. That is, all the NFACs 1118A, 1118B and 1118C of the RPPS 1110 are manufactured by or obtained from the same NFAC vendor, Vendor-A (e.g., a third party NFAC supplier, or the provider network operator). Note that the NFACs from a given vendor may not necessarily provide identical functionality or performance—for example, Vendor-A NFAC 1118C may be capable of executing a different set of network functions that Vendor-A NFAC 1118A, Vendor-A NFAC 1118B may have a higher performance capacity (expressed, e.g., in units such as network functions executed per second) than Vendor-A NFAC 1118A in the depicted embodiment. RPPSs with single-source NFACs may be preferred by some clients of a provider network, e.g., in scenarios in which the clients are familiar with other products of, and have high confidence in, the particular NFAC vendor. In some embodiments, clients may provide, e.g., to the provider network control plane, an indication of the particular category or categories of network functions which are to be executed for their radio-based applications (e.g., using network function accelerators). In such a scenario, a particular RPPSs may be assigned to an applications based at least in part on a determination that the RPPS has a network function accelerator for the category or categories of network functions indicated by the client.

In contrast to the single-source scenario of RPPS 1110, RPPS 1120 includes NFACs from several different vendors or manufacturers in the embodiment depicted in FIG. 11. NFAC 1128A is from Vendor-A, NFAC 1128B is from Vendor-B, and NFAC 1128C is from Vendor-C. NFACs 1128A, 1128B and 1128C may differ from one another along various other dimensions as well, such as performance capacity, network functions accelerated, and so on. Such heterogeneous or multiple-source NFACs may be useful in scenarios in which the clients of the provider network are willing to leave low-level decisions such as the choice of NFAC vendor used for particular network functions or pipelines to the offloading managers. Heterogeneous configurations such as that of RPPS 1120 may provide the provider network flexibility in load-balancing varying types of radio-based application workloads in at least some embodiments.

Figure 12:
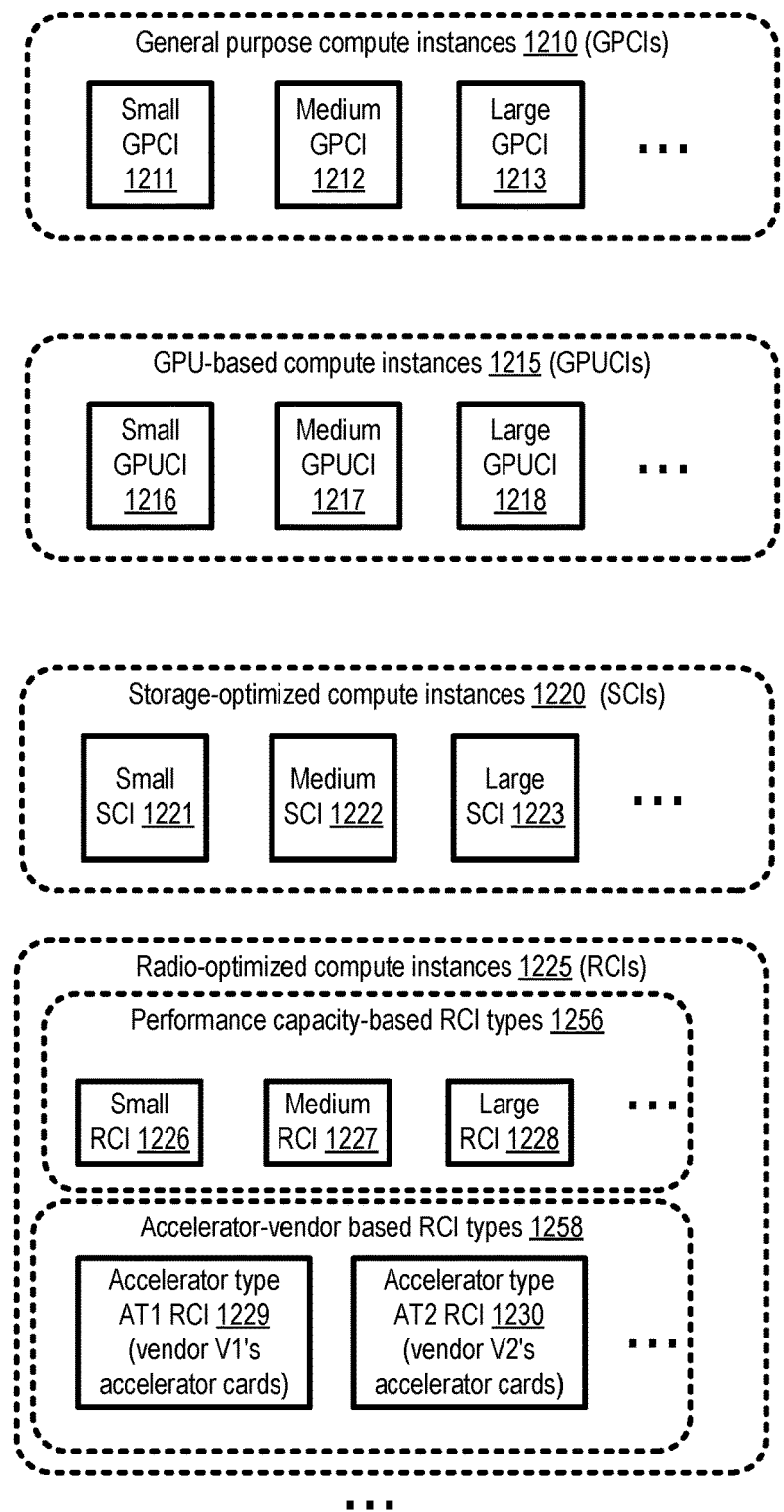
FIG. 12 illustrates example categories of compute instances that may be configured on behalf of clients of a virtualized computing service, according to at least some embodiments.

In some embodiments, a provider network may allow clients to launch compute instances selected from several different categories arranged in instance families. FIG. 12 illustrates example categories of compute instances that may be configured on behalf of clients of a virtualized computing service, according to at least some embodiments. The supported instance families in the depicted embodiment include general purpose compute instances 1210, GPU-based compute instances 1215, storage-optimized compute instances 1220, and radio-optimized compute instances 1225. Families (other than the general purpose family) may be optimized in some way for respective types of applications; for example, applications which demand large amounts of fast persistent writes or reads may be best suited for storage-optimized compute instances 1220, applications which include substantial graphics-related tasks or certain types of machine learning workloads may be best suited for GPU-based compute instances 1215, and radio-based applications may benefit most from being run at radio-optimized compute instances 1226.

Some of the instance families in turn may include several instance categories, distinguished from one another based on properties such as performance capabilities. Small GPCIs 1211 of the general purpose compute instances 1210 may for example have fewer virtual CPUs and a smaller amount of memory available than medium GPCIs 1212, which in turn may have fewer virtual CPUs and a smaller amount of memory available than large GPCIs 1213. Similarly, small GPUCIs 1216 of the GPU-based family may have fewer virtualized GPUs available for client applications than medium GPUCIs 1217, and large GPUCIs 1218 may have more virtual GPUs available than medium GPUCIs. More and/or faster persistent storage devices may be accessible from large SCIs 1223 of storage-optimized family than from medium SCIs 1222, and small SCIs 1221 may have less storage capacity or slower speed storage than medium SCIs.

The radio-optimized compute instances (RCIs) 1225 may be divided into categories based not just on performance differences in some embodiments, but also based on the types of accelerator cards accessible from the RCIs. Among performance capacity-based RCI types 1256, small RCIs 1226 may be capable of executing network functions at a slower aggregate rate (and may also have fewer vCPUs and smaller memory) than medium RCIs 1227, which may in turn be capable of executing network functions at a slower aggregate rate (and may also have fewer vCPUs and smaller memory) than large RCIs 1228. Some RCI categories may be defined based on the vendor of accelerator cards accessible from the RCIs in the depicted embodiment. Accelerator vendor based RCI types 1258 may include, for example, an accelerator type AT1 RCI 1229 which is restricted to utilizing a vendor V1's accelerator cards for network function offloading, an accelerator type AT2 RCI 1230 which can only access vendor V2's accelerator cards for network function offloading, and so on. RCIs may also be grouped into categories using a combination of the accelerator types available and performance capabilities in some embodiments—e.g., RCI categories "Small AT1", "Large AT1" etc. may be defined by the provider network. As mentioned earlier, in some embodiments, bare metal RCIs (similar to RCI 129 of FIG. 1) may also be supported by a VCS for its clients. Such bare-metal RCIs may comprise software capable of accessing the NFACs directly, e.g., without going through a virtualization management component (VMC). In at least one embodiment, the maximum number of NFACs and/or NFAs that can be utilized for a radio-based application implemented with the help of an RCI may be determined based on the category of the RCI. For example, assume that an RPPS has 16 NFACs, each with one NFA. It may be the case in some implementations that only up to 4 of the 16 NFACs may be utilized from a "Small" RCI, only up to 8 of the 16 NFACs may be utilized from a "Medium" RCI, and so on.

Figure 13:
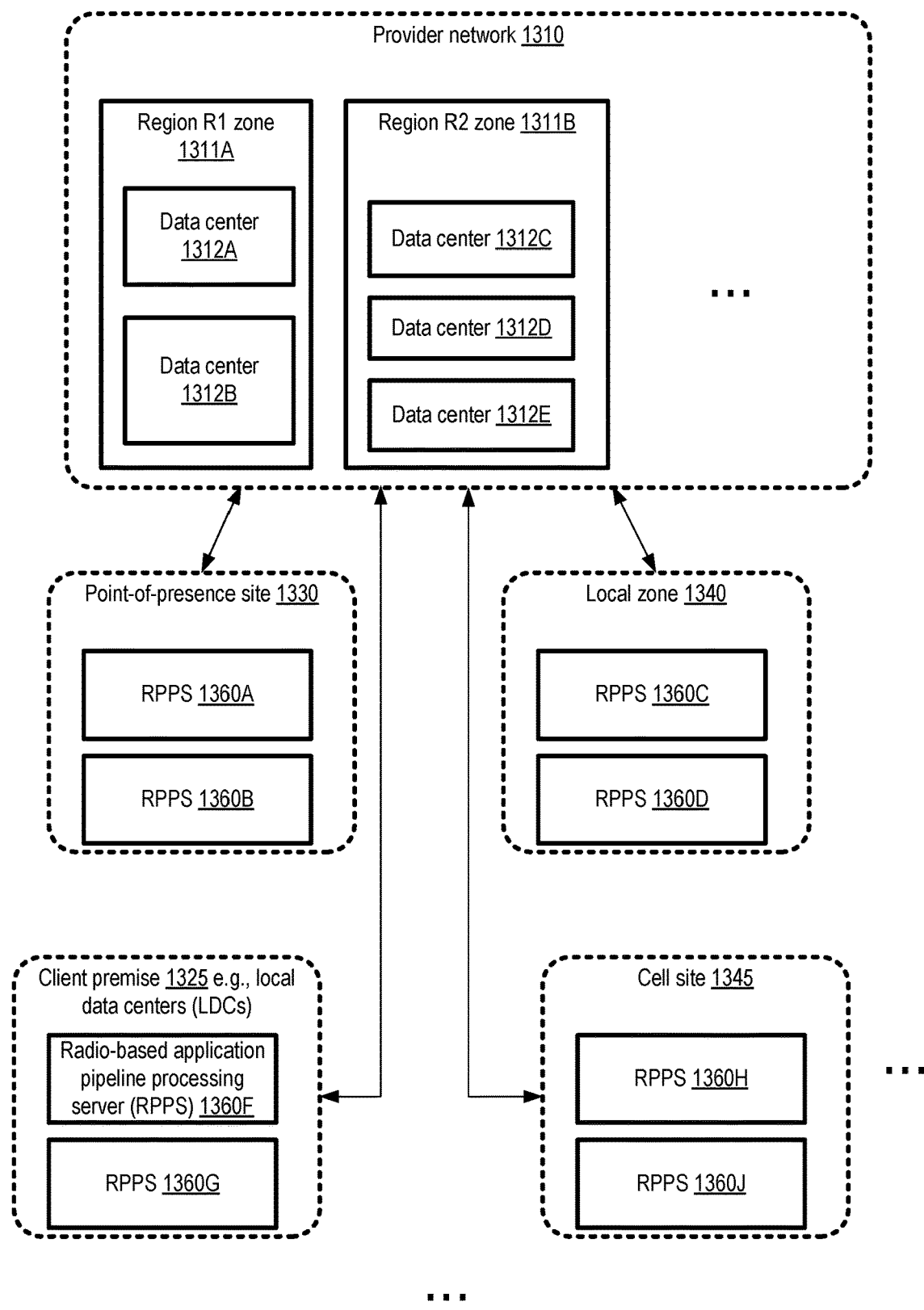
FIG. 13 illustrates example premises and sites at which radio-based application pipeline processing servers may be deployed, according to at least some embodiments.

FIG. 13 illustrates example premises and sites at which radio-based application pipeline processing servers may be deployed, according to at least some embodiments. In the embodiment depicted in FIG. 13, resources of a provider network 1310 may be organized into regional zones, such as region R1 zone 1311A and region R2 zone 1311B. A given regional zone may in turn comprise one or more data centers located relatively close to each other (e.g., within the same state or metropolitan area). Region R1 zone 1311A comprises data centers 1312A and 1312B, while region R2 zone 1311B comprises data centers 1312C, 1312D and 1312E in the example shown in FIG. 13. Each such data center 1312 may comprise control plane and data plane resources and artifacts of one or more services such as a virtualized computing service (VCS) similar to VCS 110 of FIG. 1 and/or a radio-based application management service (RBAMS) similar to RBAMS 192 of FIG. 1.

RPPSs of the kind described above may be configured, in response to programmatic requests from clients, at a variety of facilities other than the provider network's own data centers 1312 in the depicted embodiment. Such facilities may include, among others, cell sites 1345, client premises 1325 such as local data centers, local zones 1340, and/or point-of-presence sites 1330 in different embodiments. As shown, RPPSs 1360A and 1360B may be set up, e.g., within a single rack, at point-of-presence site 1330. RPPSs 1360C and 1360D may be set up at local zone 1340, RPPSs 1360F and 1360G may be set up at a client-owned premise 1325, and RPPSs 1360H and 1360J may be set up at a cell site (e.g., a room or group of rooms located next to cell towers with antennas). Other types of facilities and locations may be used for RPPSs in some embodiments, instead or in addition to those shown in FIG. 13. From each RPPS at a given facility, connectivity may be established with the control plane components of the provider network (e.g., via extension traffic intermediaries of the kind discussed in the context of FIG. 1) in various embodiments, and with radio units (RUs) typically located very near or in the facilities. After such connectivity has been verified, in various embodiments software components such as isolated request handlers and offloading managers may be launched at the RPPS to process radio-based applications as described earlier.

Figure 14:
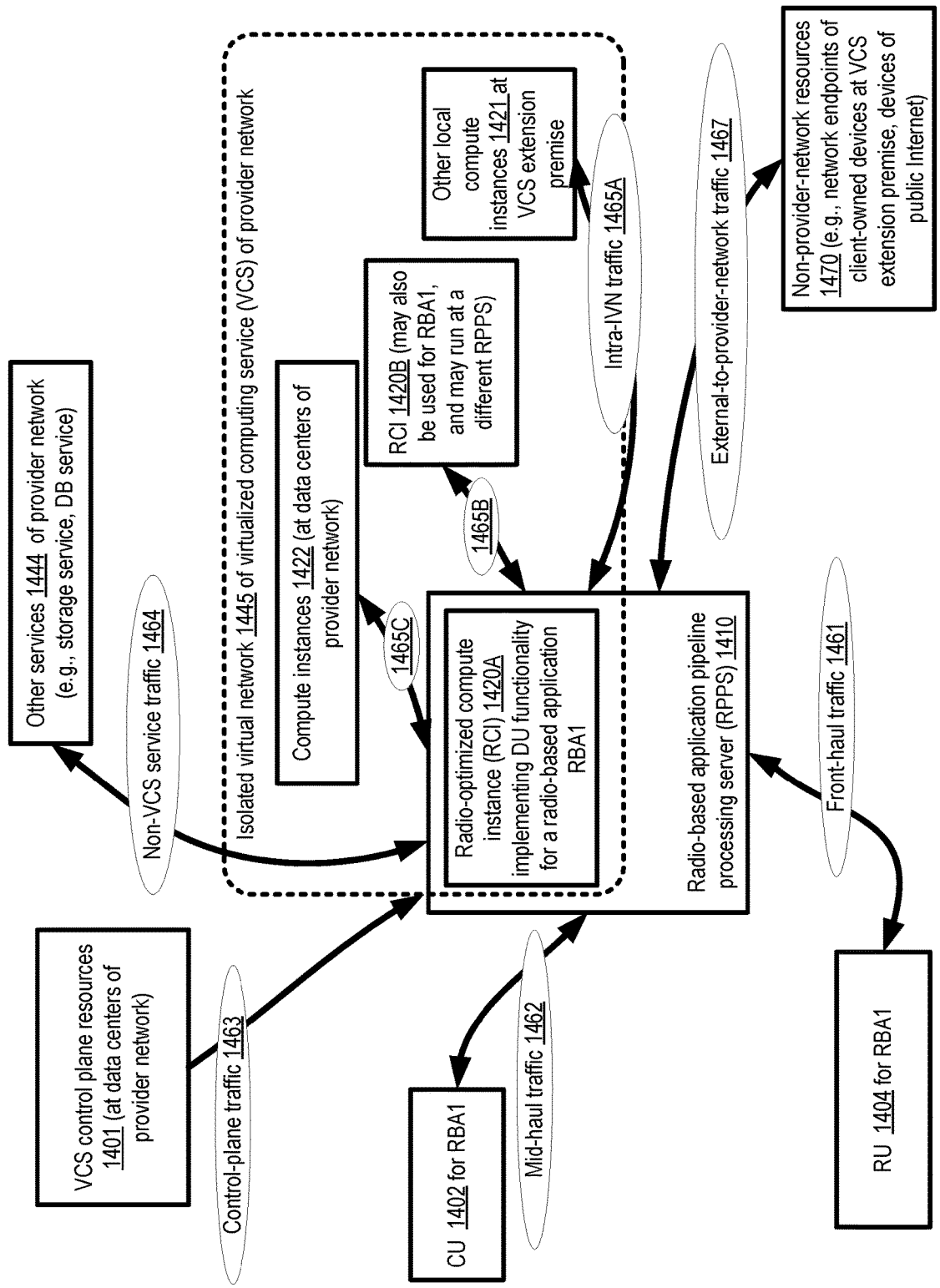
FIG. 14 illustrates example categories of network traffic of a radio-based application pipeline processing server, according to at least some embodiments.

As indicated earlier, network traffic may flow between an RPPS and several different types of other servers or devices in at least some embodiments. FIG. 14 illustrates example categories of network traffic of a radio-based application pipeline processing server, according to at least some embodiments. An RPPS 1410 may be configured at a VCS extension premise in the depicted embodiment, and an RCI 1420 at which at least a portion of DU functionality of a radio-based application RBA1 may be launched at RPPS 1410. RCI 1420A may be configured as a part of an isolated virtual network 1445 of a VCS of the provider network in the depicted embodiment, e.g., by assigning an IP address of a range of IVN IP addresses to RCI 1420A. The IVN 1445 may comprise one or more other RCIs such as RCI 1420B; RCI 1420B may, for example, also be used to perform some portion of RBA1. RCI 1420B may run at a different RPPS than RPPS 1410. IVN 1445 may also comprise one or more compute instances 1422 which run at virtualization servers within the provider network's data centers in the scenario depicted in FIG. 14. In addition, IVN 1445 may include one or more other local compute instances 1421 which are not optimized for radio-based applications but are also run at the same VCS extension premise as RPPS 1410. Each of the compute instances within IVN 1445, including instances 1422, 1420 and 1421, may be assigned IP addresses within the range(s) of IP addresses selected for the IVN.

RPPS 1410 may participate in at least six categories of network traffic exchanges in the depicted embodiment. Front-haul traffic 1461 may flow between the RPPS 1410 and one or more RUs of RBA1, such as RU 1404. Mid-haul traffic 1462 may flow between the RPPS 1410 and one or more CUs of RBA1, such as CU 1402. Control-plane traffic (such as commands to launch RCIs, terminate RCIs, or migrate RCIs) may be directed to RPPS 1410 from VCS control-plane resources located at data centers of the provider network. Messages directed to or from other services 1444 of the provider network (such as a storage service or a database service) from applications run at the RPPS 1410, may constitute non-VCS service traffic 1464 in the depicted embodiment. In some cases, the premise at which the RPPS 1410 is configured may include one or more resources that are not managed by the provider network, such as client-owned devices or servers at which client applications other than RBA1 are run. Such resources may be referred to as one example of non-provider-network resources 1470; other examples may include devices of the public Internet. Traffic to/from network endpoints of such resources may be referred to as external-to-provider-network traffic 1467. The final category of network traffic, referred to as intra-IVN traffic, may include traffic between the RPPS and other local compute instances 1421 (intra-IVN traffic 1465A), traffic between the RCI 1420A and other RCIs such as RCI 1420B (intra-IVN traffic 1465B), and traffic between the RPPS and compute instances 1422 within the provider network's data centers (intra-IVN traffic 1465C) in the depicted embodiment.

In some embodiments, as mentioned earlier, a networking manager implemented at least in part at the RPPS 1410 may select the particular networking hardware devices (NHDs) to be used for at least some of these traffic categories, from among the set of NHDs available at the RPPS. After the networking manager chooses an NHD for outbound traffic (i.e. messages from the RPPS 1410) of a particular category, the same NHD may be used by default for inbound messages (i.e., messages to the RPPS 1410) by the recipient of the outbound messages in various embodiments.

Figure 15:
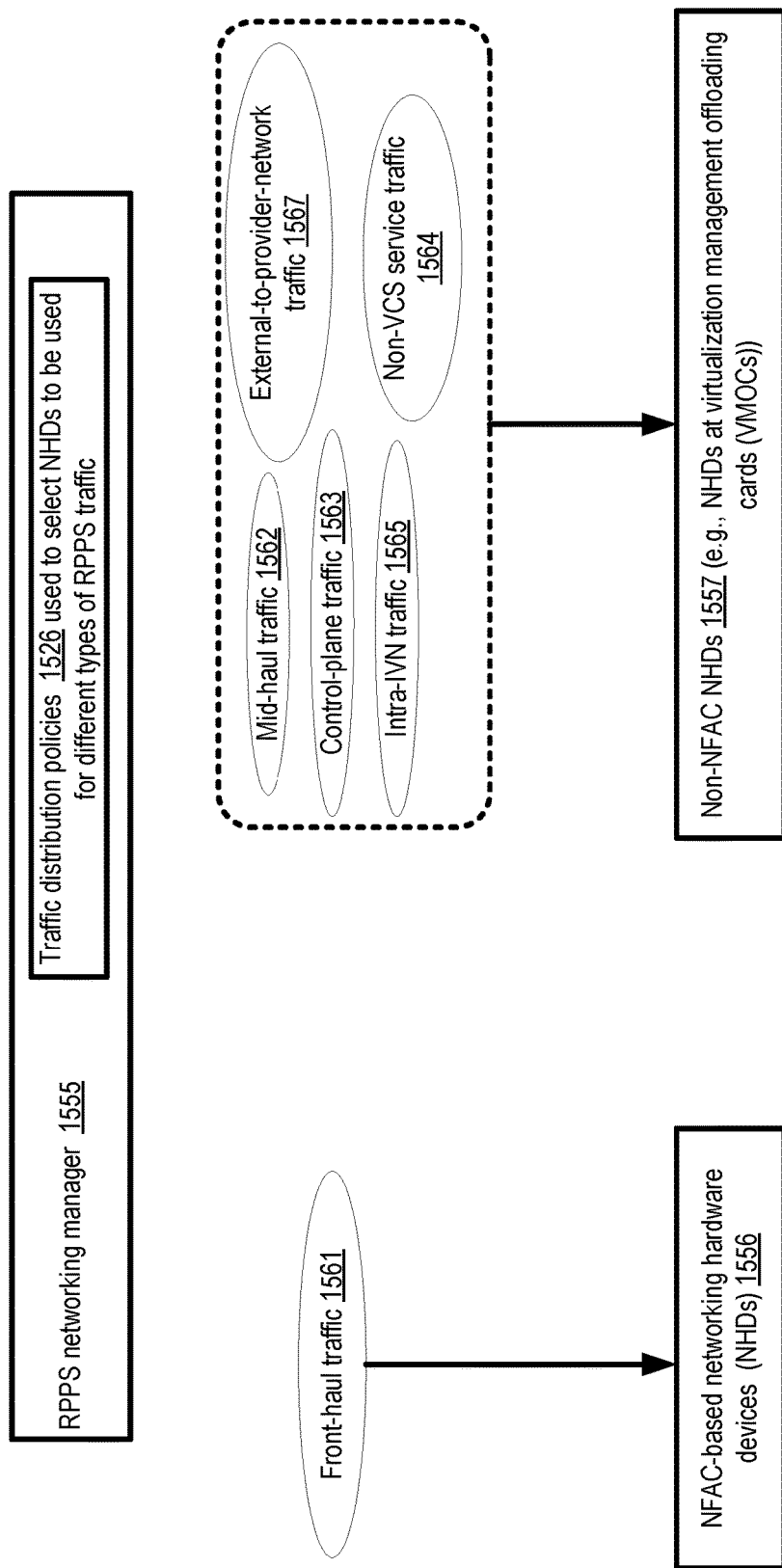
FIG. 15, FIG. 16 and FIG. 17 illustrate respective example selections of networking hardware devices for network traffic categories of a radio-based application pipeline processing server, according to at least some embodiments.
Figure 16:
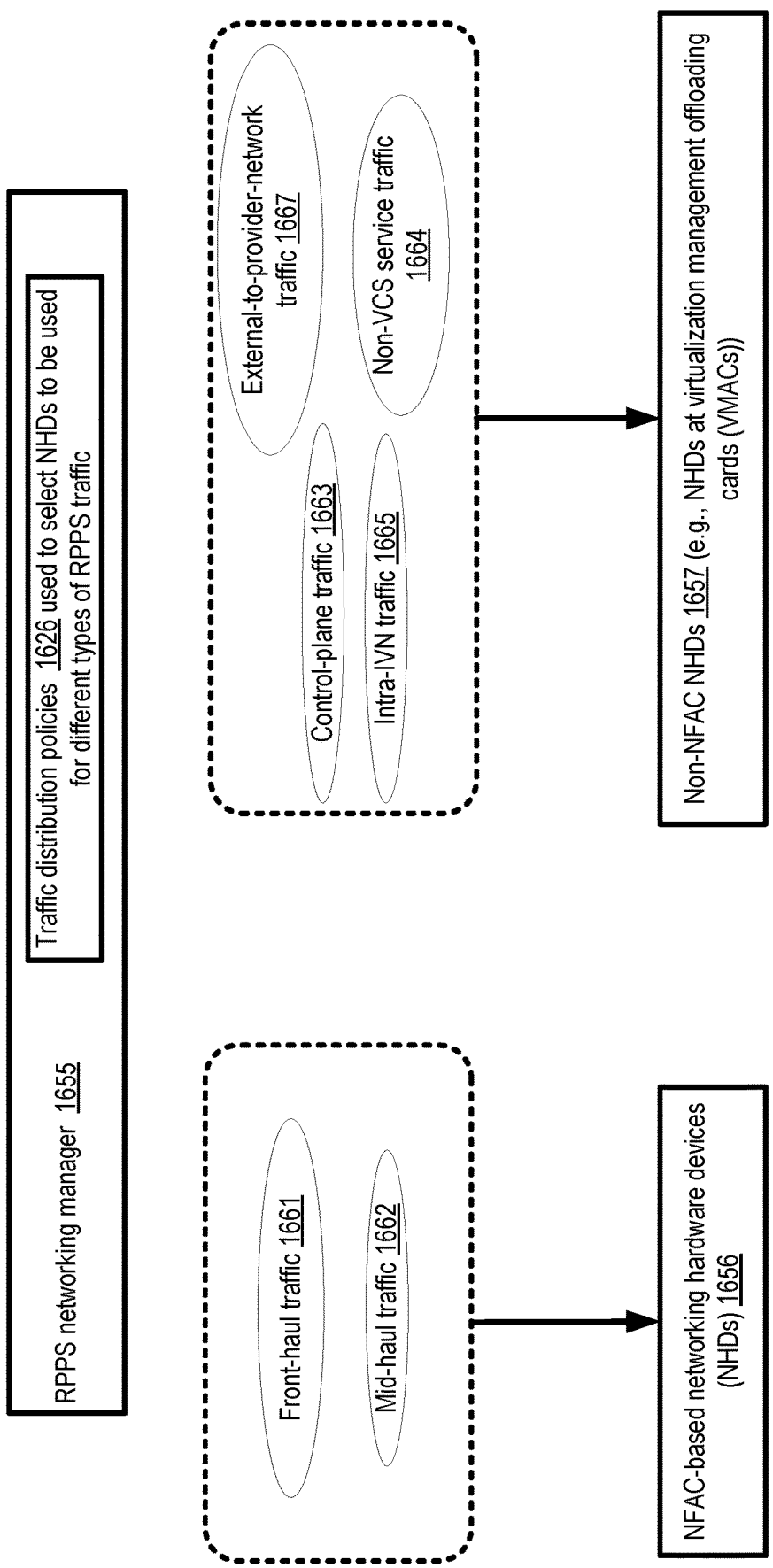
Figure 17:
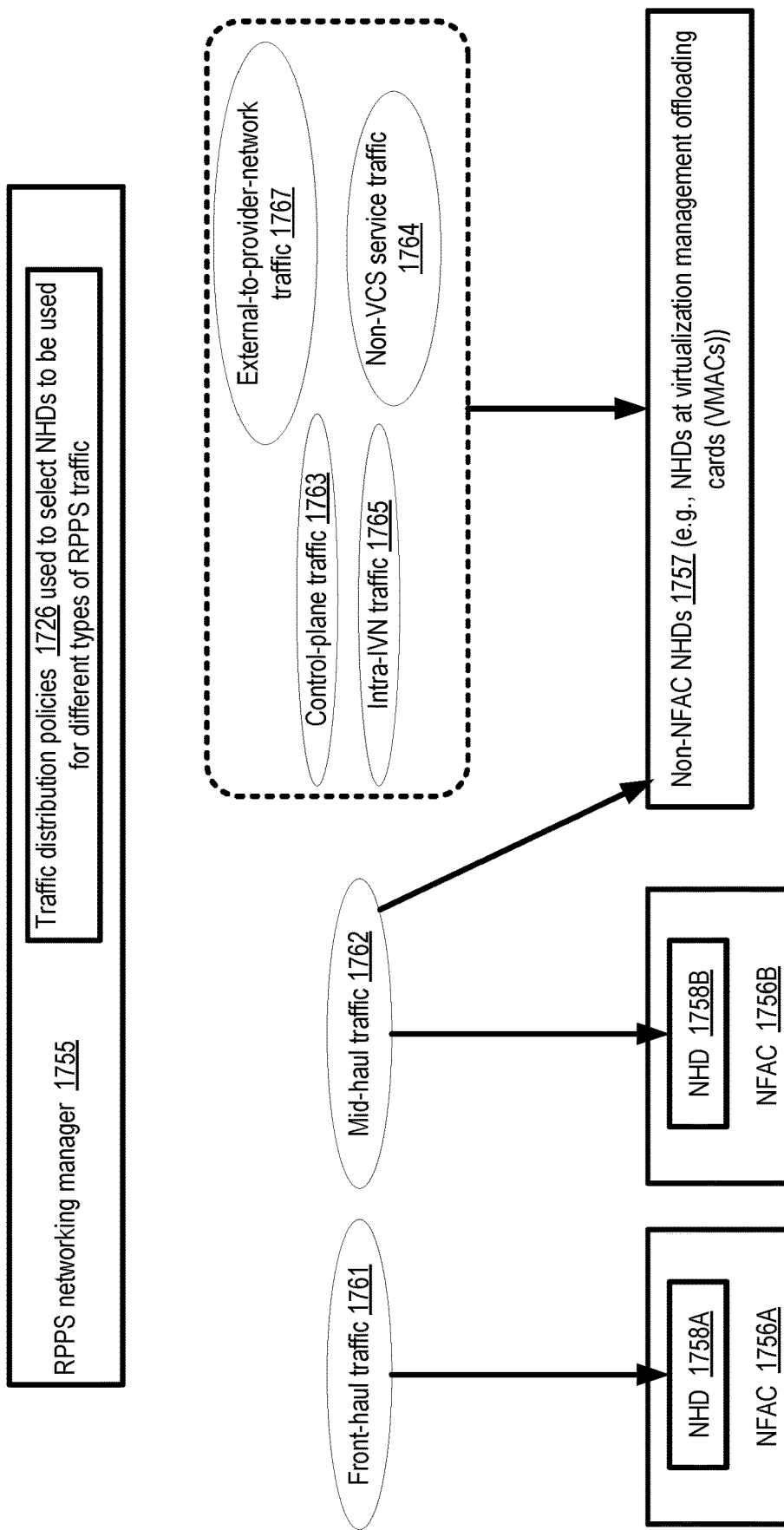

FIG. 15, FIG. 16 and FIG. 17 illustrate respective example selections of networking hardware devices for network traffic categories of a radio-based application pipeline processing server, according to at least some embodiments. In the embodiment depicted in FIG. 15, an RPPS networking manager 1555 may implement traffic distribution policies 1526 to select NHDs to be used for different types of RPPS traffic. The policies may be indicated via programmatic interfaces by clients on whose behalf the RPPS is configured in some embodiments. In other embodiments, a default traffic distribution policy may be selected for an RPPS by the control plane of the VCS, e.g., in the absence of specific guidance regarding the policies from a client.

In the example scenario depicted in FIG. 15, the networking manager may select NFAC-based NHDs 1556 for front-haul traffic 1561 of the RBAs whose DU layer is implemented at least in part at the RPPS in accordance with policies 1526 for at least some period of time. Other categories of traffic, such as mid-haul traffic 1562, control-plane traffic 1563, intra-IVN traffic 1565, external-to-provider-network traffic 1567, and non-VCS service traffic 1564, may be transmitted via non-NFAC NHDs 1557 of the RPPS, such as NHDs incorporated within virtualization management offloading cards of the kind shown in FIG. 10, or standard server NICs which are not incorporated within offloading cards.

In the example scenario depicted in FIG. 16, according to traffic distribution policies 1626, an RPPS networking manager 1655 may utilize NFAC-based NHDs 1656 for both front-haul traffic 1661 and mid-haul traffic 1662 for at least some time interval, while non-NFAC NHDs 1657 may be chosen for control-plane traffic 1663, intra-IVN traffic 1665, external-to-provider-network traffic 1667, and non-VCS service traffic 1664. Respective subsets of a plurality of ports available at an NFAC-based NHD (similar to ports 772 of FIG. 7) may be used for front-haul and mid-haul traffic in some embodiments.

In some cases, several NFACs, each comprising at least one NHD, may be available at an RPPS. In the example scenario shown in FIG. 17, NHD 1758A of NFAC 1756A, NHD 1758B of NFAC 1756B, and at least one non-NFAC NHD 1757 may be available at an RPPS at which traffic distribution policies 1726 may be in effect. The RPPS networking manager 1755 may select NHD 1758A for front-haul traffic 1761 and NHD 1758B for mid-haul traffic 1762 during some time interval, while causing the control-plane traffic 1763, intra-IVN traffic 1765, external-to-provider-network traffic 1767, and non-VCS service traffic 1764 to be transmitted via non-NFAC NHDs 1757. In some embodiments, a portion of the mid-haul traffic may also 1762 be transmitted via a non-NFAC NHD 1757—that is, a given category of traffic may be split across both NFAC-based NHDs and non-NFAC NHDs.

Figure 18:
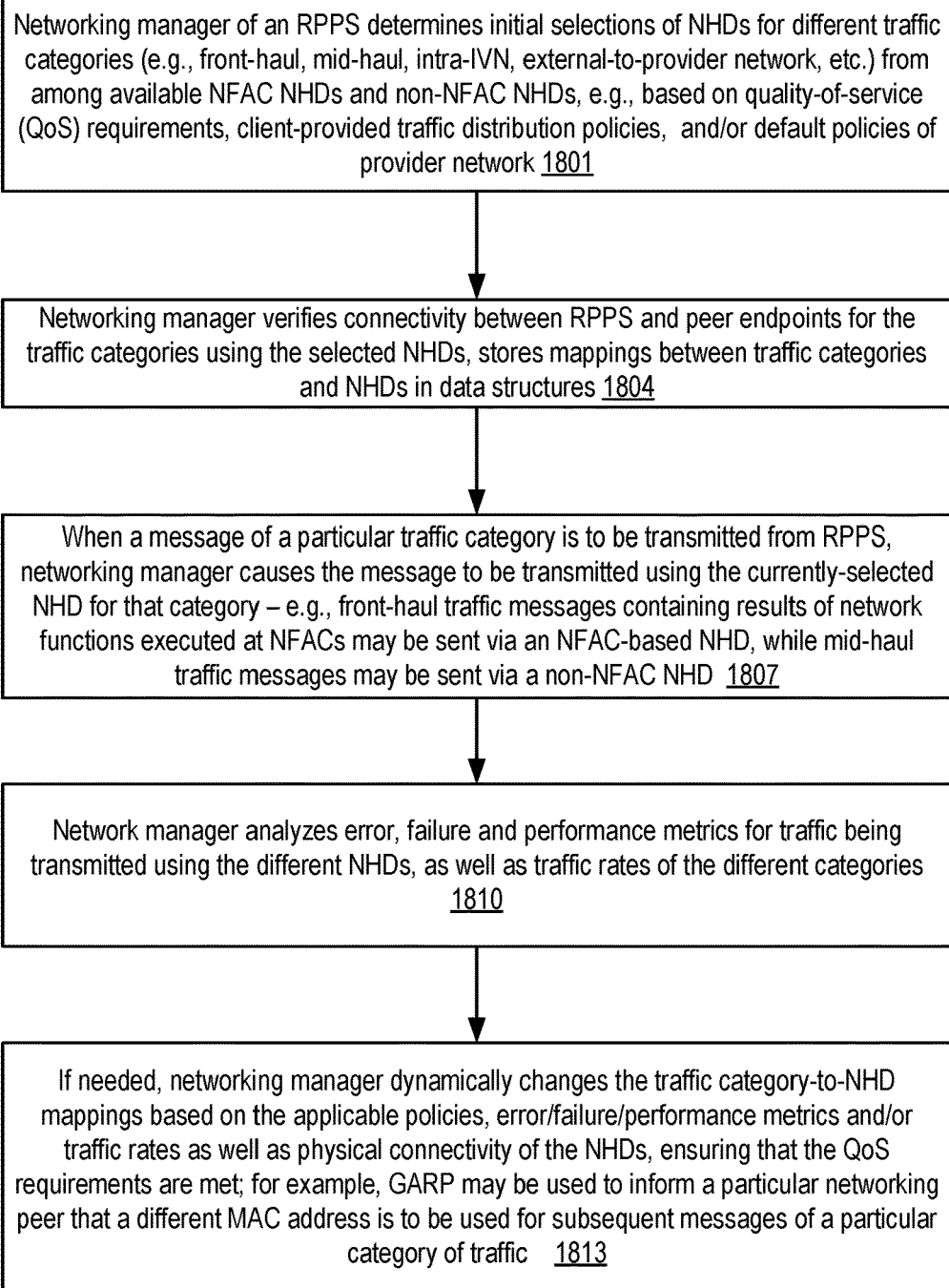
FIG. 18 is a flow diagram illustrating aspects of operations that may be performed to manage network traffic at radio-based application pipeline processing servers, according to at least some embodiments.

FIG. 18 is a flow diagram illustrating aspects of operations that may be performed to manage network traffic at radio-based application pipeline processing servers, according to at least some embodiments. As shown in element 1801, a networking manager of an RPPS of a provider network may determine initial selections of NHDs, from among the NHDs available at the RPPS, for each of the different traffic categories of a radio-based application of the RPPS, such as the categories illustrated in FIG. 14. The categories of traffic may include front-haul traffic, mid-haul traffic, intra-IVN traffic, control plane traffic, external-to-provider network traffic, and non-VCS service traffic, for example. The initial selection may be based on a variety of factors in different embodiments, such as quality of service (QOS) requirements for the different categories, client-provided traffic distribution policies, default policies of the provider network for the different categories, and so on. In some embodiments the networking manager may comprise at least some processes or threads of execution at the RPPS (e.g., within the virtualization management components of an RPPS). In one embodiment, a networking manager may be distributed across several different devices: e.g., a portion of the networking manager functionality may be executed at control plane servers of the provider network, another portion may be executed at the primary processors of the RPPS, while another portion may run at one or more offloading cards comprising NHDs (such as virtualization management offloading cards, or NFACs used for executing physical layer network functions). Note that in some embodiments, multiple NHDs (or multiple NHD ports) may be assigned for a particular category of traffic. Multiple categories of traffic may be assigned to a given NHD or a given set of ports of an NHD in at least some embodiments. In embodiments in which multiple radio-based applications are implemented using a given RPPS configured in multi-tenant mode, different NHDs may be selected for the same category of traffic of the respective applications. For example, traffic of category Cat1 of radio-based application RBA1 may be transmitted using NHD-A of an RPPS, while traffic of category Cat1 of radio-based application RBA2 (also running at the same RPPS) may be transmitted using NHD-B of the RPPS for at least some time periods.

The networking manager may verify connectivity between the RPPS and one or more peer endpoints for the traffic categories using the selected NHDs in various embodiments (element 1804), e.g., by sending a set of network packets which require response packets to be sent to the RPPS from the peer endpoints. The RPPS may store mappings between the different traffic categories and the NHDs selected for those categories in data structures.

When a message of a particular traffic category is to be transmitted from the RPPS, the networking manager may cause that message to be transmitted using a currently-selected NHD for that category in various embodiments (element 1807). For example, in one scenario, front-haul traffic messages containing results of network functions executed at an NFAC of the RPPS may be sent via an NFAC-based NHD to an RU, while mid-haul traffic messages may be sent to a CU using a non-NFAC NHD for at least some time period. In at least some embodiments, the NHD may act as an intermediary for at least some packets being delivered from or to an RCI of the RPPS, or messages delivered to or from a virtualization management component of the RPPS, and may thus be able to direct the packets to the appropriate NHF selected for the traffic categories of the packets.

The network manager may analyze error, failure and/or performance metrics (e.g., message latencies, throughputs or message rates and so on) for the traffic being transmitted using the different NHDs currently employed for the radio-based application in the depicted embodiment (element 1810).

In some embodiments, if needed, the networking manager may dynamically change the traffic category-to-NHD mappings (element 1813). Such changes may be implemented based on the applicable traffic policies in use, based on the analyzed metrics, failure or errors, as well as the physical connectivity of the NHDs (e.g., information about the peer endpoints or networking devices such as switches/routers etc. to which each of the ports of each of the NHDs is physically linked). In some cases, in order to change the NHDs used for a given type of traffic, a new physical link may be established—e.g., an Ethernet cable may be connected between an NHD and a router at the VCS extension site at which the RPPS is located. In other cases, there may be unused capacity available using the existing physical links of the NHDs to accommodate the changed mappings. The networking manager may change the mappings in an effort to ensure that the quality of service (QOS) requirements of different categories of traffic continue to be maintained. A variety of techniques may be used to inform the peer entities about the changed mappings—e.g., a version of GARP (Generic Attribute Registration Protocol (GARP) or Multiple Registration Protocol (MRP) may be used to inform a peer device that a different Media Access Control (MAC) address is going to be used for subsequent messages of a particular category of traffic from that device. Note that in some cases, a network manager may not be able to change the NHD being used for a given traffic category—e.g., because of latency requirements, NFAC-based NHDs may have to be used for front-haul traffic, and because of security and other reasons a non-NFAC NHD may have to be used for control plane messages.

Figure 19:
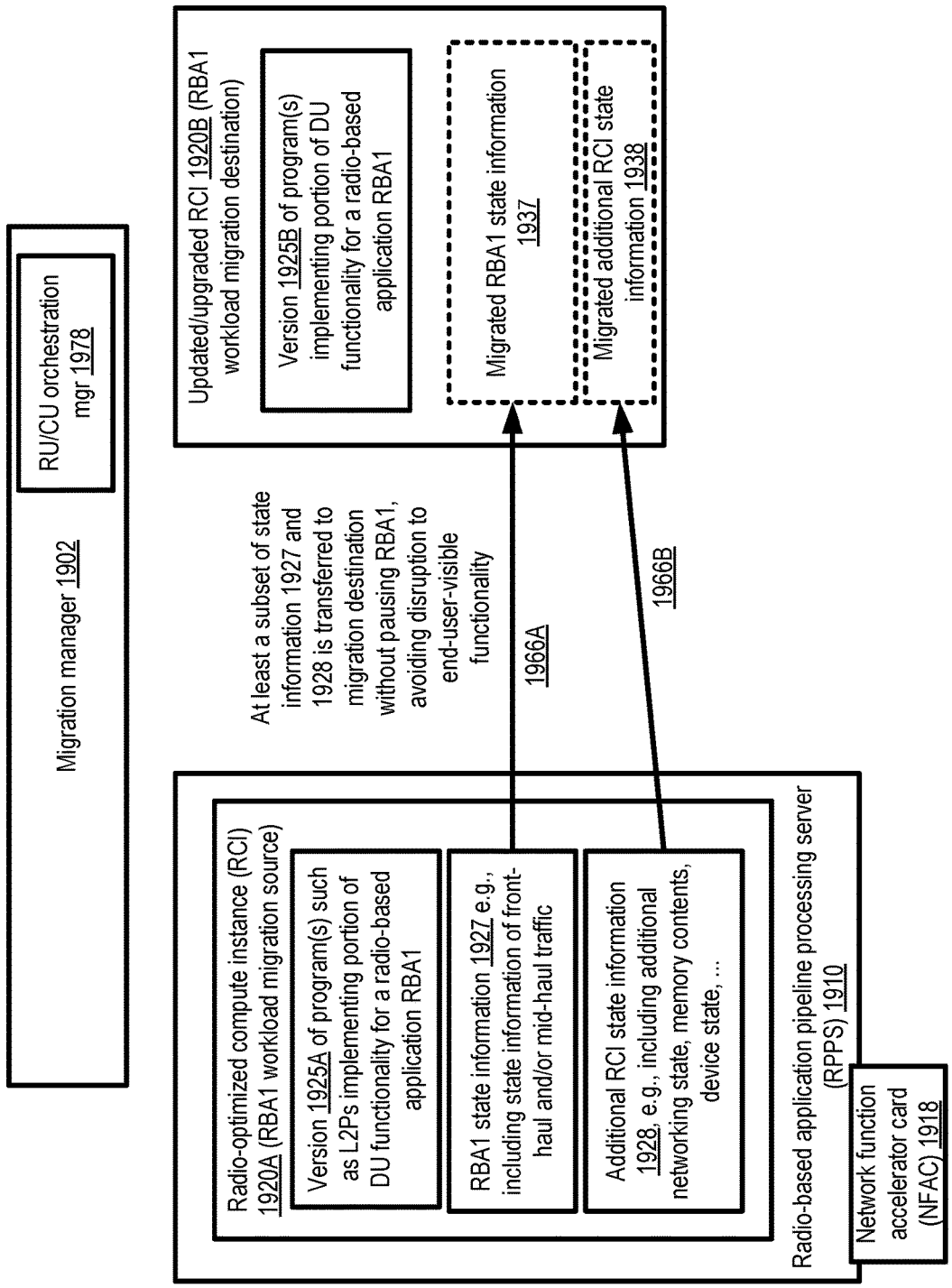
FIG. 19 illustrates an example of a migration technique that may be employed for radio-based applications, according to at least some embodiments.

In some scenarios, as indicated earlier, at least a portion of the DU (distributed unit) workload of a radio-based application (RBA) may be implemented using software programs executed within isolated runtime environments (RTEs) such as radio-optimized compute instances (RCIs) at RPPSs of an extension resource group (ERG). Under some circumstances, it may be advisable to migrate the RBA functionality from one RTE to another. FIG. 19 illustrates an example of a migration technique that may be employed for radio-based applications, according to at least some embodiments. In the example scenario depicted in FIG. 19, an RCI 1920A may be instantiated at an RPPS 1910 equipped with an NFAC 1918 at a premise external to the provider network. The RCI 1920A may comprise a version 1925A of one or more programs (such as an L2 implementation program or L2P) which perform part of the DU (distributed unit) functionality of a radio-based application RBA1. RBA1 may include other layers as well, such as a centralized unit (CU) layer and an RU layer, which may be run on resources other than the RPPS 1910. In order to implement the DU functionality, state information pertaining to messages or traffic between pairs of layers of RBA1 may be maintained at the RCI and accessed by the version 1925A of the programs. Such RBA1 state information 1927 may include, for example, state information pertaining to front-haul traffic (DU-RU traffic) as well as mid-haul traffic (DU-CU traffic) in the depicted embodiment.

A migration manager 1902 of the VCS, implemented for example using hardware and/or software of the VCS control plane, and similar in functionality to the migration managers 103 shown in FIG. 1, may be responsible for detecting triggering conditions for migrating the RBA1 workload that was initially run at RCI 1920A of RPPS 1910 to another RCI 1920B in the depicted embodiment. One or more agents of the migration manager may run locally at the RPPS 1910 in some embodiments, e.g., as part of a virtualization management layer or as part of RCI 1920A. Any of a variety of triggering conditions may lead to a migration in different embodiments, such as a receipt of a programmatic request to upgrade the programs implementing L2 or DU functionality, performance metrics, detection of errors at the RPPS 1910, and so on.

In the embodiment depicted in FIG. 19, a determination may be made by the migration manager 1902 that at least a subset of the operations of RBA1 are to be migrated to an updated/upgraded RCI 1920B. RCI 1920A may be referred to as the RBA1 workload migration source, and RCI 1920B may be referred to as the RBA1 workload migration destination in the depicted embodiment. RCI 1920B may include a version 1925B of the programs implementing DU functionality of RBA1 in the example scenario of FIG. 19. Version 1925B may comprise an updated/upgraded version of the DU implementation programs (whose earlier version was version 1925A) in the depicted embodiment.

In response to the determination that RBA1 is to be migrated, state information that needed to run the RBA DU operations at RCI 1920B may be transferred to RCI 1920B in various embodiments. At least a subset of state information 1927A of the mid-haul and/or front-haul traffic of RBA may be transferred to RCI 1920A without pausing RBA1, as indicated by arrow 1966A in the depicted embodiment. Similarly, in various embodiments, at least a subset of additional RCI state information 1928 (such as networking state information pertaining to traffic categories other than front-haul or mid-haul traffic, memory contents, device state information and the like) may also be transmitted to RCI 1920B without pausing RBA1 or other applications running at RCI 1920A, as indicated by arrow 1966B. This type of state transfer, which may involve multiple iterations in which incremental portions of state information which have been modified since the last iteration are transferred, may help to avoid disruptions to end-user-visible functionality of RBA1 and/or other applications run at RPPS 1910. Eventually, after all the state information that can be transferred without pausing RBA1 has been sent to RCI 1920B, RBA1 may be paused briefly to transfer any remaining state information in the depicted embodiment. Eventually, after the state information has been fully transferred, operations of RBA1's DU may be initiated at updated/upgraded RCI 1920B, where they may resume DU functionality using migrated RBA1 state information 1937 in the depicted embodiment. Migrated additional RCI state information 1938 may be used to resume other operations which were earlier run at RCI 1920A in the depicted embodiment.

In various embodiments, a migration manager 1902 may include one or more orchestration managers, such as RU/CU orchestration manager 1978, responsible for coordinating the migration of DU functions with other components (such as CU layer components or RU layer components) of RBA1. For example, the other components may be notified via one or more messages regarding the pending migration of the DU, so that the other components can perform one or more preparatory operations (e.g., saving or backing up their own state information in case the migration fails for some reason).

Figure 20:
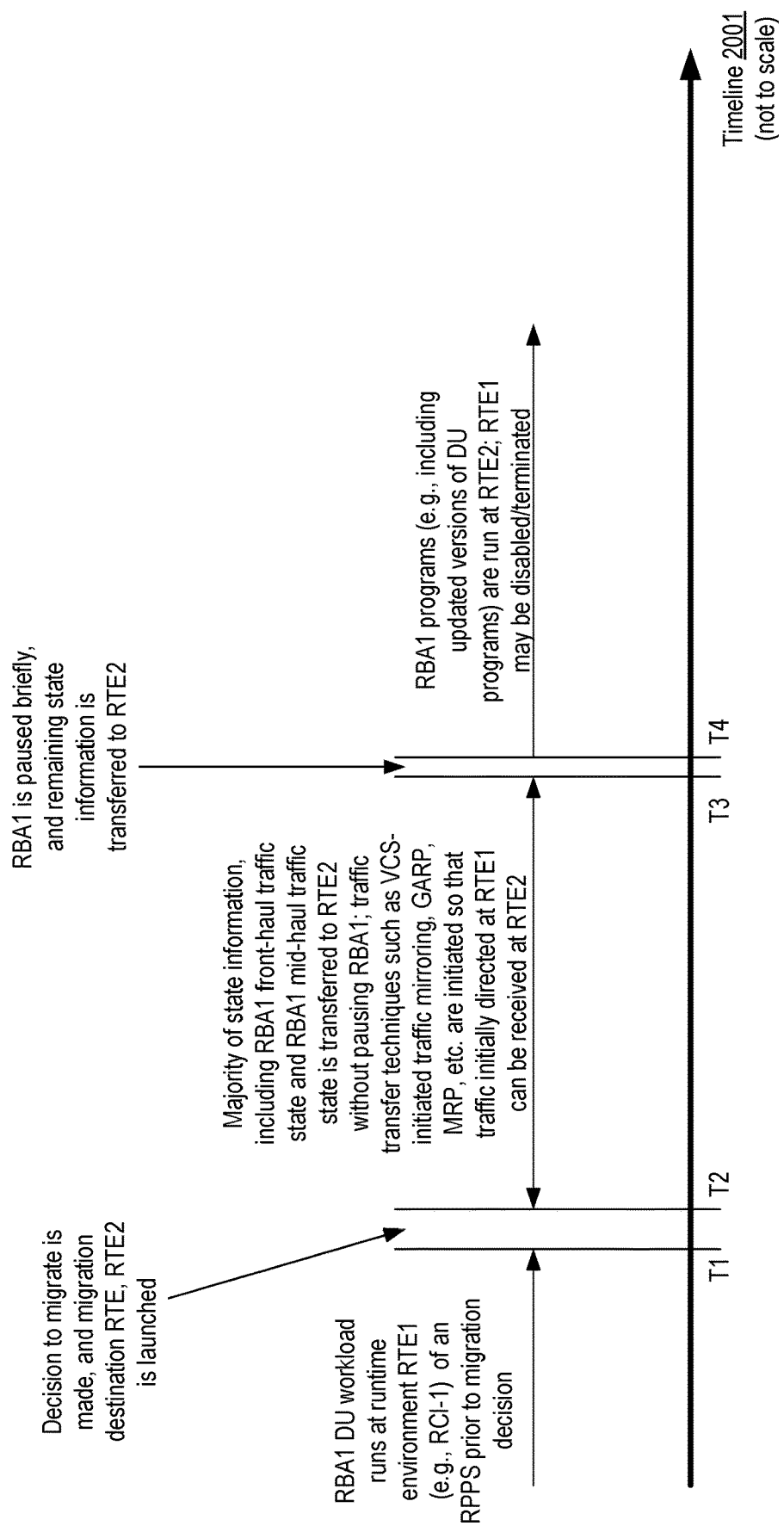
FIG. 20 illustrates an example timeline of events during a migration of a radio-based application, according to at least some embodiments.

FIG. 20 illustrates an example timeline of events during a migration of a radio-based application, according to at least some embodiments. During a time interval prior to T1 of timeline 2001, DU workload of an RBA RBA1 may be run at a runtime environment RTE1 (e.g., an RCI RCI-1) of an RPPS, and a migration decision may not have been made regarding RBA1. Between T1 and T2, a decision to migrate RBA1's DU operations may be made, and a migration destination RTE2 may be launched. Note that in some cases, RTE2 may be launched by (i.e., at the explicit request of) the client on whose behalf RBA1 is run at the RPPS. For example, the client may obtain an indication from a third-party provider that an upgraded L2 implementation program is available, the client may request the launch of RTE2 with the new version of the L2 implementation program, and the client may then inform the VCS control plane via programmatic interfaces that RTE2 has been launched and that the DU operations of RBA should be transitioned to RTE2. In other cases, the client may simply submit a software upgrade request for RBA1's DU operations, and RTE2 may be launched by the provider network with a new version of the DU implementation programs.

During the time interval T2 to T3 along timeline 2001, the majority of state information needed to perform RBA1 DU functions at RTE2 may be transferred to RTE2, while the DU functions continue to run at RTE1 in the depicted scenario. The state information transferred during this time period may include RBA1 front-haul traffic state and RBA1 mid-haul traffic state, for example. In at least some embodiments, traffic transfer techniques such as VCS-initiated traffic mirroring, techniques that utilize GARP, MRP, and/or virtual MAC addresses may be initiated during the T2-T3 time interval so that traffic initially directed at RTE1 can begin to be received at RTE2.

At time T2 along timeline 2001, the transfer of all the state information that could be transferred without pausing RBA1 or RTE1 may be complete in the depicted example scenario. RBA1 may be paused briefly, and any remaining state information may be transferred to RTE2 by T4. After T4, RBA1 programs (e.g., including updated versions of DU programs) can be run at RTE2 in the depicted embodiment. In at least some embodiments, after the migration process is completed, RTE1 may be disabled or terminated.

Figure 21:
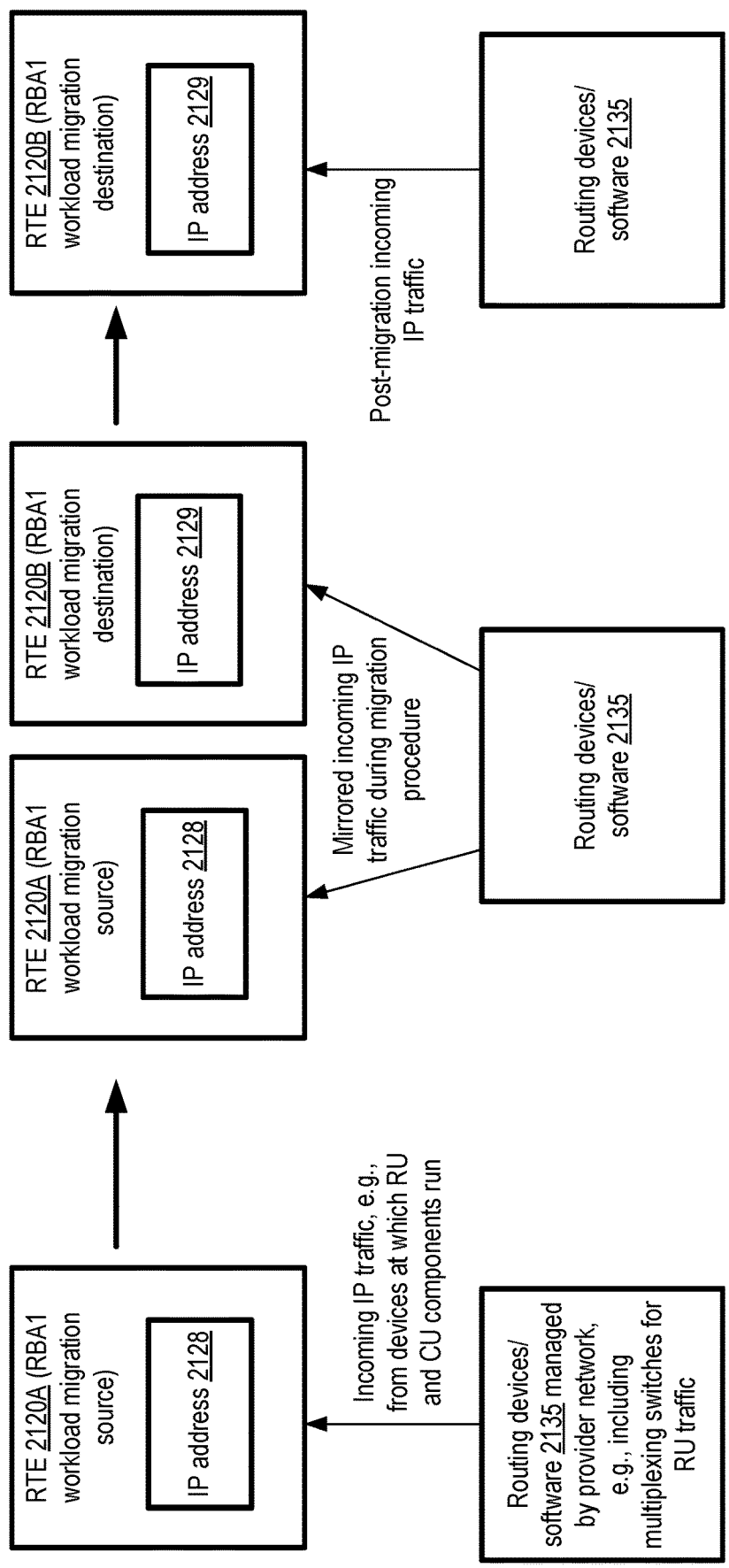
FIG. 21 illustrates an example of the use of traffic mirroring to facilitate migration of a radio-based application, according to at least some embodiments.

FIG. 21 illustrates an example of the use of traffic mirroring to facilitate migration of a radio-based application, according to at least some embodiments. In the embodiment depicted in FIG. 1, programs implementing DU functions of a radio-based application RBA1 are run initially at a runtime environment RTE 2120A, the migration source from which the programs are to be migrated. A set of routing components including routing devices or software 2135 directs incoming IP traffic of RBA1 to IP address 2128 of RTE 2120A, e.g., from devices at which RU and/or CU components of RBA1 are run. The routing devices may be managed at least in part by the provider network, and may include multiplexing switches of the kind shown in FIG. 8 for DU-RU traffic in some embodiments. Routing software may include network management components at the devices at which the RUs and/or CUs are run in various embodiments.

After a decision to migrate RBA1 DU components from RTE1 to a different RTE is made, and RTE 2120B has been launched, e.g., either by the client on whose behalf RBA1 is being run or by the provider network without an explicit request from the client, the routing devices/software 2135 may start duplicating or mirroring the incoming IP packets to both RTE 2120A and RTE 2120B (which has a different IP address 2129) in the depicted embodiment for at least some time period of the migration procedure. During this time period, some of the incoming IP packets may be stored in queues at the RBA1 migration workload destination RTE 2120B in some implementations.

After state information needed to migrate RBA1 programs to RTE 2120B has been transferred to RTE 2120B, the mirroring of IP packets may be terminated, and the functionality of RBA1's DU which was earlier executed at RTE 2120A may now be executed at RTE 2120B. If needed, some of the queued packets may be processed to ensure a smooth transition of the DU functionality. The mirroring approach illustrated in FIG. 21 represents one example of a traffic transition algorithm which may be employed in some embodiments in which a portion of an RBA is migrated from one RTE to another (or an entire RTE comprising a portion of an RBA is migrated). Other traffic transition algorithms employed in different embodiments may involve the use of GARP, MRP and/or virtual MAC addresses.

Figure 22:
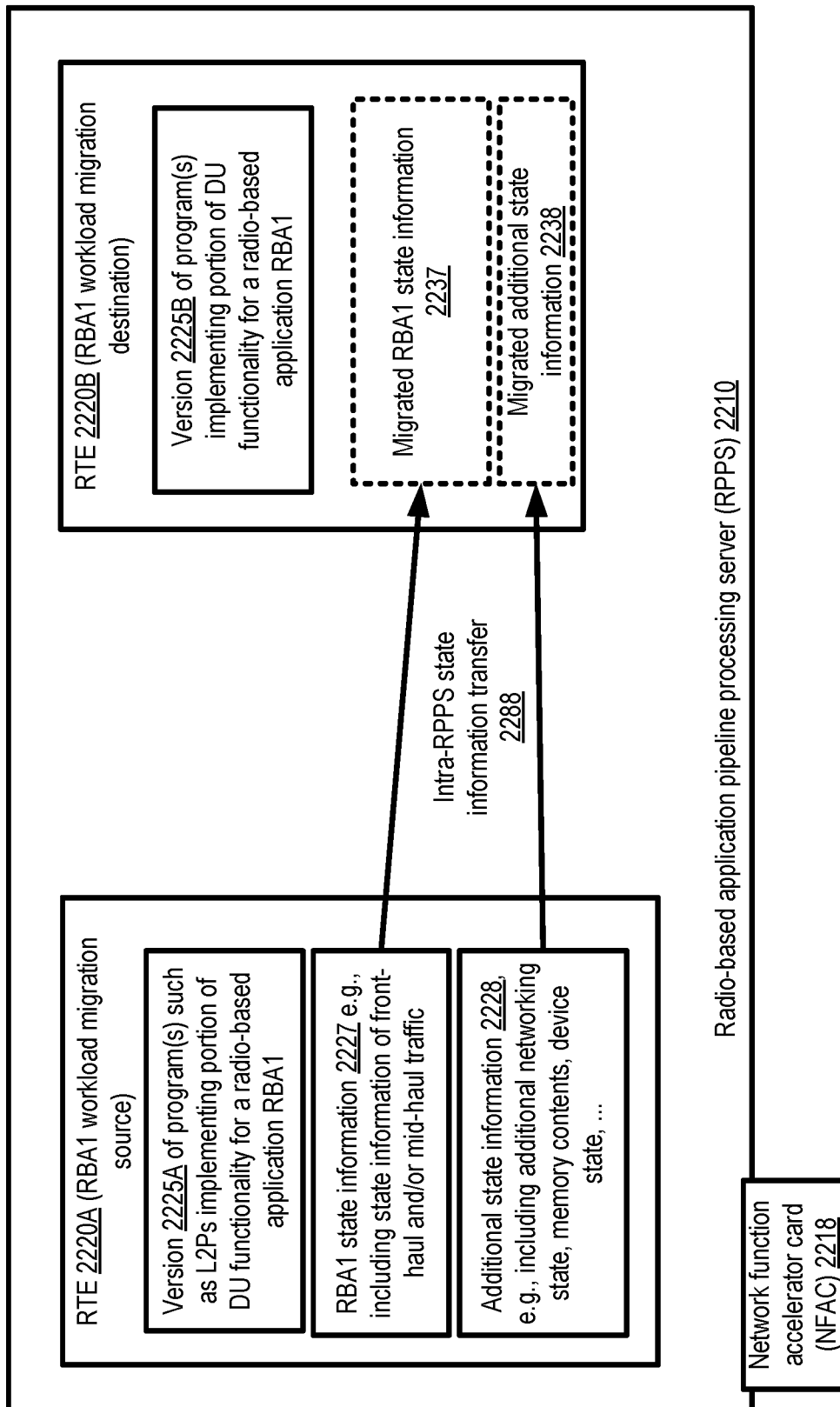
FIG. 22 illustrates an example of a migration of a radio-based application between runtime environments at a radio-based application pipeline processing server, according to at least some embodiments.

FIG. 22 illustrates an example of a migration of a radio-based application between runtime environments at a radio-based application pipeline processing server, according to at least some embodiments. In the example scenario shown in FIG. 22 an RPPS 2210 comprises an NFAC 2218 and an RTE 2220A at which version 2225A of programs implementing DU functionality of a radio-based application RBA1 are run for some time period.

A second RTE 2220B comprising version 2225B of the DU programs may be launched at the RPPS 2210 in the depicted embodiment. At least a portion of RBA1 state information 2227 (including state information pertaining to messages of front-haul traffic between the DU and RBA1's RU(s), as well as state information pertaining to messages of mid-haul traffic between the DU and RBA1's CU(s)) may be transferred to RTE 2220B as part of the migration of the DU programs, without pausing RBA1. Additional state information 2228 pertaining to other portions of RTE 2220A's workload, such as state information regarding packet flows of other kinds of network traffic, memory contents, device state information and the like may also be transferred to RTE 2220B, as part of intra-RPPS state information transfer 2288 in the depicted embodiment.

After all the state information needed for the applications (including RBA1's DU) which were running initially at RTE 2220A has reached the RBA1 workload migration destination RTE 2220B, the DU and other applications may start their operations at RTE 2220B. Version 2225B of the DU programs may be used, as well as migrated RBA1 state information 2237 and migrated additional state information 2238.

Figure 23:
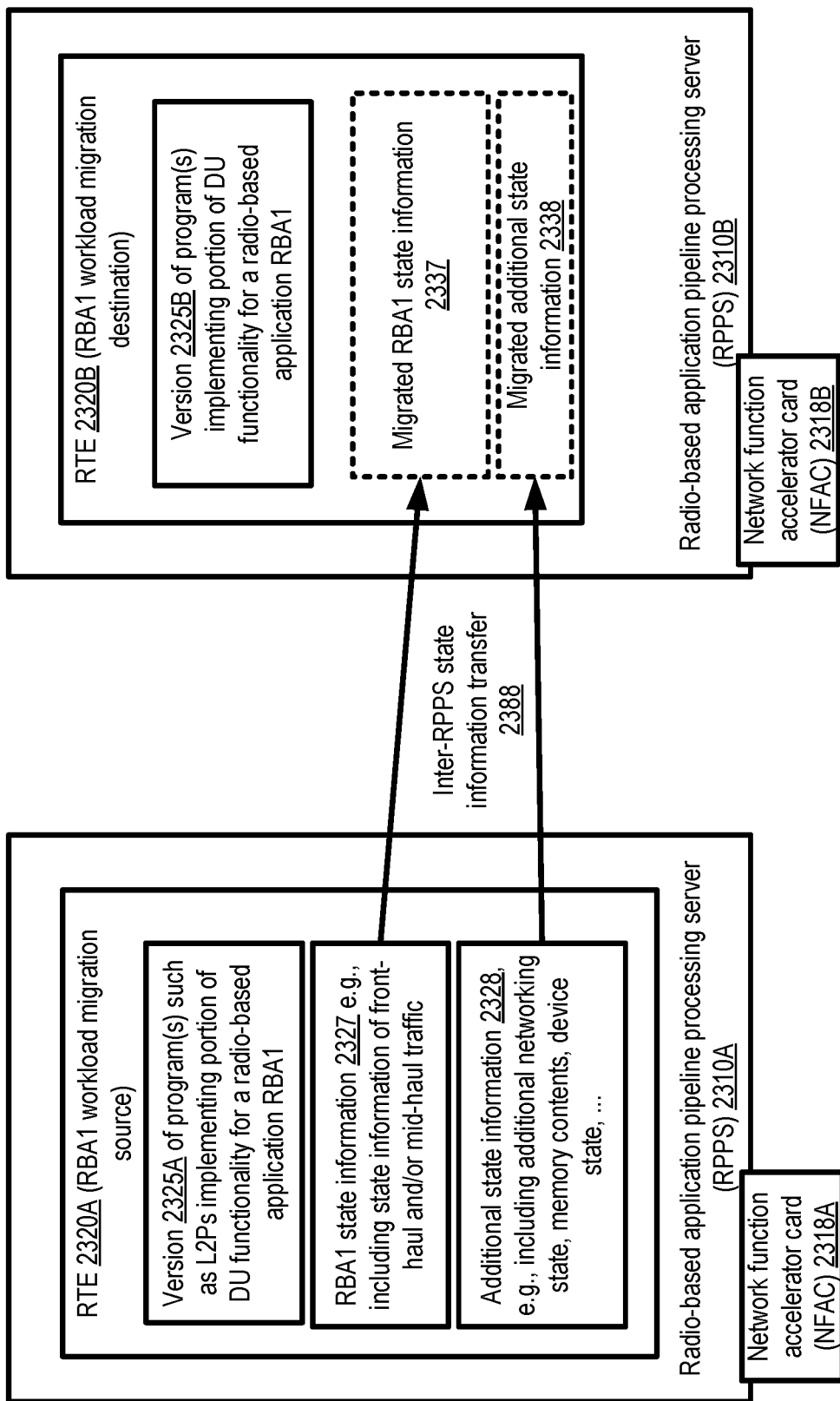
FIG. 23 illustrates an example of a migration of a radio-based application between runtime environments at different radio-based application pipeline processing servers, according to at least some embodiments.

FIG. 23 illustrates an example of a migration of a radio-based application between runtime environments at different radio-based application pipeline processing servers, according to at least some embodiments. In the example scenario shown in FIG. 23, an RPPS 2310A comprises an NFAC 2318A and an RTE 2320A at which version 2325A of programs implementing DU functionality of a radio-based application RBA1 are run for some time period.

A second RTE 2320B comprising version 2325B of the DU programs may be launched at a different RPPS 2310B in the depicted embodiment. RPPS 2310B may include NFAC 2318B. At least a portion of RBA1 state information 2327 (including state information pertaining to messages of front-haul traffic between the DU and RBA1's RU(s), as well as state information pertaining to messages of mid-haul traffic between the DU and RBA1's CU(s)) may be transferred to RTE 2320B as part of the migration of the DU programs, without pausing RBA1. Additional state information 2328 pertaining to other portions of RTE 2320A's workload, such as state information regarding packet flows of other kinds of network traffic, memory contents, device state information and the like may also be transferred to RTE 2320B, as part of inter-RPPS state information transfer 2388 in the depicted embodiment.

After all the state information needed for the applications (including RBA1's DU) which were running initially at RTE 2320A has reached the RBA1 workload migration destination RTE 2320B, operations of the DU and other applications may be started at RTE 2320B. Version 2325B of the DU programs may be used, as well as migrated RBA1 state information 2337 and migrated additional state information 2338. The RPPS at which the migration destination RTE is launched (i.e., whether the same RPPS as the workload migration source's RPPS should be used, or whether a different RPPS at the VCS extension site is to be used) may be selected based on a variety of factors in different embodiments. Such factors may include the resource utilization level at the source RPPS and/or at potential destination RPPSs available at the same premise, the preference of the client (who may specify the RPPS at which a given RTE such as an RCI is to be launched), the total amount of state information which has to be transferred (since transfer of a given amount of state information within the same RPPS is likely to be quicker than transfer across RPPSs), available bandwidth and anticipated latency for inter-RPPS state information transfer, etc.

Figure 24:
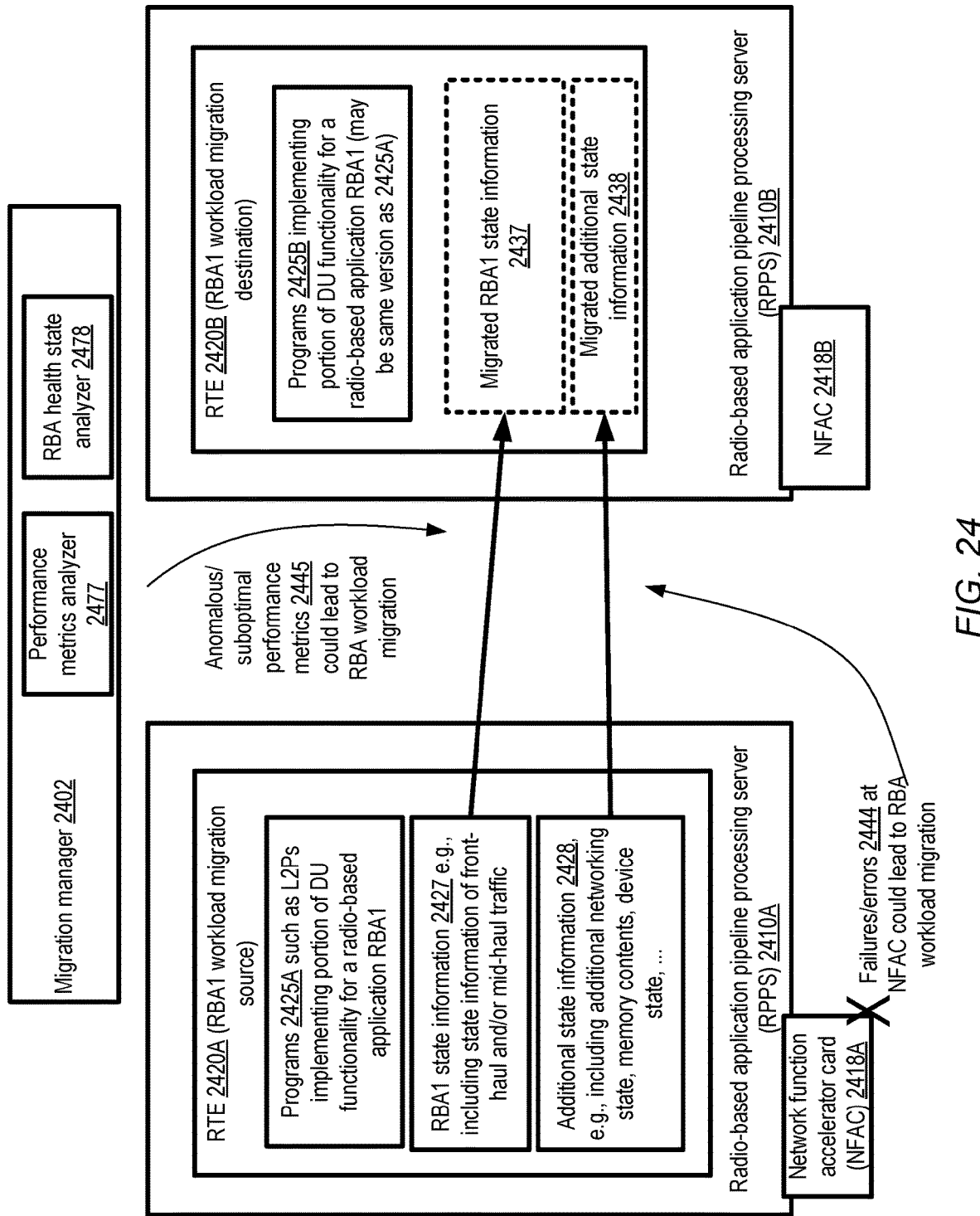
FIG. 24 illustrates examples of automated triggering of migration of a radio-based application, according to at least some embodiments.

In some cases, as indicated earlier, RBA application components may be migrated from one RTE to another to upgrade the versions of the DU software (or other RBA software). RBA migrations may also be triggered for other reasons in some embodiments. FIG. 24 illustrates examples of automated triggering of migration of a radio-based application, according to at least some embodiments. In the example scenario shown in FIG. 24, an RPPS 2410A comprises an NFAC 2418A and an RTE 2420A at which version 2425A of programs implementing DU functionality of a radio-based application RBA1 are run for some time period.

One or more failures 2444 detected at NFAC 2418A, e.g., by an RBA health state analyzer 2478 of a migration manager 2402, may prompt the migration of the DU programs to a second RTE 2420B at a different RPPS 2410B in the depicted embodiment. Version 2425B of the DU programs, which is included within the RTE 2420B, may in at least some cases be the same version as version 2425A. RPPS 2410B may include NFAC 2418B. At least a portion of RBA1 state information 2427 (including state information pertaining to messages of front-haul traffic between the DU and RBA1's RU(s), as well as state information pertaining to messages of mid-haul traffic between the DU and RBA1's CU(s)) may be transferred to RTE 2420B as part of the migration of the DU programs, without pausing RBA1. Additional state information 2428 pertaining to other portions of RTE 2420A's workload, such as state information regarding packet flows of other kinds of network traffic, memory contents, device state information and the like may also be transferred to RTE 2420B in the depicted embodiment.

After all the state information needed for the applications (including RBA1's DU) which were running initially at RTE 2420A has reached the RBA1 workload migration destination RTE 2420B, operations of the DU and other applications may be started at RTE 2420B. Migrated RBA1 state information 2437 and migrated additional state information 2438 may be used for the applications.

According to at least some embodiments, RBA functionality may be migrated across RTEs as a result of a detection of anomalous or suboptimal performance metrics 2445, e.g., by a performance metrics analyzer 2477 of the migration manager 2402. IN other embodiments, RBA functionality may be migrated from one RPPS to another if/when improved or upgraded versions of hardware devices such as NFACs become available. Thus, the reasons for migrating RBA operations or workloads from one RTE to another may include some combination of software upgrades, hardware upgrades, errors/failures, performance problems, and the like in different embodiments.

Figure 25:
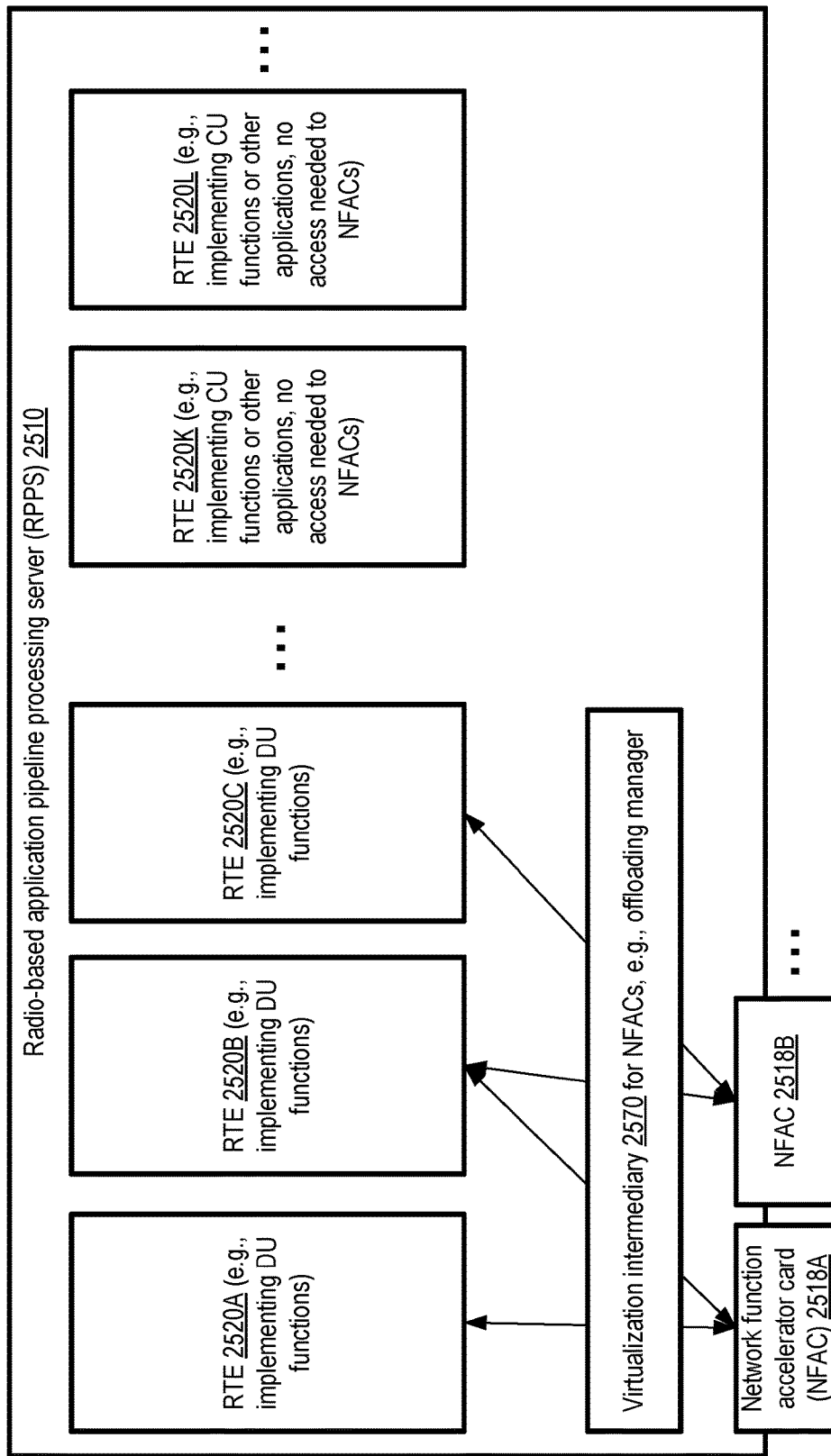
FIG. 25 illustrates an example of a radio-based application pipeline processing server at which one subset of runtime environments is granted access to network function accelerator cards of the server, while another subset of runtime environments is not granted access to the network function accelerator cards, according to at least some embodiments.

In some embodiments, multiple RTEs may be launched at a given RPPS which has several different NFACs, and some of the RTEs may be used to run DU workloads which require access to the NFACs, while others may run applications which do not require access to the NFACs. FIG. 25 illustrates an example of a radio-based application pipeline processing server at which one subset of runtime environments is granted access to network function accelerator cards of the server, while another subset of runtime environments is not granted access to the network function accelerator cards, according to at least some embodiments. As shown, RTEs 2520A, 2520B, 2520C, 2520K and 2520L may be launched at RPPS 2510 in the depicted embodiment. RPPS 2510 may be equipped with several NFACs, such as NFAC 2518A and NFAC 2518B at which one or more categories of network functions of the physical layer of radio-based applications can be run.

In the embodiment depicted in FIG. 25, RTEs 2520A-2520C may implement a portion of the DU functionality of one or more radio-based applications. To implement the DU functionality, each of these RTEs may be granted access to (i.e., permitted to send requests to) one or more NFACs. For example, software components such as L1 request handlers of the kind discussed earlier may submit requests for physical layer functions to a virtualization intermediary 2570 for the NFACs of the RPPS, such as an offloading manager, and the virtualization intermediary may transmit each of the requests to an NFAC 2518. Not all the RTEs implementing DU functionality may be permitted to send requests to all the NFACs in some embodiments. For example, requests originating at RTE 2520A may be sent only to NFAC 2518A, and requests originating at RTE 2520B may be sent to either NFAC 2518A or NFAC 2518B, while requests from RTE 2520C may be sent only to NFAC 2518B in the scenario shown in FIG. 25. Virtualization intermediary 2570 may store metadata indicating the set of NFACs (if any) that can be utilized for requests from a given RTE in the depicted embodiment. The metadata may, for example, be provided from a VCS control plane resource to the virtualization intermediary.

RTEs 2520K and 2520L may each implement CU functionality or other applications, and may not need (or be granted) access to the NFACs. In some cases, one RTE at RPPS 2510 may implement DU functionality for a given radio-based application (RBA), while another RTE at the same RPPS may implement CU functionality for the same RBA, so the mid-haul traffic for that application may flow from one RTE to another within the RPPS 2510, and may not have to be transmitted over a network link.

In at least some embodiments, if and when an RTE which was performing DU operations for an RBA is unable to continue performing the DU operations for some reason (e.g., if the NFACs assigned to that RTE experience failures or errors), the DU operations may be migrated to another RTE at the same RPPS if that RTE has sufficient capacity (and access to working NFACs) using the kinds of migration techniques discussed above. Furthermore, some of the CU operations of the RBA may be migrated from an RTE such as 2520K to the RTE which is no longer used for DU functions of the RBA using the migration methodology outlined earlier. In general, in a scenario in which there are N RTEs (such as radio-optimized compute instances) running at an RPPS with M NFACs, any subset or all of the N RTEs may be granted permission to utilize any subset or all of the M NFACs in some embodiments.

Figure 26:
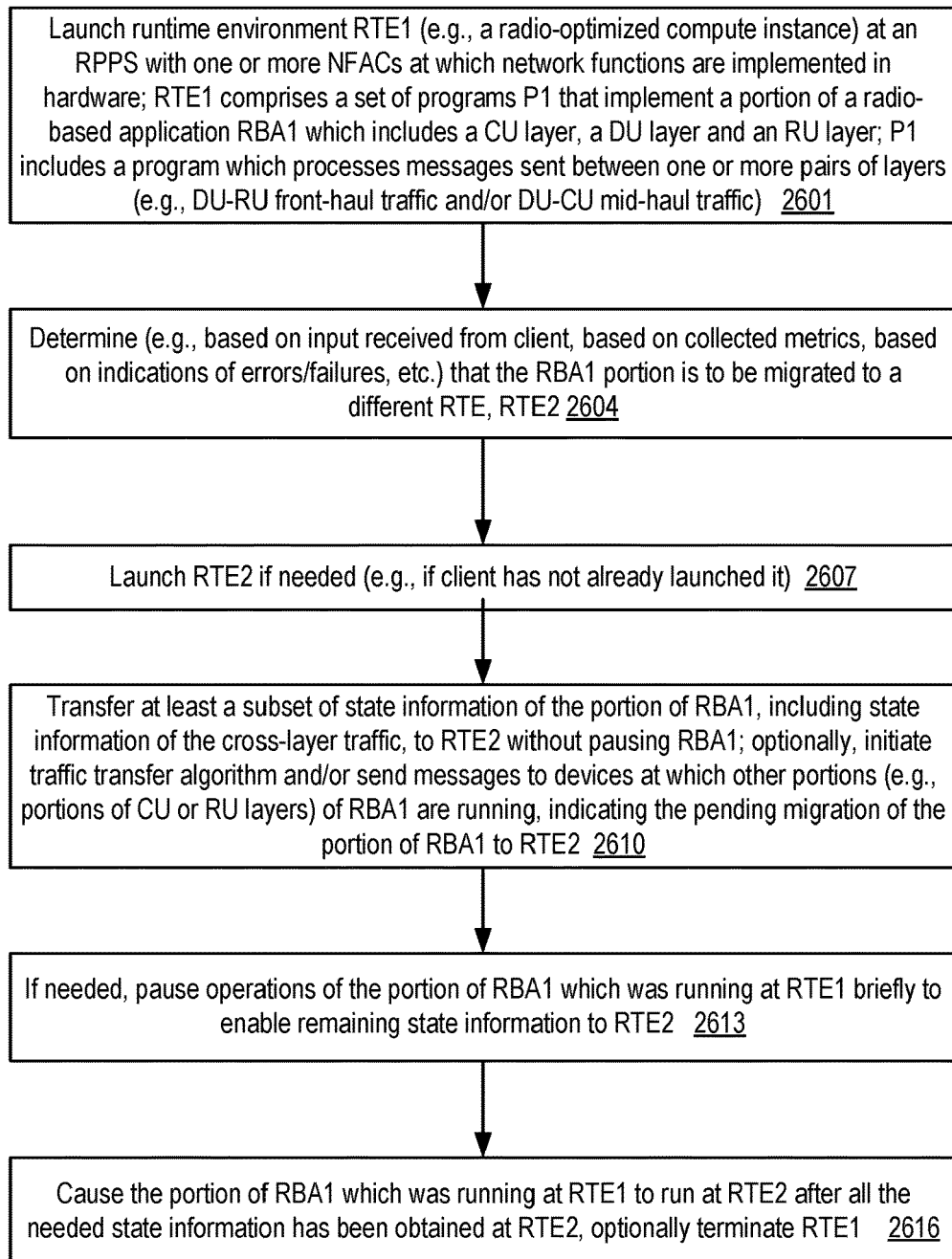
FIG. 26 is a flow diagram illustrating aspects of operations that may be performed to migrate at least a portion of a radio-based application from one runtime environment to another, according to at least some embodiments.

FIG. 26 is a flow diagram illustrating aspects of operations that may be performed to migrate at least a portion of a radio-based application from one runtime environment to another, according to at least some embodiments. As shown in element 2601, a runtime environment RTE1 may be launched at an RPPS with one or more NFACs at which network functions can be executed in hardware. RTE1 may include a set of programs P1 that collectively implement a portion of a radio-based application (RBA) RBA1. RBA1 may include a CU layer, a DU layer and an RU layer, and the set of programs P1 may include at least one program which processes messages between a pair of layers—e.g., messages of the front-haul traffic between the DU layer and the RU may be processed, messages of the mid-haul traffic between the DU and the RU may be processed, or messages of both the front-haul and mid-haul layer may be processed. One or more network functions of RBA1 may be executed at an NFAC of the RPPS in various embodiments. Note that while RBA1 comprises components at the CU, DU and RU layers, not all the layers may be implemented at the RPPS in at least some embodiments—e.g., it may be the case that only a portion of the DU layer is implemented at the RPPS, or only a portion of the CU and DU layers may be implemented, while RU layers are implemented at computing devices within a cell 154 of the kind illustrated in FIG. 1.

A determination may be made that the portion of RBA1 which was running at RTE1 is to be migrated to a different RTE, RTE2 (element 2604) in the depicted embodiment. Such a migration decision may be prompted, for example, by input received from a client on whose behalf RBA1 is being implemented at RTE1, by analysis of metrics collected from the RPPS or indications of errors/failures at the RPPS, or for other reasons such as a planned maintenance event such as a hardware upgrade in different embodiments. In some embodiments, the client may launch an RTE with an upgraded version of L2 or CU software, and request that RBA1 workloads be migrated to that RTE. In one embodiment, a client may be notified (e.g., by a third-party software vendor or by the provider network) that an upgraded version of the software programs run to implement RBA1 is available, and the client may submit an upgrade request to the provider network control plane, which may result in the migration decision.

A migration destination RTE, RTE2, may be launched for RBA1 in the depicted embodiment (element 2607) (if the client has not already caused RTE2 to be launched), e.g., at the same RPPS as RTE1 or at a different RPPS. The migration procedure for RBA may then be initiated. At least a subset of state information of the portion of RBA1 which is running at RTE1, including state information of the mid-haul traffic of RBA1 and/or the front-haul traffic of RBA1, may be transferred from RTE1 to RTE2 without pausing RBA1 in various embodiments (element 2610). At least a subset of additional state information, which may include memory contents, device state information, networking state information for traffic of other categories than mid-haul and front-haul traffic, etc. may also be transferred to RTE2 without pausing RBA1 or other applications running at RTE1.

Optionally, a traffic transfer algorithm may be initiated, or messages may be sent to devices at which other portions of RBA1 (such as portions of CU and RU functions) are running, indicating the pending migration of the portion of RBA1 to RTE2. Such messages may be sent, for example, by an RU/CU orchestration manager of the provider network in some embodiments. Traffic transfer algorithms may include traffic mirroring, and/or the use of GARP, MRP or virtualized MAC addresses in some embodiments.

If needed, the operations of RBA1 may be paused briefly at RTE1 to allow remaining state information (which cannot be transferred while RBA1 remains active or un-paused) to be transferred to RTE2 in some embodiments (element 2613). The portion of RBA1 which was running at RTE1 may be run at RTE2 after all the needed state information has reached RTE2 in the depicted embodiment (element 2616). RTE1 may optionally be terminated in some embodiments, or employed for other applications. RTE1 and/or RTE2 may comprise a radio-optimized compute instance which can access an NFAC via a virtualization intermediary, a bare-metal compute instance which can access an NFAC without using a virtualization intermediary, or a software container in different embodiments.

Figure 27:
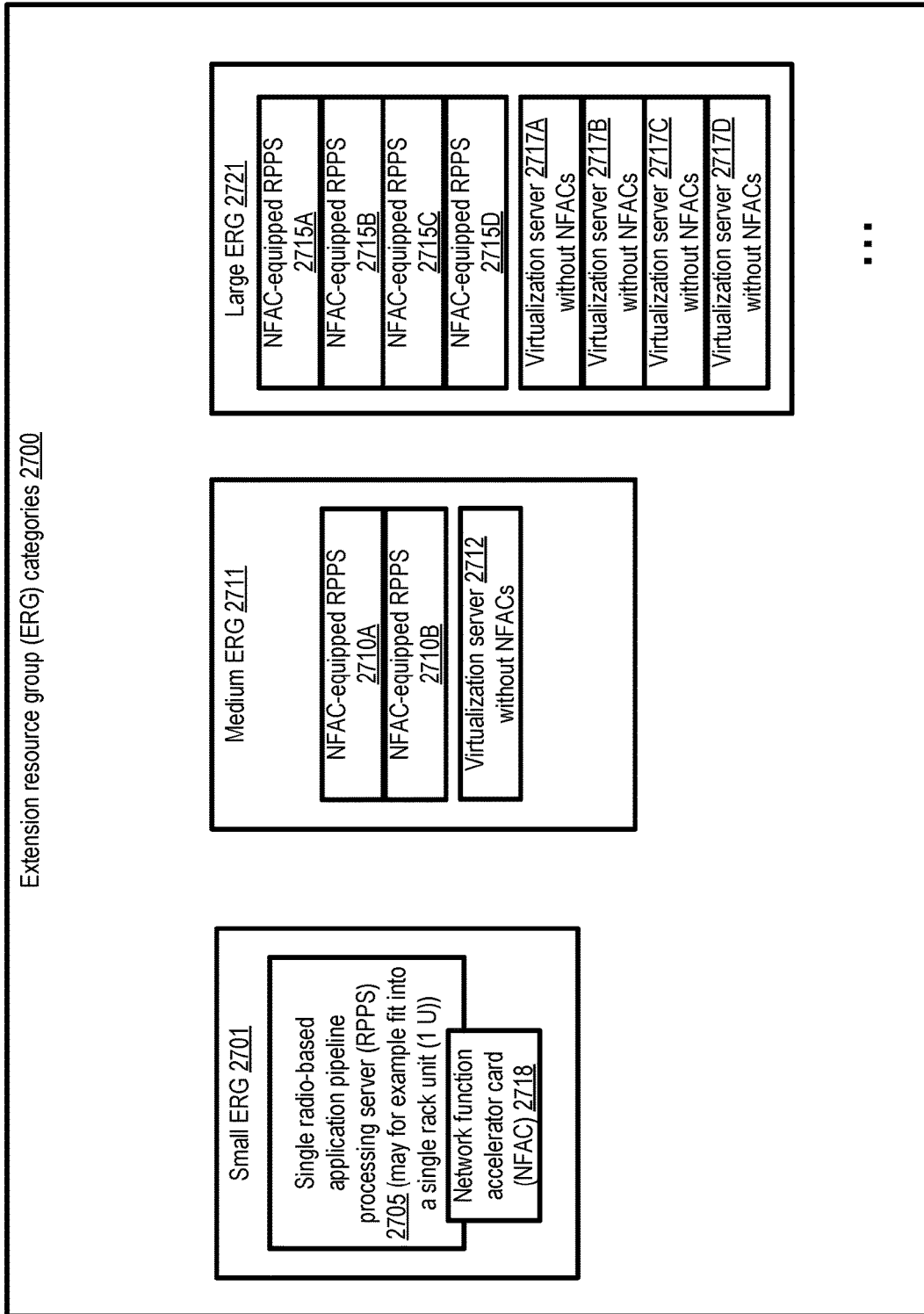
FIG. 27 illustrates example categories of extension resource groups which may be configured for radio-based applications on behalf of clients of a provider network, according to at least some embodiments.

In some embodiments, a client of a provider network may select from among several different categories of external resource groups (ERGs) for a given request to configure an ERG at a premise external to the provider network's data centers. FIG. 27 illustrates example categories of extension resource groups which may be configured for radio-based applications on behalf of clients of a provider network, according to at least some embodiments. As shown, the ERG categories 2700 supported at the provider network may include a small ERG 2701, a medium ERG 2711 and a large ERG 2721. In some cases, ERGs of each of the categories may be configurable within a single standard data center rack or a small number (e.g., two or four) of standard racks.

A small ERG 2701 may comprise a single RPPS 2705, and may fit into a single rack unit (1U), thus taking up very little space at the external premise selected by the client for the ERG. The RPPS 2705 may include a network function accelerator card (NFAC) 2718 of the kind discussed above, at which some types of network functions of radio-based applications may be executed efficiently without utilizing the primary processors of the RPPS.

A medium ERG 2711 may differ from the small ERG in the count and/or types of RPPSs that are included in various embodiments. For example, the medium ERG may comprise two NFAC-equipped RPPSs 2710A and 2710B, each comprising one or more NFACs. The medium ERG 2711 may also include a virtualization server 2712 without NFACs in the depicted embodiment. In some embodiments, different portions of a given radio-based application (RBA) may be run at NFAC-equipped servers than at servers without NFACs—for example, a portion of DU layer functionality of an RBA may be run at NFAC-equipped servers, and a portion of CU layer functionality of the RBA may be run at servers without NFACs. Compute instances of the VCS of the provider network may be launched at any of the servers of the medium ERG 2711.

A large ERG 2721 may include four NFAC-equipped RPPSs 2715A, 2715B, 2715C and 2715D, and four virtualization servers without NFACs: 2717A, 2717B, 2717C and 2717D in the depicted embodiment. Other categories of ERGs, not shown in FIG. 27, may also be supported by the provider network in some embodiments.

Clients of the provider network may request the configuration of an ERG of a given category at a selected premise, use that ERG for a while, and then if needed request that an ERG of a different category to be configured at the same premise. The different types of RBA workloads may be split across ERGs at a given premise in some embodiments—e.g., one ERG may be used primarily for DU functions, while another may be used primarily for CU functions if desired. Alternatively, all the network functions of a given RBA may be migrated from one ERG to another, and the first ERG may be terminated or disabled after the migration in one embodiment. RBA workloads and/or runtime environments such as radio-optimized compute instances at which RBAs are run may be migrated seamlessly from one ERG to another as desired in various embodiments using techniques similar to those described above, e.g., without causing interruptions or disruptions to end-user interactions of the RBAs. For example, at least a subset of state information pertaining to front-haul traffic or mid-haul traffic of an RBA may be transferred from an RPPS at one ERG to an RPPS at another ERG without requiring pauses of the RBA operations. In some cases, the RPPSs at a given ERG may differ from RPPSs at an ERG of a different category not just in number, but also in the individual performance capabilities—e.g., an NFAC-equipped server 2715 of a large ERG may comprise more or faster primary processors than a server 2710 or 2705 of the other ERG categories, or the an NFAC-equipped server 2715 of a large ERG may comprise more or faster NFACs than the servers of the other ERG categories. Similarly, a virtualization server without NFACs at a large ERG may differ in the count of processors, the size of memory, etc. from the virtualization servers at smaller ERGs in at least some embodiments.

Figure 28:
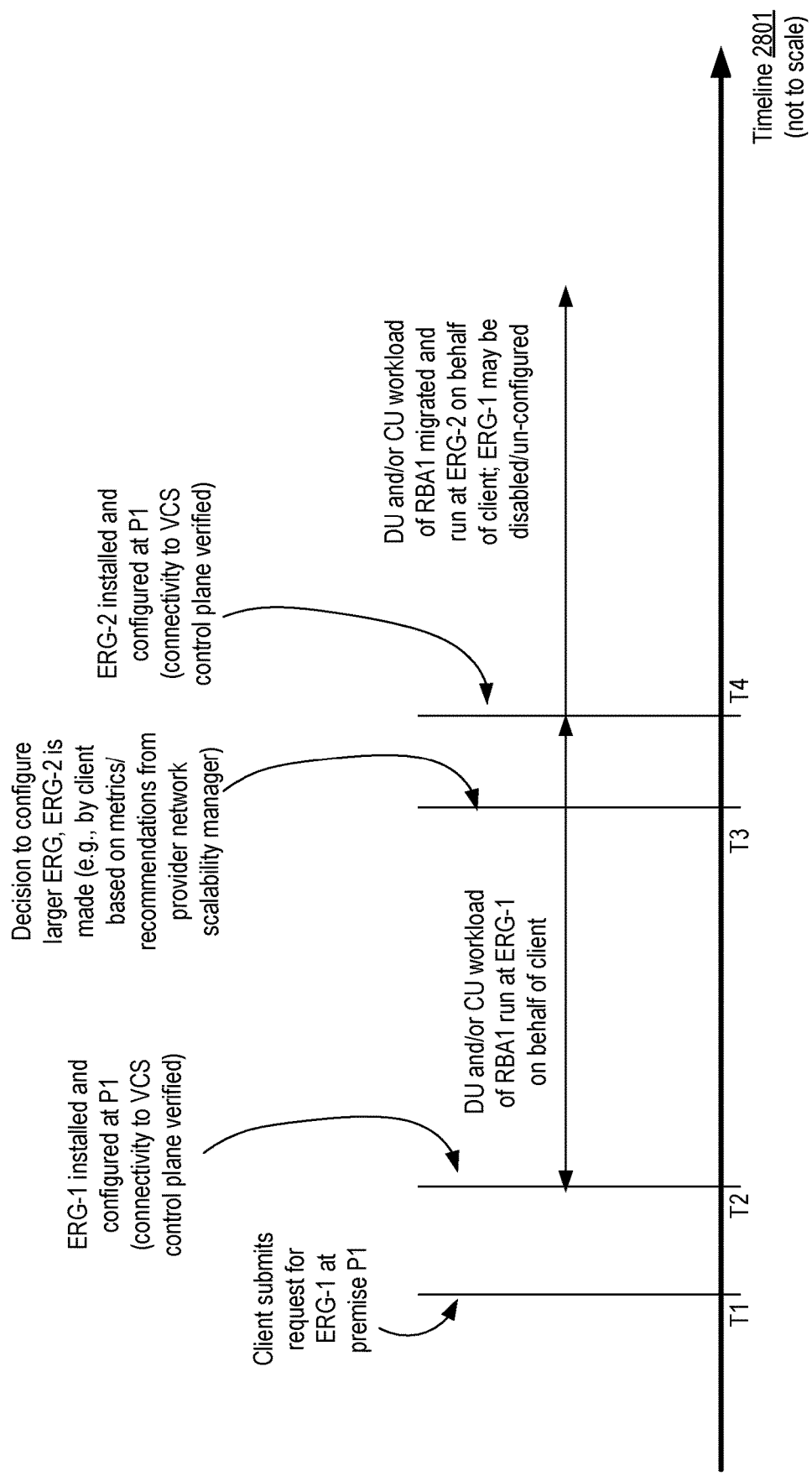
FIG. 28 and FIG. 29 illustrate respective example timelines of configuration and use of multiple extension resource groups for radio-based applications on behalf of a client of a provider network, according to at least some embodiments.
Figure 29:
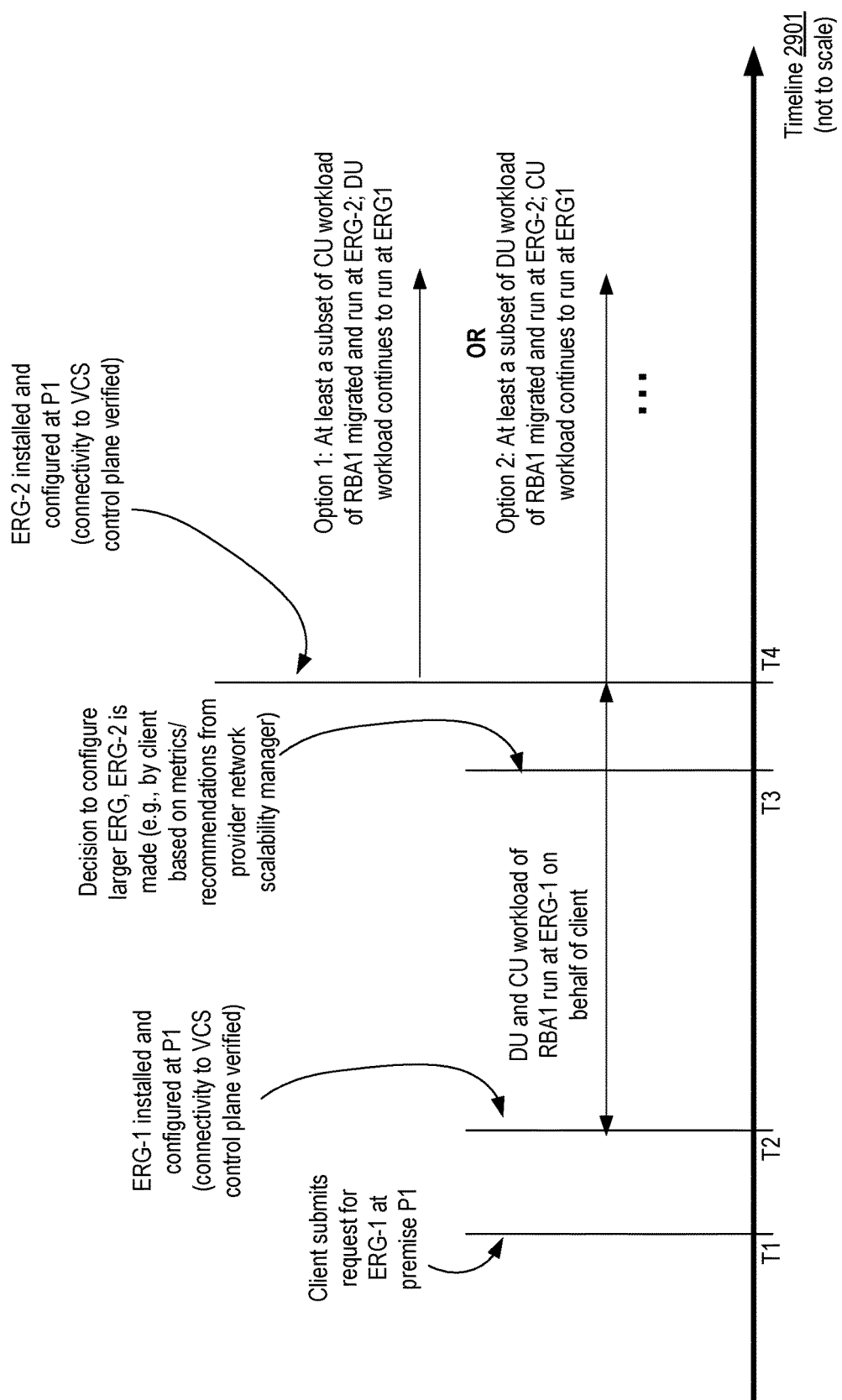

FIG. 28 and FIG. 29 illustrate respective example timelines of configuration and use of multiple extension resource groups for radio-based applications on behalf of a client of a provider network, according to at least some embodiments. In the example scenario depicted along timeline 2801 of FIG. 28, at time T1 a client of a provider network may submit a request for a first ERG, ERG-1, which is to be configured at a specified premise P1 external to the provider network. ERG-1, comprising one or more RPPSs, may be installed and configured at P1 by time T2. The configuration of the ERG may include establishing and verifying connectivity with resources of the VCS control plane of the provider network as discussed above.

Between times T2 and T4 along timeline 2801, a set of DU and/or CU network functions of an RBA RBA1 of the client may be executed at ERG-1. At a time T3, a decision to configure a larger ERG, ERG-2, at premise P1 may be made in the depicted scenario. In some embodiments, metrics collected from ERG-1 (such as performance, error and/or failure metrics) may be analyzed by a scalability manager of the provider network (similar to scalability managers 102 of FIG. 1). If the scalability manager detects absolute values of metrics that do not satisfy target quality-of-service requirements for RBA1, or if trends observed in the metrics suggest that RBA1 requirements may not be met if the trends continue, the scalability manager may transmit a recommendation to the client that a larger ERG may be required in some embodiments. In other embodiments, the client may not receive any recommendations from the provider network, but may take the decision to request the configuration of a larger ERG on the client's own initiative, e.g., in anticipation of higher workload levels of RBA1 in the future.

By time T4 along timeline 2801, the installation and configuration of ERG-2 (which may also include establishment and verification of connectivity with the VCS control plane) may be completed in the depicted scenario. After T4, the DU and/or CU workloads of RBA1 may be migrated and run at one or more servers of ERG-2 on behalf of the client. In at least some embodiments, ERG-1 may be decommissioned, disabled or un-configured, so that, for example, the client no longer has to bear expenses associated with ERG-1.

A different approach may be taken in the example scenario depicted in FIG. 29 regarding the manner in which multiple ERGs are used for a radio-based application RBA1. At time T1 along timeline 2901, a client of a provider network may submit a request for a first ERG, ERG-1, which is to be configured at a specified premise P1 external to the provider network. ERG-1, comprising one or more RPPSs, may be installed and configured at P1 by time T2. The configuration of the ERG may include establishing and verifying connectivity with resources of the VCS control plane of the provider network.

Between times T2 and T4 along timeline 2901, a set of DU and/or CU network functions of RBA1 may be executed at ERG-1. At a time T3, a decision to configure a larger ERG, ERG-2, at premise P1 may be made in the depicted scenario, e.g., by the client based on input provided by a scalability manager after analyzing metrics collected from ERG-1, or by the client without input from a scalability manager.

By time T4 along timeline 2901, the installation and configuration of ERG-2 (which may also include establishment and verification of connectivity with the VCS control plane) may be completed in the depicted scenario. After T4, the RBA operations that were originally being run entirely at ERG-1 may be distributed between the two ERGs. In one option (Option 1), at least a subset of CU network functions of RBA1 may be migrated and run at ERG2, while DU network functions may continue to run at ERG-1. In Option 2, DU workloads of RBA1 may be migrated and run at one or more servers of ERG-2 (e.g., RPPSs which include NFACs), while CU functions may continue to be run at ERG-1. In another option, not shown in FIG. 29, a subset of both CU and DU functions may be run at each of the ERGs. In general, any subset of the RBA1 operations which were initially being executed at ERG-1 may be migrated seamlessly and run at ERG-2; the subset may for example be specified by the client or determined without client input by a scalability manager of the provider network. Note that in some embodiments, functions of a single layer of the radio-based technology stack, such as only DU functions or only CU functions, may be run at both ERG-1 and ERG-2.

Figure 30:
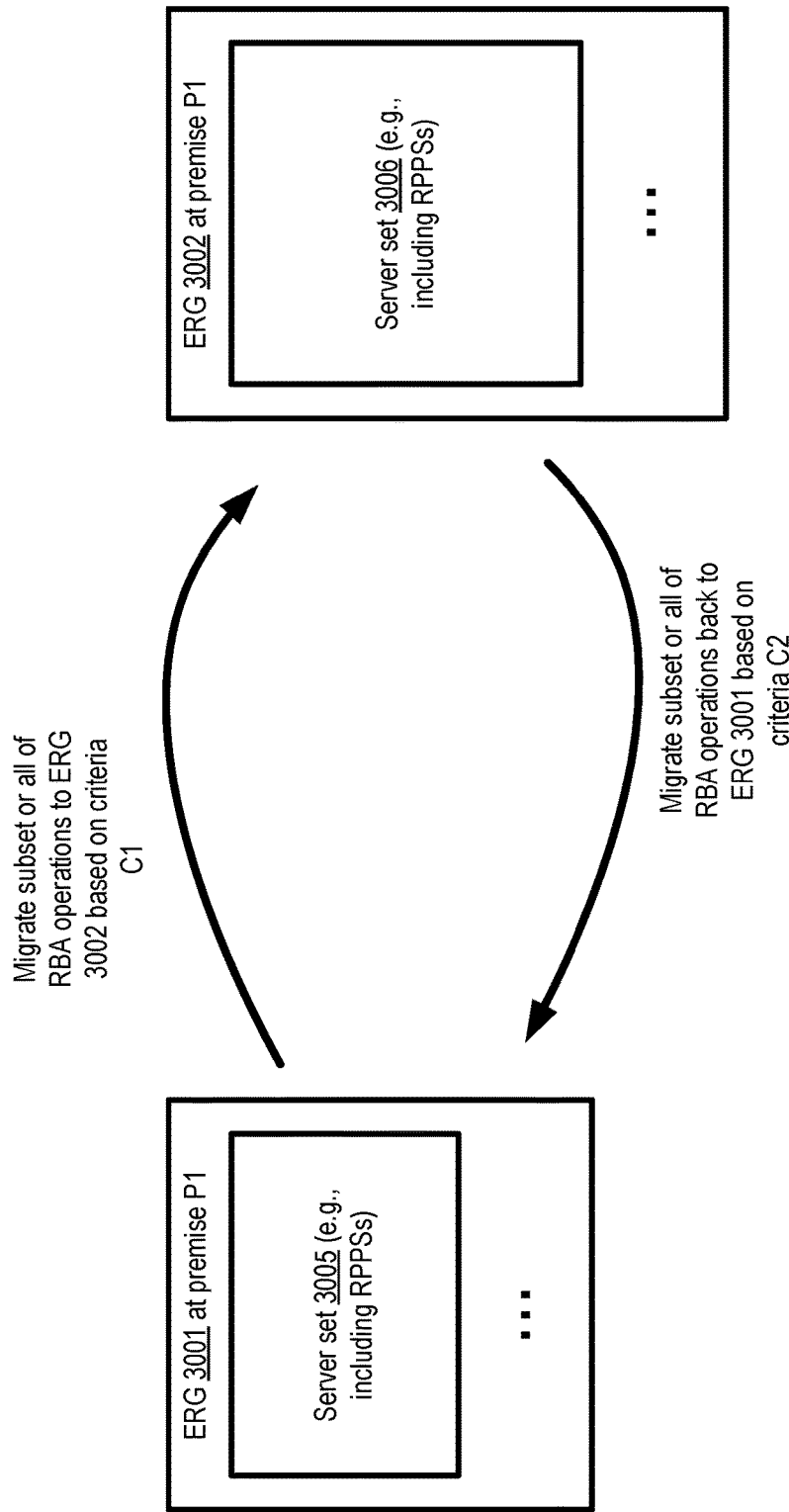
FIG. 30 illustrates an example of conditional migration of radio-based application workloads in either direction between two extension resource groups, according to at least some embodiments.

FIG. 30 illustrates an example of conditional migration of radio-based application workloads in either direction between two extension resource groups, according to at least some embodiments. In the example scenario shown in FIG. 30, an ERG 3001 at a premise P1 external to a provider network includes a server set 3005, while another ERG 3002 also configured at the same premise includes server set 3006. One or both of the sets of servers may include one or more RPPSs equipped with NFACs in the depicted embodiment.

At a given point in time, a portion of an RBA's operations may be executed at one or both of the ERGs 3001 and 3002 in the depicted embodiment. Based on a set of migration criteria C1, a subset or all of the RBA operations which were being performed at ERG 3001 may be migrated to ERG 3002, e.g., without causing interruptions or disruptions to the end users of the RBA. Similarly, based on a different set of criteria C2, a subset or all of the RBA's operations may be migrated back from ERG 3002 to ERG 3001 in the depicted embodiment, also without causing interruptions or disruptions to the end users. In effect, the two ERGs may form a pool of resources which can be utilized in a flexible manner for various network functions of an RBA, with conditional migration of RBA functionality between the ERGs. For example, initially, ERG 3001 may be used for DU layer operations of the RBA, while ERG 3002 be used for CU layer operations. If the DU layer workload level increases substantially for a sustained amount of time and remains above a threshold, as may be detected by metrics collectors of the provider network in various embodiments, a subset of the DU workload may be transferred to ERG 3002; similarly, if the CU workload increases substantially for some time period and exceeds a threshold, at least a portion of the CU workload may be transferred to ERG 3001 in the depicted embodiment. A given category of network functions (e.g., DU network functions, or CU network functions) may be migrated back and forth between the two ERGs as conditions change and different migration criteria are met in various embodiments at different points in time. The same category of network functions may be run at ERG 3001 for some time, migrated and run at ERG 3002 for a subsequent period, and then re-migrated back to ERG 3001 in at least some embodiments. For example, NFACs at either ERG 3001 or ERG 3002 may be used to execute some L1 network functions of the RBA during different time intervals or concurrently. Such flexibility regarding the specific ERG at which any given portion of an RBA is run may lead to opportunities to conserve electrical power in at least some embodiments.

FIG. 31 illustrates an example technique for conserving electrical power at a collection of extension resource groups configured at a premise of a client of a provider network, according to at least some embodiments. Note that while operators of cloud computing environments sometimes attempt to reduce electrical power consumed at their data centers, the use of migration techniques at ERGs may also enable power consumption to be reduced at client-owned premises as well in some embodiments. In the example scenario depicted in FIG. 31, a smaller ERG 3101 and a larger ERG 3102 have been configured at the same client-owned premise P1. Smaller ERG 3101 comprises a server set 3105 with one or more RPPSs, while larger ERG 3101 comprises a server set 3126 which also includes one or more RPPSs. At least some of the servers of both RPPSs have configurable or tunable power consumption settings, such as power consumption setting 3106 at server set 3105, and power consumption setting 3120 at server set 3126. The default power consumption setting may be set (e.g., by invoking programmatic power management interfaces of the servers) to a lower power consumption setting during time periods in which fewer computations are required than during normal operating conditions in the depicted embodiment.

The workload levels experienced at the two ERGs may exhibit a time varying pattern in the example scenario shown in FIG. 31. The daytime RBA workload level (e.g., for at least one category of operations belonging to the set comprising DU-level and CU-level operation categories) 3107 at ERG 3101, as detected at one or more metrics collectors of the provider network, may be high, and the nighttime workload level 3108 at ERG 3101 may be lower. Similarly, the daytime RBA workload level 3121 at ERG 3002 may be high, and the nighttime workload level 3122 at ERG 3102 may be lower.

Scalability managers or other components of the provider network may analyze the workload metrics and determine that it is possible to accommodate the night-time RBA workloads at the smaller ERG 3101 in the depicted embodiment. At least a subset of the RBA operations that were being implemented at ERG 3102 may be transferred or migrated to ERG 3101 at night, as indicated by the label associated with arrow 3194 in FIG. 31. In some implementations, if the RBA operations are being implemented within runtime environments (RTEs) (such as compute instances or software containers) for which the provider network implements migration commands/primitives, entire RTEs may be migrated from the server set of ERG 3102 to the server set of ERG 3101 at night, without for example receiving migration requests from the client specifying the particular RTEs that are to be migrated. In other implementations, RBA workloads or operations may be migrated from one RTE at ERG 3102 to another RTE at ERG 3101 using techniques similar to those described earlier (e.g., in the context of FIG. 19). Power consumption settings at one or more servers of ERG 3102 may be lowered after the migration using the power management programmatic interfaces in the depicted embodiment; that is, the nighttime power consumption setting 3127 may be set to a lower level than the default daytime setting. Power consumption settings 3106 at ERG1 may be left at the default setting during the night. In anticipation of a reversion of the high daytime RBA workload, the migrated operations of the RBA may be re-migrated back to larger ERG 3102 during the day. As a result of the automated migration back and forth between the two ERGs, the total amount of power consumed (and hence potentially the power costs) at the client owned premise P1 may be reduced in the depicted embodiment.

Note that while the example of reduction in workload levels during the night, and the resumption of higher workload levels during the day is shown in FIG. 31, similar approaches may be used for other temporal periods in different embodiments. For example, patterns of several discrete time periods of high workload during a day, week or month may be detected, and corresponding migration schedules may be constructed to conserve power in some embodiments. In at least some embodiments, the workloads may be migrated dynamically instead of based on pre-identified patterns of workload changes. For example, if the observed average levels of RBA workload at ERG 3102 remain below a threshold T1 for some time interval I1 at any time of the day, the workload may be migrated to ERG 3101, and when increases beyond a threshold T2 are sustained at ERG 3101 for some selected time interval I2, migration in the reverse direction may be initiated in some embodiments.

Figure 32:
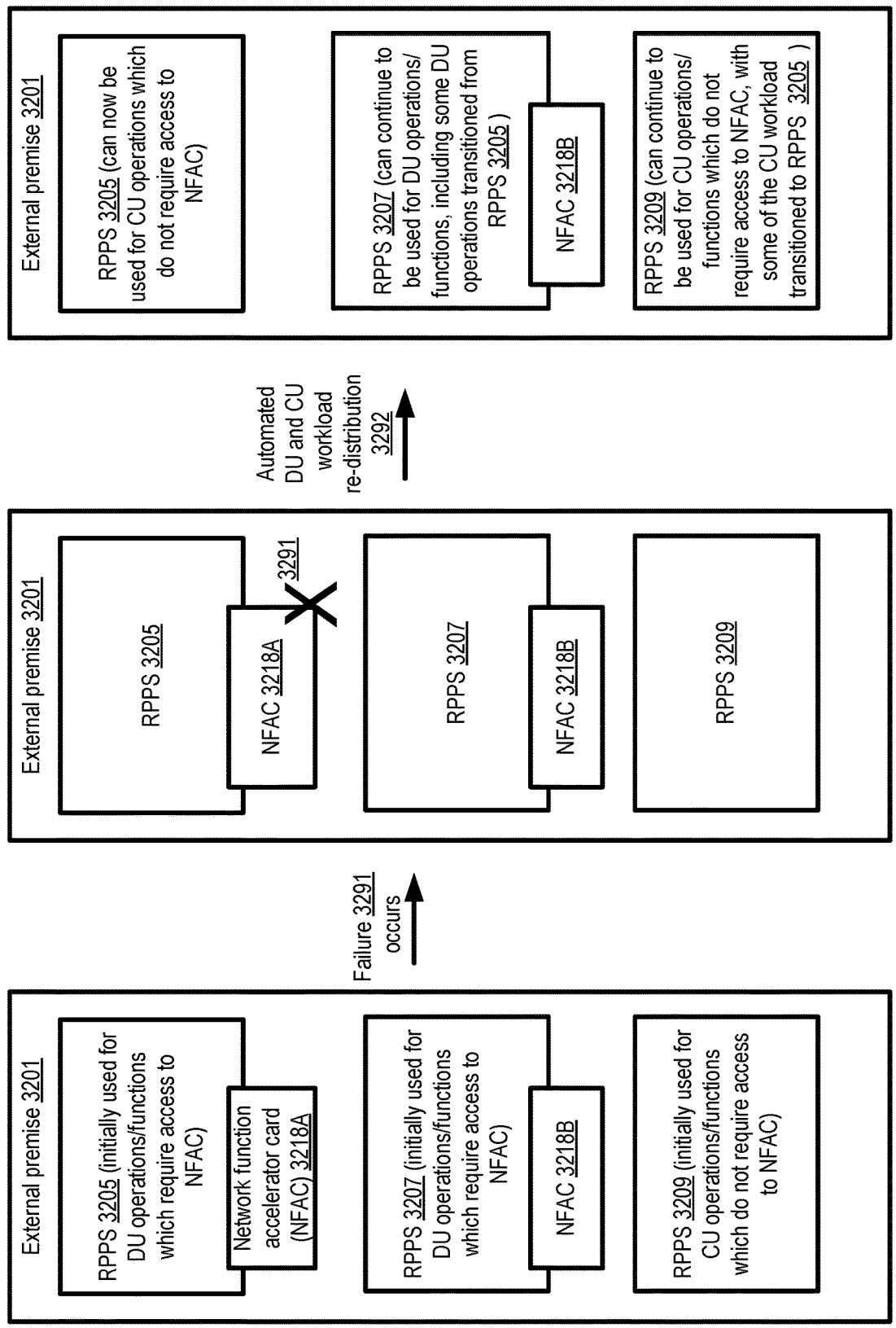
FIG. 32 illustrates an example technique for redistributing distributed unit (DU) and centralized unit (CU) operations of a radio-based application among servers of one or more extension resource groups in the event of a failure of a network function accelerator card, according to at least some embodiments.

FIG. 32 illustrates an example technique for redistributing distributed unit (DU) and centralized unit (CU) operations of a radio-based application among servers of one or more extension resource groups in the event of a failure of a network function accelerator card, according to at least some embodiments. In the example scenario shown in FIG. 32, an external premise 3201 (i.e., a premise external to the data centers of a provider network) comprises at least three RPPSs, which may be distributed among one or more extension resource groups or ERGs. RPPS 3205 comprises NFAC 3218A and RPPS 3207 comprises NFAC 3218B, while RPPS 3209 does not include an NFAC in the depicted embodiment.

For some initial time period during the lifetime of a radio-based application (RBA) of a client of the provider network, RPPS 3205A and RPPS 3207 may both the used for DU layer operations or network functions of the RBA. The DU functions may require access to NFACs (e.g., some of the DU functions may be executed at the NFACs). Meanwhile, RPPS 3209 may initially be used for CU-layer operations or network functions, which do not require access to NFACs.

At some point after the RBA's operations are distributed as described above, a failure 3291 may occur, rendering NFAC 3218A no longer usable for at least some DU functions which were being performed earlier at NFAC 3218A. In response to the detection of the failure, automated DU and/or CU workload re-distribution 3292 may be initiated, e.g., at the initiative of control plane components such as scalability managers of the VCS in the depicted embodiment. The DU operations which were earlier being performed at RPPS 3205 may be transitioned to RPPS 3207, where a working NFAC 3218B is still available. Some CU operations, which do not require NFAC access, may be transitioned from RPPS 3209 to RPPS 3205, thereby reducing the workload level of RPPS 3209. As indicated in FIG. 32, different subsets of RBA functionality may be moved from one RPPS or ERG to another at an external site in response to detection of certain types of failures or errors in at least some embodiments.

Figure 33:
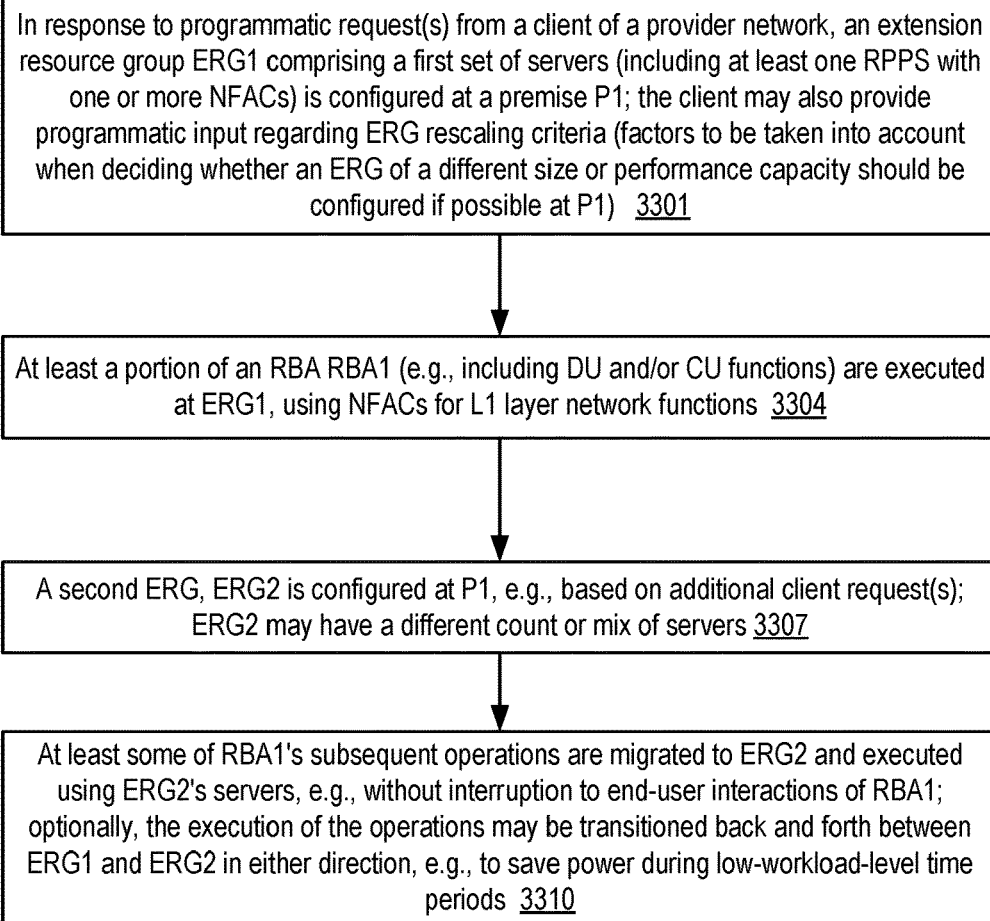
FIG. 33 is a flow diagram illustrating aspects of capacity management operations that may be performed for radio-based applications using extension resource groups of a provider network, according to at least some embodiments.

FIG. 33 is a flow diagram illustrating aspects of capacity management operations that may be performed for radio-based applications using extension resource groups of a provider network, according to at least some embodiments. As shown in element 3301, an extension resource group ERG1 comprising a first set of servers (including one or more RPPSs equipped with one or more NFACs) may be configured at a premise P1 external to a provider network's data centers in some embodiments, e.g., in response to one or more programmatic requests received from a client of the provider network. Configuration of ERG1 may include verification of network connectivity via secure pathways between an RPPS of ERG1 and control plane resources of a provider network such as extension traffic intermediaries (ETIs) of the kind shown in FIG. 1 in various embodiments. In at least some embodiments, the client may also use the programmatic interfaces to indicate ERG re-scaling criteria or factors to be taken to account when deciding whether an ERG of a different size or performance capacity should be configured if possible at P1.

At least a portion of a radio-based application RBA1 of the client may be executed at one or more servers of ERG1 (element 3304) in the depicted embodiment. For example, an NFAC attached to an RPPS of ERG1 may be used to execute some set of network functions of the physical or L1 layer of RBA1.

A second ERG, ERG2, may be configured at P1 (element 3307), e.g., in response to one or more additional client requests. In some cases the provider network control plane may transmit data-driven recommendations to the client for increasing the set of resources being used for RBA1, e.g., based on analysis of performance metrics collected from ERG1, and the client may approve the recommendations, resulting in the configuration of ERG2. As such, ERG2 may be configured in some cases based at least in part on a determination that a performance capacity of ERG1 is insufficient for a workload level of one or categories of RBA1 operations, such as DU operations, CU operations, or operations of more than one layer of RBA1. ERG2 may comprise a different count of servers or a different mix of servers in some embodiments than ERG1. For example ERG2 may represent one example of a large ERG of the kind illustrated in FIG. 27, while ERG1 may represent a small or medium ERG.

At least some of RBA1's subsequent operations, including for example DU functions and/or CU functions, may be automatically and transparently migrated to ERG2 and executed at ERG2's servers, e.g., without interrupting or disrupting end-user interactions of RBA1 (element 3310) in the depicted embodiment. Guidance or requests from the client may not be required to migrate the operations in at least some embodiments. Optionally, the execution of the operations may be transitioned back and forth between ERG1 and ERG2 in either direction, e.g., to save electrical power during low-workload-level time periods as discussed in the context of FIG. 31. In some cases, runtime environments (e.g., radio-optimized compute instances or software containers) used for executing RBA1 operations may be migrated, while in other cases workloads may be migrated from one runtime environment in one ERG to another runtime environment in the other ERG. In some cases, a subset of the network functions which were being executed at ERG1 originally, such as virtualized network functions of the DU layer or the CU layer, may continue to be executed at ERG1's servers after ERG2 is configured, while other network functions may be migrated to ERG2.

Figure 34:
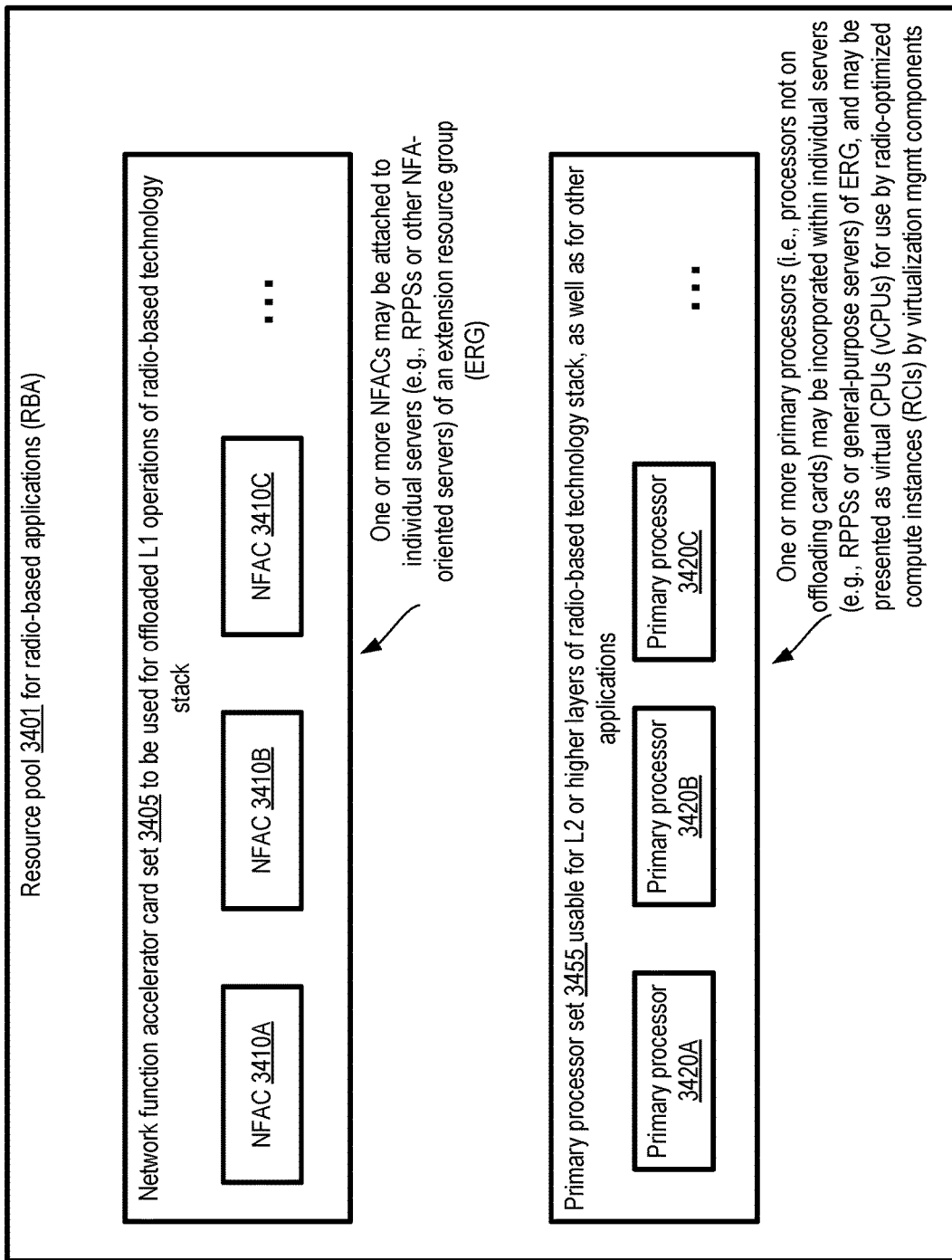
FIG. 34 illustrates an example resource pool for disaggregated processing of radio-based applications using an extension resource group of a provider network, according to at least some embodiments.

FIG. 34 illustrates an example resource pool for disaggregated processing of radio-based applications using an extension resource group of a provider network, according to at least some embodiments. In the approach illustrated in FIG. 34, a resource pool 3401 for executing network functions of a given radio-based application is modeled as comprising some number of network function accelerator cards (NFACs) and some number of primary processors (e.g., CPUs that are not incorporated within accelerator card), independently of the specific servers (e.g., RPPSs or general purpose virtualization servers) within which the NFACs or the primary processors are incorporated.

In the scenario shown in FIG. 14, NFAC set 3405 to be used for offloaded L1 operations of a radio-based technology stack includes NFACs 3410A, 3410B and 3410C. One or more of the NFACs 3410 may be attached via peripheral interconnects such as PCIe or USB to a given server of an ERG, such as an RPPS or other NFAC-oriented servers in various embodiments. An NFA-oriented server is a server dedicated primarily for L1 network function acceleration, which comprises one or more NFACs and a communication intermediary that receives L1 network function requests from other servers and causes the L1 network functions to be executed at the NFACs. Primary processor set 3455, usable for L2 or higher layers of the radio-based technology stack, as well as for other applications that a client may wish to run, includes primary processors 3420A, 3420B and 3420C. One or more of the primary processors (which are not incorporated within offloading cards and are not accessed via peripheral interconnects) may be incorporated within a given server (e.g., an RPPS or a general-purpose server) of an ERG in the depicted embodiment. In at least some embodiments, the primary processors may be presented as virtual CPUs (vCPUs) by virtualization management components of the servers, with one or more RCIs being allocated for use by a radio-optimized compute instance (RCI) of the kind described earlier.

In effect, the physical resources used for an RBA are treated for management purposes as being disaggregated from, or independent of, servers in the scenario depicted in FIG. 34. Systems in which such an approach is implemented may be referred to as disaggregated processing environments. If/when additional capacity for hardware network function acceleration is required (e.g., as the rate at which L1 network functions have to be executed increases), new NFACs may be added to the resource pool of an RBA without necessarily modifying the set of primary processors. Similarly, if/when additional capacity for processing network functions that are not executed at NFACs (such as L2 or higher layer network functions) is needed, additional primary processors may be assigned for an RBA, without necessarily modifying the set of NFACs assigned to the RBA. When a decision is made (e.g. after processing a downlink path message) using a primary processor at a server that an L1 network function is to be executed for the RBA, and the server at which the decision is made does not have a local NFAC available for the L1 network function, a request may be sent to a remote NFAC (e.g., an NFAC attached to another server) to execute the L1 network function in the embodiment shown in FIG. 34. The requested L1 network function may be executed at the remote NFAC, and the result may be sent to an RU of the RBA.

Figure 35:
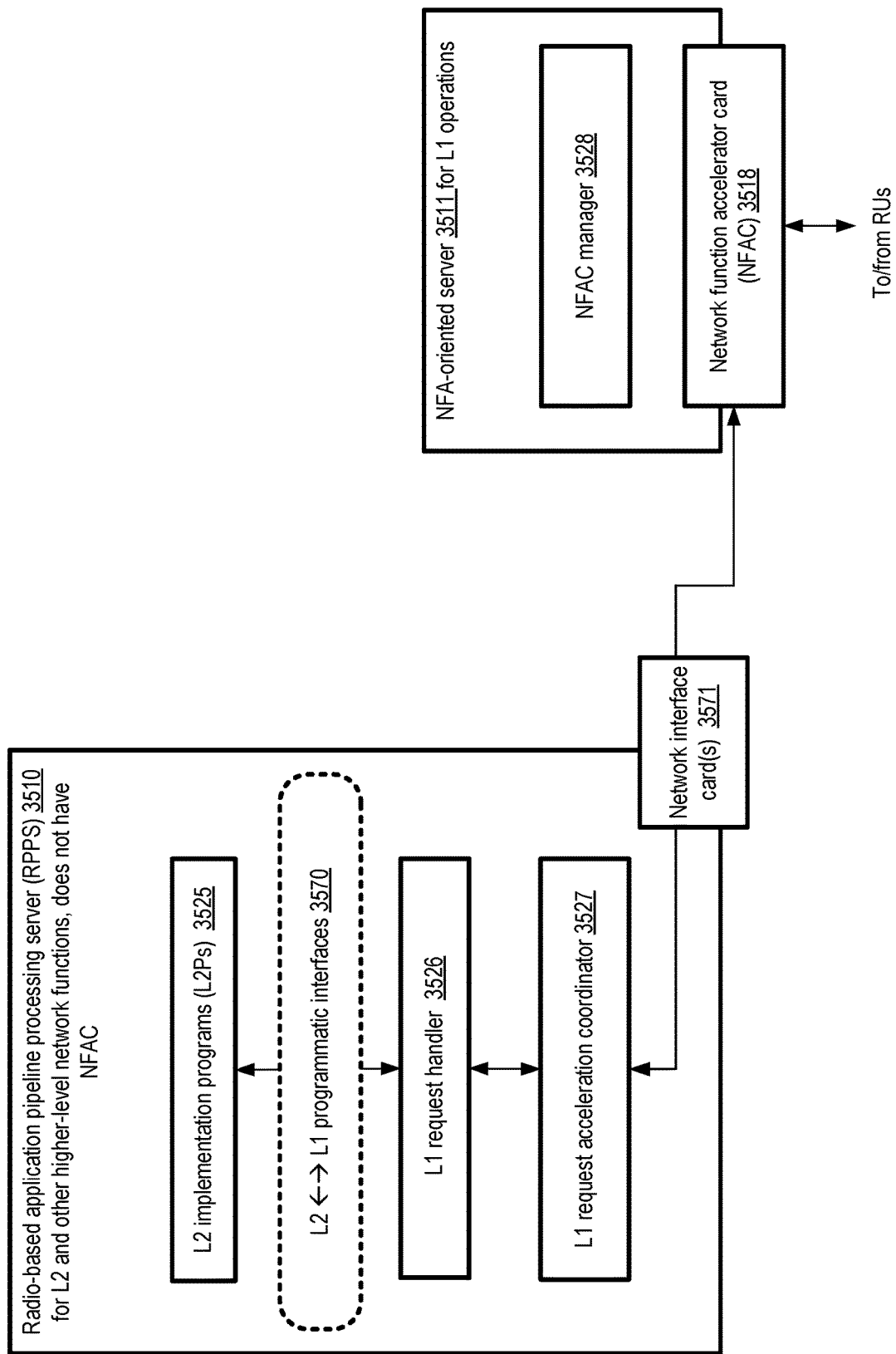
FIG. 35 illustrates an example transmission of requests for remote processing of network functions from a server which does not include network function accelerator cards, according to at least some embodiments.

FIG. 35 illustrates an example transmission of requests for remote processing of network functions from a server which does not include network function accelerator cards, according to at least some embodiments. An RPPS 3510 of an ERG at a premise external to the provider network may comprise one or more L2 implementation programs (L2Ps) 3525 performing DU-layer operations, an L1 request handler 3526, and an L1 request acceleration coordinator 3527 in the depicted embodiment. RPPS 3510 may comprise one or more network interface cards 3571, but may not include an NFAC. A determination may be made, e.g., at the L2Ps based on processing one or more messages received at the RPPS, that a network function that can be accelerated using an NFAC is to be executed. An indication of the network function may be provided via L2-L1 programmatic interfaces 3570 to the L1 request handler, which may in turn provide an indication of the L1 network function to the L1 request acceleration coordinator 3527.

The L1 request acceleration coordinator, which may be implemented as part of the virtualization management components of the RPPS 3510, may cause a request for the network function to be transmitted via a network interface card to an NFAC 3518 at an NFA-oriented server 3511 of the ERG in embodiment depicted in FIG. 35. In some implementations, the network function request may be transmitted using RDMA (Remote Direct Memory Access) over Ethernet or a similar network interconnect. In at least some embodiments, a compute instance at the NFA-oriented server 3511 may be configured within the same isolated virtual network (IVN) of a VCS as a compute instance of the RPPS, and an encapsulation protocol used for transmitting messages among compute instances of the VCS may be used to transmit the request for the network function. The encapsulation protocol may, for example, be used to implement translations/mappings between IP addresses of compute instances and IP addresses of the physical servers at which the compute instances are launched. The NFA-oriented server 3511 may include an NFAC manager 3528 which is responsible for keeping track of the health status of the NFACs of the server, receiving requests for L1 network functions and selecting which NFAC should be used for each of the requests, and so on. In at least some embodiments, an NFA-oriented server 3511 may include its own primary processors, which may for example be used to run the NFAC manager 3528. In other embodiments an NFAC manager 3528 may not be implemented.

After the request for the network function is received at the NFA-oriented server 3511, the requested network function may be executed at NFAC 3518 in the depicted embodiment. A result of the network function may be transmitted to a radio unit (RU) of the RBA from the NFA-oriented server in various embodiments.

Figure 36:
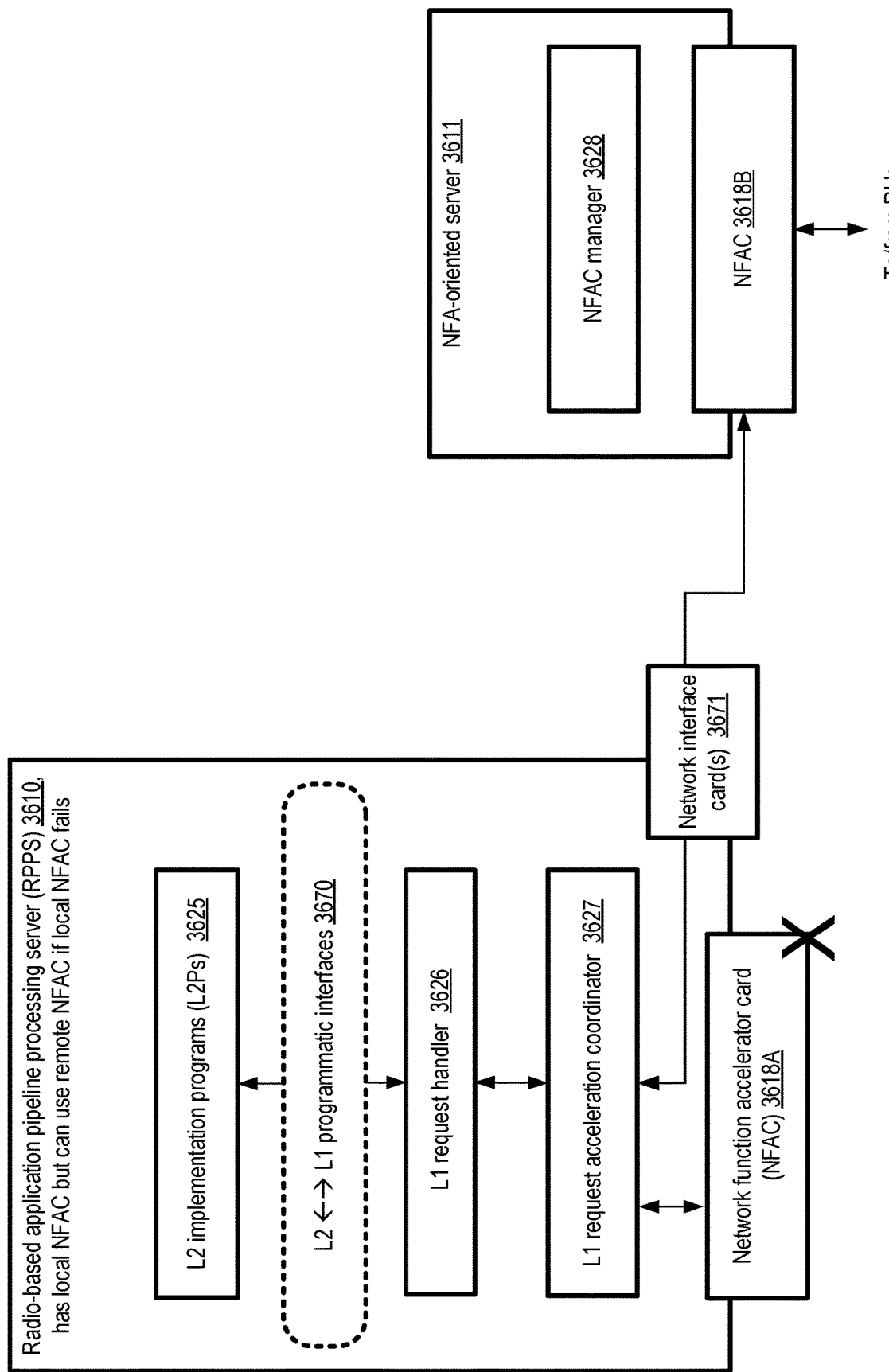
FIG. 36 illustrates an example transmission of requests for remote processing of network functions from a server in the event of a failure associated with a network function accelerator card, according to at least some embodiments.

FIG. 36 illustrates an example transmission of requests for remote processing of network functions from a server in the event of a failure associated with a network function accelerator card, according to at least some embodiments. An RPPS 3610 of an ERG at a premise external to the provider network may comprise one or more L2 implementation programs (L2Ps) 3625 performing DU-layer operations, an L1 request handler 3626, and an L1 request acceleration coordinator 3627 in the depicted embodiment. RPPS 3610 may comprise one or more network interface cards 3671, and may also include an NFAC 3618A. A determination may be made, e.g., at the L2Ps based on processing one or more messages received at the RPPS, that a network function that can be accelerated using an NFAC is to be executed. An indication of the network function may be provided via L2-L1 programmatic interfaces 3670 to the L1 request handler, which may in turn provide an indication of the L1 network function to the L1 request acceleration coordinator 3627.

The L1 request acceleration coordinator, which may be implemented as part of the virtualization management components of the RPPS 3610, may determine whether the L1 request can be processed at the local NFAC 3618A, or should be processed remotely. If, for example, NFAC 3618A fails (as indicated by the "X" in FIG. 36), or some other triggering condition for remote processing is met, the L1 request acceleration coordinator may cause a request for the network function to be transmitted via a network interface card to an NFAC 3618B at an NFA-oriented server 3611 of the ERG in embodiment depicted in FIG. 36. In addition to failure of the local NFAC 3618A, other conditions for triggering remote processing of the L1 network function may include, for example, a determination that the network function is not among the set of network functions for which NFAC 3618 is designed (since different NFACs may be targeted to acceleration of different sets of network functions), a detection that a resource utilization level of the local NFAC is above a threshold, a detection that one or more performance metrics or error metrics of the local NFAC indicate that the local NFAC is in a suboptimal state, and so on.

In some implementations, if a decision to process the network function remotely is made by the L1 request acceleration coordinator, the network function request may be transmitted using RDMA over a network interconnect, or using an encapsulation protocol. In some embodiments, the NFA-oriented server 3611 may include an NFAC manager 3628 similar in functionality to NFAC manager 3528 of FIG. 35. After the request for the network function is received at the NFA-oriented server 3611, the requested network function may be executed at NFAC 3618B in the depicted embodiment. A result of the network function may be transmitted to a radio unit (RU) of the RBA from the NFA-oriented server 3611 in various embodiments.

Figure 37:
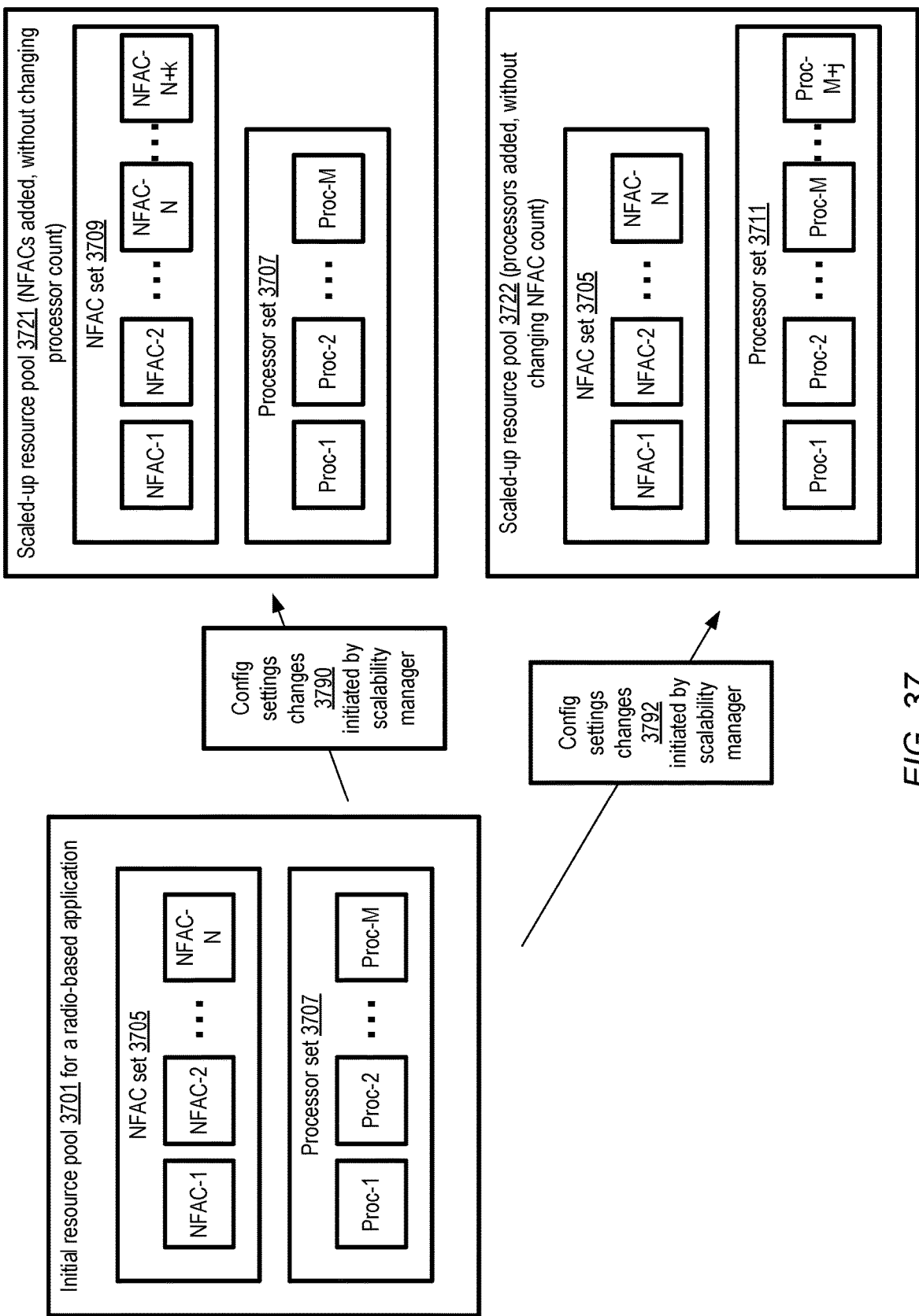
FIG. 37 illustrates examples of independent scaling up of network function accelerator capacity and primary processor capacity for a radio-based application, according to at least some embodiments.

FIG. 37 illustrates examples of independent scaling up of network function accelerator capacity and primary processor capacity for a radio-based application, according to at least some embodiments. An initial resource pool 3701 assigned or allocated for a radio-based application RBA1 may comprise an NFAC set 3705 and a processor set 3707 in the depicted example scenario. NFAC set 3705 may include N NFACs: NFAC-1, NFAC-2, . . . , NFAC-N. Processor set 3707 may comprise M processors (which are not part of the NFACs): Proc-1, Proc-2, . . . , Proc-M.

The NFAC set 3705 and/or the processor set 3707 may be scaled independently of one another in the depicted embodiment, e.g., by a scalability manager of the provider network, similar in functionality to scalability managers 102 of FIG. 1. For example, in response to detecting a triggering condition (such as a sustained increase in the rate at which requests for L1 network functions that can be offloaded to NFACs are generated for RBA1), a scalability manager may initiate configuration setting changes 3790 to add NFACs to NFAC set 3709, without adding any processors to processor set 3707. Thus, scaled-up resource pool 3721 may comprise k more NFACs in modified NFAC set 3709 than were included in the original resource pool 3701. The configuration settings changes 3790 may be propagated to and stored at, for example, RPPS offload managers of the kind discussed earlier, at L1 request acceleration coordinators of the kind shown in FIG. 35 and FIG. 36, or at NFAC managers of the kind shown in FIG. 35 and FIG. 36. The changed configuration settings may allow requests for L1 network functions to be routed to the added NFACs.

Similarly, in response to a different triggering condition (such as a sustained increase in the rate at which requests for L2 or L3 network functions that cannot be offloaded to NFACs are generated for RBA1, or sustained increase in the amount of resources being consumed by other applications being run on the client's behalf at the processors pf processor set 3707), configuration settings changes 3792 may be initiated by a scalability manager to add processors to the resource pool, without adding any NFACs to NFAC set 3705. Scaled-up resource pool 3722 may comprise j more processors in modified processor set 3711 than were included in the original resource pool 3701. The configuration settings changes 3792 may be propagated to and stored at, for example, virtualization management components at RPPS or other servers of the ERGs being used for RBA1. As a result, more virtualized CPUs may be allotted to compute instances or other runtime environments being used for RBA1. In some cases, a client may explicitly request an increase in NFAC capacity or in primary processor capacity, e.g., by submitting a programmatic request to the VCS, and the decisions to allocate additional NFACs or addition processors may be based at least in part on such requests. Note the components or agents of the scalability managers may run at the ERG in at least some embodiments, e.g., as part of virtualization management components.

FIG. 38 illustrates example options for scaling up network function accelerator capacity for a radio-based application in a disaggregated processing environment, according to at least some embodiments. In the embodiment depicted in FIG. 38, an ERG 3801 may comprise NFA-oriented servers 3805A and 3805B, each including four NFACs. NFA-oriented server 3805A includes NFAC-1, NFAC-2, NFAC-3 and NFAC-4, while NFA-oriented server 3805B includes NFAC-5, NFAC-6, NFAC-7 and NFAC-8. Initial set 3802 of NFACs assigned to an RBA RBA1 comprises NFAC-1 and NFAC-2.

A decision may be made by a scalability manager based on one or more triggering conditions that two additional NFACs are to be assigned to RBA1 in the depicted scenario. The scalability manager may decide to add NFAC-3 and NFAC-4 (at the same server 3805A as the initially-assigned NFACs) to form the expanded NFAC set 3804 for RBA1 in some embodiments, as indicated by arrow 3874. Alternatively, instead of concentrating all the NFAC resources assigned to RBA1 at the same server, NFAC-5 and NFAC-6 from server 3805B may be added to form expanded NFAC set 3806 for RBA1 in at least one embodiment, as indicated by arrow 3875. Distributing NFACs across servers may have availability benefits as compared to keeping all the NFACs of RBA1 at a single server, since the probability of both servers failing may typically be lower than the probability of a single server failing. However, distributing the NFACs across servers may lead to a slight increase in network traffic incurred at the ERG on behalf of RBA1, as requests/responses may have to be transferred between the servers. The scalability manager may take such factors into account when deciding the manner in which additional NFAC capacity is to be configured for RBA1, along with factors such as the current utilization levels of the available NFACs at the ERG (e.g., for applications other than RBA1) prior to the expansion.

Figure 39:
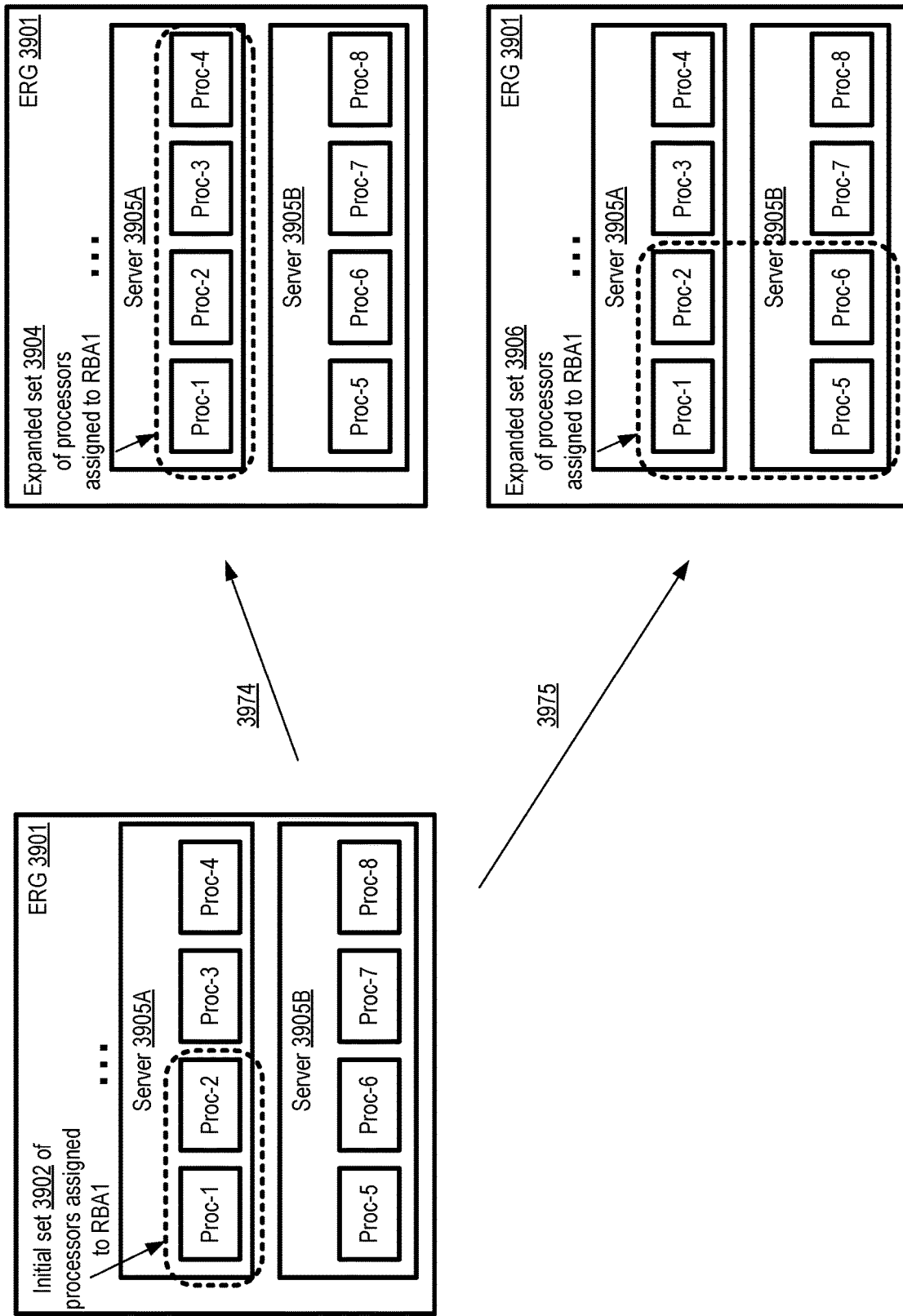
FIG. 39 illustrates example options for scaling up primary processor capacity for a radio-based application in a disaggregated processing environment, according to at least some embodiments.

FIG. 39 illustrates example options for scaling up primary processor capacity for a radio-based application in a disaggregated processing environment, according to at least some embodiments. In the embodiment depicted in FIG. 39, an ERG 3901 may comprise servers 3905A and 3905B, each including four primary processors which are not on accelerator cards. Server 3905A includes processors Proc-1, Proc-2, Proc-3 and Proc-4, while server 3805B includes processors Proc-5, Proc-6, Proc-7 and Proc-8. Initial set 3902 of processors assigned to an RBA RBA1 comprises Proc-1 and Proc-2. Note that the servers 3905A and/or 3905B may each include zero or more NFACs.

A decision may be made by a scalability manager based on one or more triggering conditions that two additional processors are to be assigned to RBA1 in the depicted scenario. The scalability manager may decide to add Proc-3 and Proc-4 (at the same server 3905A as the initially-assigned processors) to form the expanded processor set 3904 for RBA1 in some embodiments, as indicated by arrow 3974. Alternatively, instead of concentrating all the processor resources assigned to RBA1 at the same server, NFAC-5 and NFAC-6 from server 3905B may be added to form expanded processor set 3906 for RBA1 in at least one embodiment, as indicated by arrow 3975. Factors similar to those discussed above in the context of FIG. 38 may be taken into account when selecting the specific set of processors to be added to the pool of processors allocated/assigned to RBA1 in the embodiment depicted in FIG. 39. Note that in some embodiments, additional resource of both types (NFACs as well as primary processors) may be allocated/assigned to an RBA at the same time, e.g., instead of just adding NFACs or just adding processors.

Figure 40:
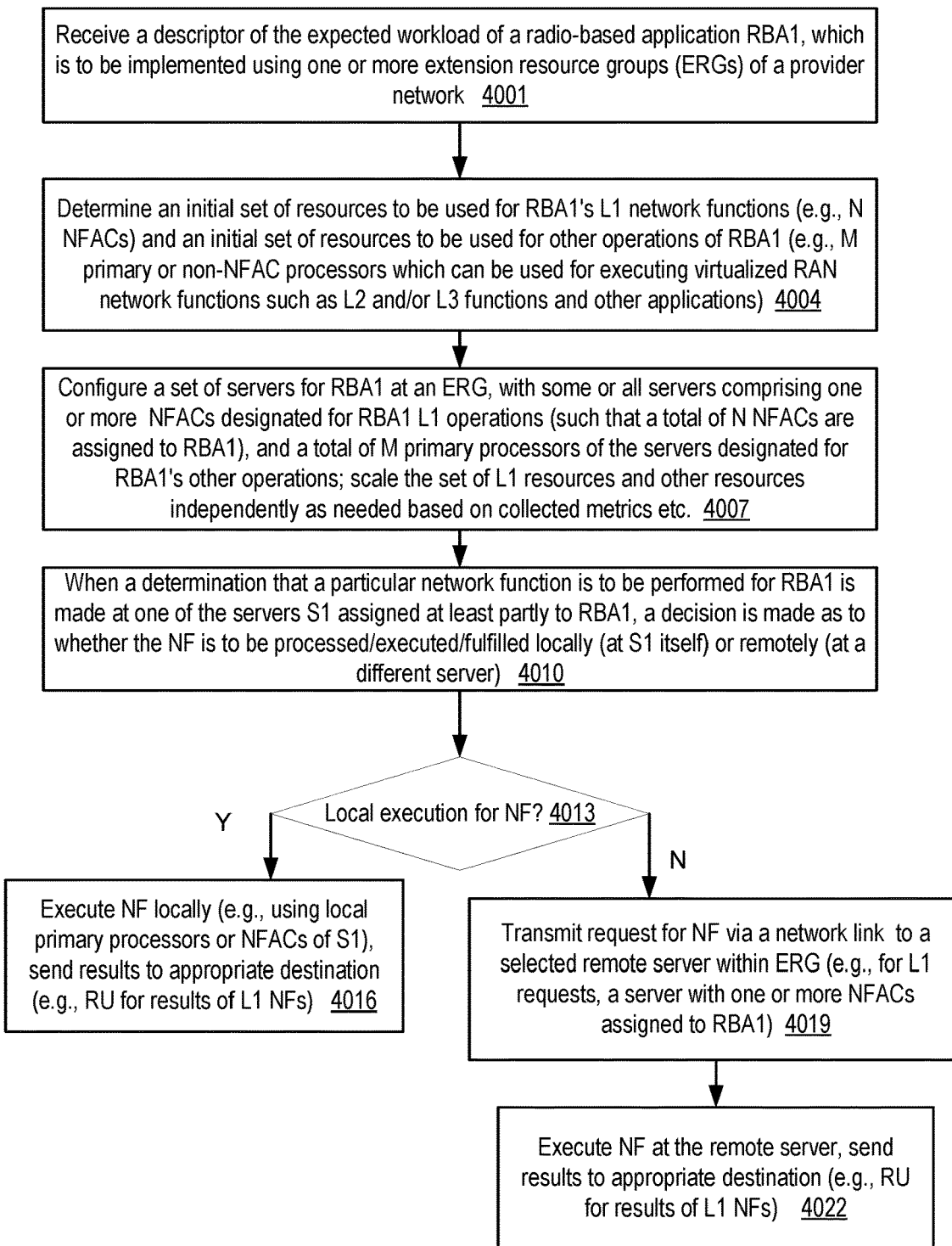
FIG. 40 is a flow diagram illustrating aspects of capacity management operations that may be performed to disaggregate processing of radio-based applications using extension resource groups of a provider network, according to at least some embodiments.

FIG. 40 is a flow diagram illustrating aspects of capacity management operations that may be performed to disaggregate processing of radio-based applications using extension resource groups of a provider network, according to at least some embodiments. As shown in element 4001, a descriptor of a radio-based application RBA1 to be implemented at one or more ERGs may be received at a provider network, e.g., from a client via programmatic interfaces of a VCS or a RBAMS (radio-based application management service) of the kind introduced in FIG. 1. The descriptor may, for example, indicate the rates at which network functions are expected to be processed for RBA1 at a given VCS extension site or a collection of such sites.

An initial set of resources to be used for accelerating RBA1's L1 (physical layer) network functions may be identified (element 4004) based on analysis of the descriptor, as well as an initial set of resources to be used for RBA1's other network functions (e.g., L2 layer functions, L3 layer functions as well as other applications). The set of non-L1 network functions may collectively be referred to as "L2plus" operations as they can potentially include more than just L2 operations. The resources allocated for L1 network functions that can be accelerated using offloading cards may comprise N NFACs, while the resources allocated for other RBA operations (which do not require access to NFACs) may include M primary processors which are not on offloading cards such as NFACs.

A set of servers may be configured to execute RBA1's operations (element 4007) in the depicted embodiment. At least some of the servers may include NFACs, such that the total number of NFACs among all the servers of the set is no less than N; similarly, the total number of primary processors which are not part of the NFACs or other offloading cards may be no less than M. The set of NFACs assigned to RBA1 may be scaled up or down later as needed, e.g., based on collected metrics of performance, errors, or failures, independently of the set of primary processors; similarly, the set of primary processors assigned to RBA1 may be scaled up or down later as needed, independently of the set of NFACs.

When a determination is made at one of the servers S1 which is at least partly allocated/assigned to RBA1 that a particular network function (NF) is to be performed for RBA1, a decision may be made at S1 as to whether the NF is to be processed, executed or fulfilled locally (at S1 itself) or at a remote server (element 4010). The local vs. remote decision may be made based on factors such as the kind of network function that is to be executed (e.g., L2 versus L1 versus other layers), the availability of local accelerators for the NF, failure metrics at local NFACs or other resources, performance metrics of local resources, and so on.

If a decision to execute the NF locally is made, as determined in operations corresponding to element 4013, NF may be executed at an NFAC or primary processor of S1 depending on whether an NFAC for it is available, and the results may be sent to the appropriate destination (e.g., an RU if the NF is an L1 function) (element 4016) in the depicted embodiment. If the decision to execute the NF remotely is made, a request indicating the NF may be transmitted over a network link to a selected remote server within the ERG (element 4019) in various embodiments. For L1 requests, the server selected may comprise one or more of the NFACs assigned currently to RBA1. The NF may be executed at the remote server (e.g., using an NFAC if the NF is an L1 function that can be accelerated at the NFAC), and results of the NF may be sent from the remote server to the appropriate destination (e.g., a device at which an RU or a CU of RBA1 is run) (element 4022).

Figure 41:
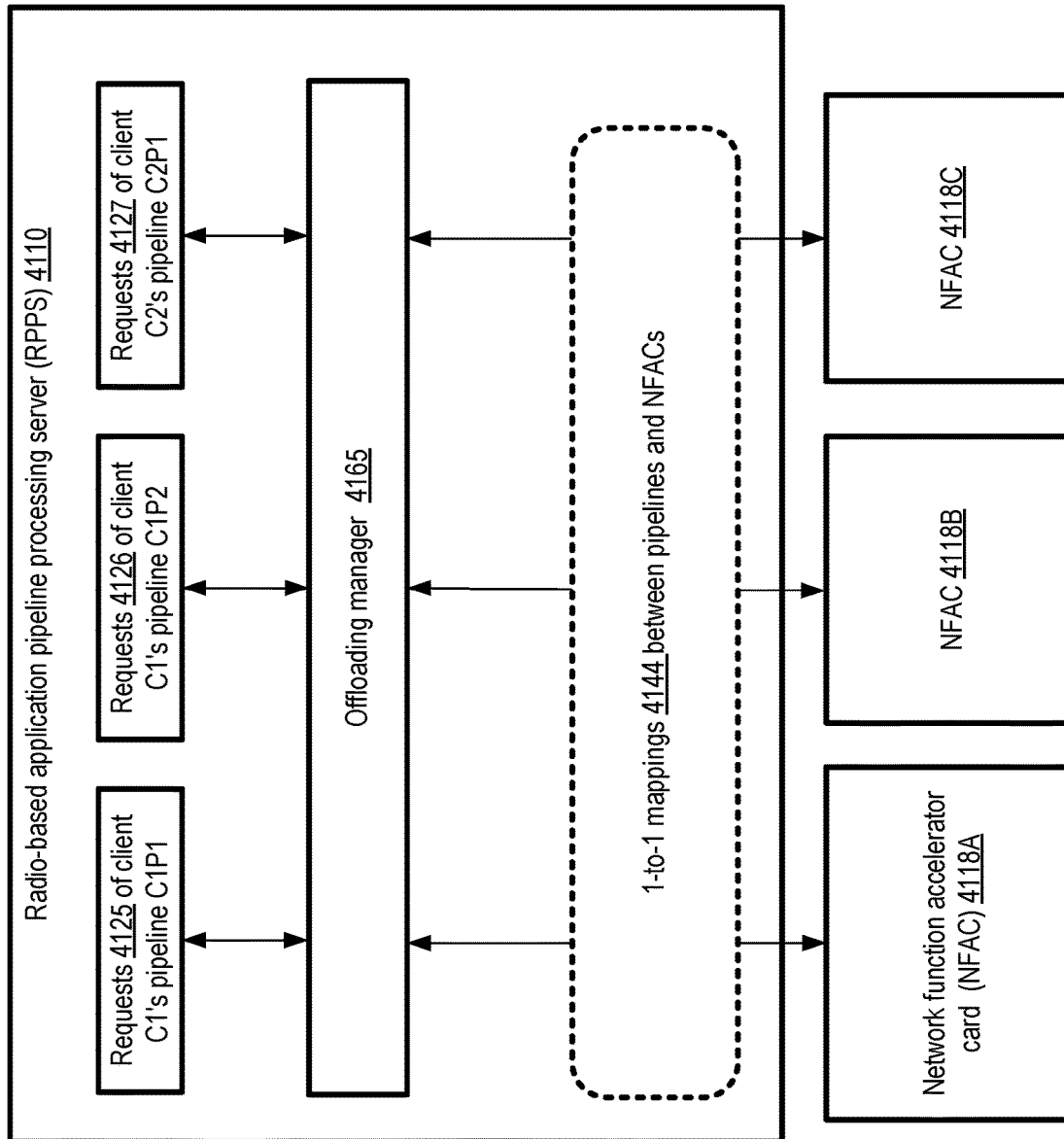
FIG. 41 illustrates an example scenario in which 1-to-1 mappings may be implemented between radio-based application pipelines and accelerator cards of a radio-based application pipeline processing server, according to at least some embodiments.

As mentioned earlier, in various embodiments more than radio-based application pipeline may be executed using a single radio-based application pipeline processing server (RPPS) configured in multi-tenant mode. FIG. 41 illustrates an example scenario in which 1-to-1 mappings may be implemented between radio-based application pipelines and accelerator cards of a radio-based application pipeline processing server, according to at least some embodiments. In the scenario shown in FIG. 41, a given NFAC may be allocated for exclusive use by a single radio-based application pipeline. RPPS 4110 comprises three NFACs, 4118A, 4118B and 4118C, each comprising one or more network function accelerators. Offloading manager 4165 of the RPPS may store metadata indicating 1-to-1 mappings 4144 between pipelines of one or more clients and the NFACs 4118. For example, requests 4125 of a client C1's radio-based application pipeline C1P1 may be directed exclusively to NFAC 4118A, requests 4126 of a second pipeline C1P2 of the same client C1 may be directed exclusively to NFAC 4118B, and requests 4127 of a second pipeline C2P1 of a different client C2 may be directed exclusively to NFAC 4118C. In at least some embodiments, clients may in effect reserve NFACs for exclusive use by sending programmatic requests to a control plane resource of the provider network being used to configure the RPPS. In one embodiment in which a given NFAC includes multiple network function accelerators, such exclusive use may be requested and granted at the granularity of the individual network function accelerators.

Figure 42:
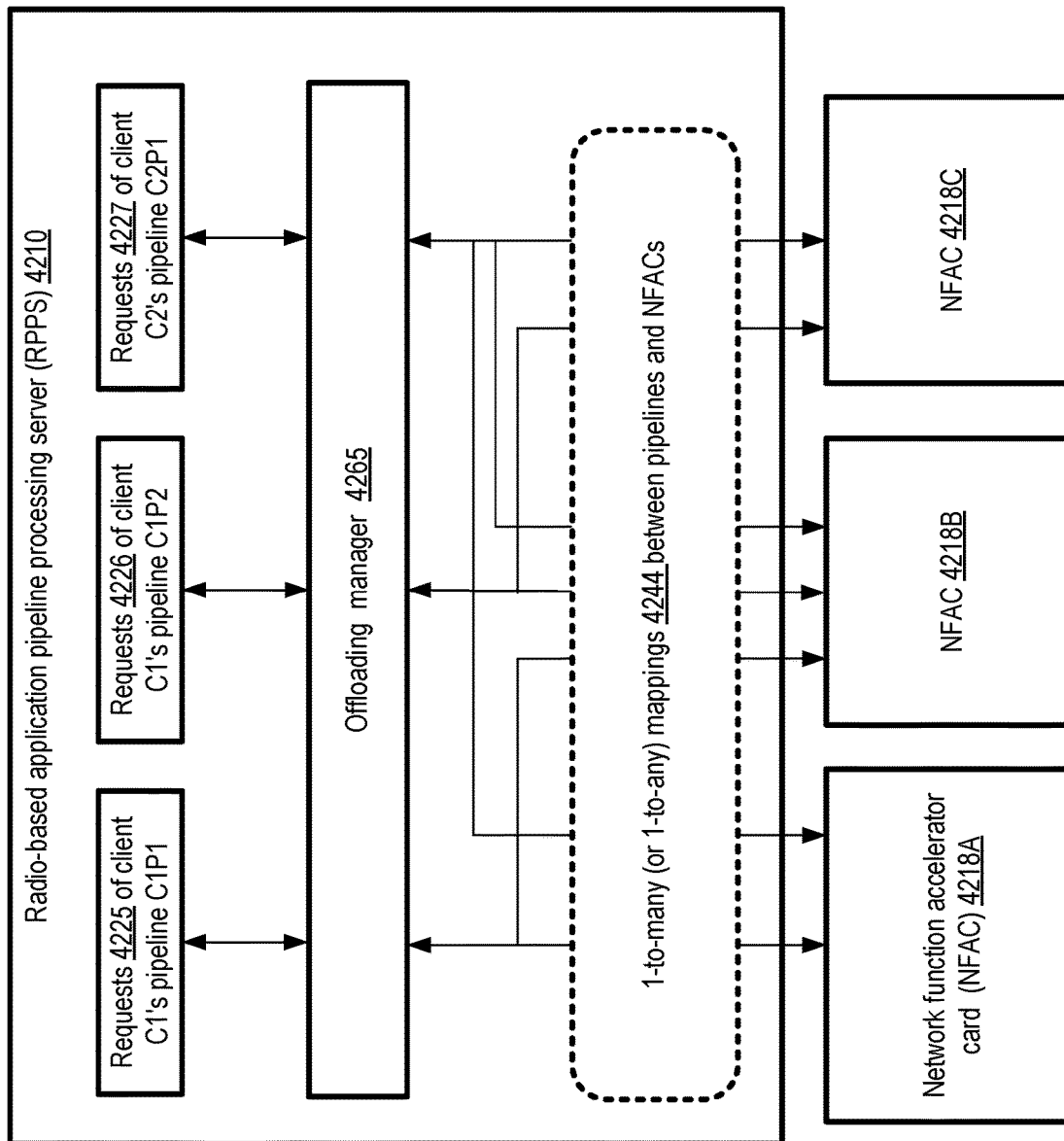
FIG. 42 illustrates an example scenario in which 1-to-many mappings may be implemented between radio-based application pipelines and accelerator cards of a radio-based application pipeline processing server, according to at least some embodiments.

FIG. 42 illustrates an example scenario in which 1-to-many mappings may be implemented between radio-based application pipelines and accelerator cards of a radio-based application pipeline processing server, according to at least some embodiments. In the scenario depicted in FIG. 42, RPPS 4210 comprises NFAC 4218A, NFAC 4218B and NFAC 4218C, each of which may comprise one or more network function accelerators. Requests 4225 of a client C1's radio-based application pipeline CIP1 may be sent by offloading manager 4265 to either NFAC 4218A or 4218B. Requests 4226 of client C1's second pipeline C1P2 may be processed at either NFAC 4218B or NFAC 4218C, while requests 4227 of client C2's pipeline C2P1 may be processed at any of the three NFACs 4218A, 4218B or 4218C in the depicted embodiment. The offloading manager 4265 may make the decision as to which specific NFAC should be used for a given network function request, based on a variety of factors such as the type of the network function (since not all the NFACs may be capable of processing all the types of network functions which have to be executed at the NFACs), the kind of compute instance or execution environment the request is received from, the resource utilization levels of the different NFACs and so on. Metadata indicating 1-to-many mappings (or 1-to-any) mappings 4244 between the different pipelines and NFACs may be maintained by the offloading manager in some embodiments, indicating the set of NFACs from among which one can be used for a given network function.

Figure 43:
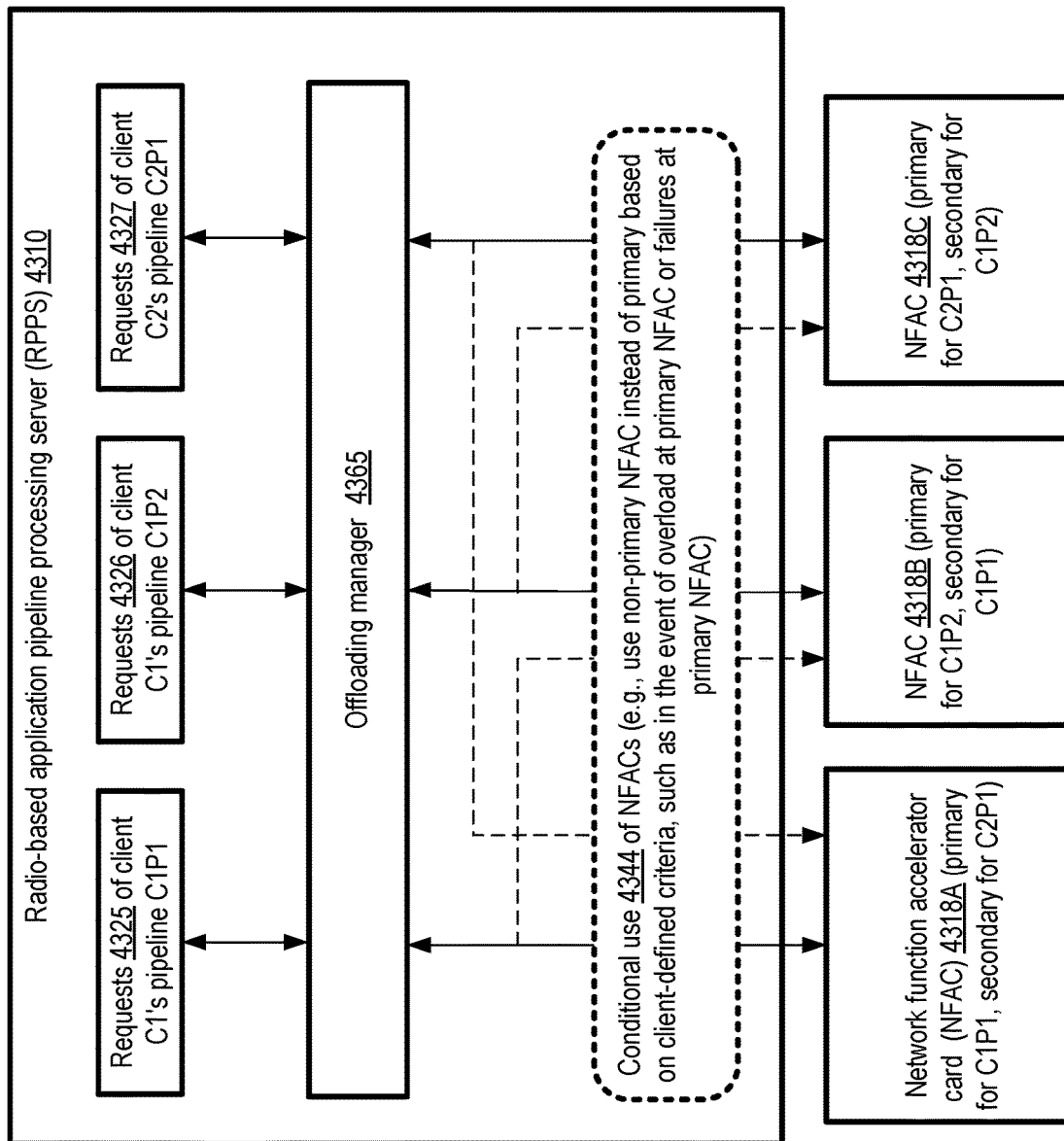
FIG. 43 illustrates an example scenario in which at least a subset of the accelerator cards of a radio-based application pipeline processing server may be utilized conditionally, according to at least some embodiments.

FIG. 43 illustrates an example scenario in which at least a subset of the accelerator cards of a radio-based application pipeline processing server may be utilized conditionally, according to at least some embodiments. In the scenario depicted in FIG. 43, RPPS 4310 comprises NFAC 4318A, NFAC 4318B and NFAC 4318C, each of which may comprise one or more network function accelerators. NFAC 4318A has been designated, e.g., by offloading manager 4365, as the primary NFAC for processing network function requests 4325 of client C1's pipeline C1P1, and NFAC 4318B has been designated as the secondary NFAC for C1P1. NFAC 4318B has been designated as the primary NFAC for processing network function requests 4326 of client C1's pipeline C1P2, and NFAC 4318C has been designated as the secondary NFAC for C1P2. NFAC 4318C has been designated as the primary NFAC for processing network function requests 4327 of client C2's pipeline C2P1, and NFAC 4318A has been designated as the secondary NFAC for C2P1. Note that instead of a single non-primary NFAC for a given pipeline, multiple non-primary NFACs may be configured in some embodiments, e.g., with one secondary, one tertiary and so on.

Requests 4325 of a pipeline C1P1 may be sent by offloading manager 4365 to NFAC 4318A unless conditional use 4344 criteria selected/defined by client C1 are met, in which case the requests may be sent to NFAC 4318B. For example, client C1 may choose to transfer workload from the primary NFAC 4318A to non-primary NFAC 4318B if the utilization level at the primary NFAC exceeds X % over the last T seconds, or if the number of request failures or non-completions at the primary NFAC exceeds F in the last T seconds, and so on. In some cases, the client-specified conditions for transferring requests may be based not just on metrics or events at the primary NFAC, but also on metrics or events at the secondary NFAC. In one such scenario, requests may be sent to the non-primary NFAC if the utilization level (or error metrics) at the primary NFAC satisfy condition C1, and if the corresponding metrics at the non-primary NFAC satisfy criterion C2. Requests 4326 of client C1's second pipeline C1P2 may be processed at primary NFAC 4318B unless client-specified criteria are met, in which case the requests may be directed to non-primary NFAC 4318C. Similarly, requests 4327 of client C2's pipeline C2P1 may be processed primary NFAC 4318A unless C2—specified criteria for using a non-primary NFAC are satisfied, in which case the requests 4327 may be sent to NFAC 4318A. A difference between the example condition scenario depicted in FIG. 43 and the 1-to-N mapping scenario shown in FIG. 42 is that NFACs may be selected for individual network functions based on client-specified criteria in FIG. 43, while the offloading manager may use its own rules/heuristics to choose NFACs for network functions in FIG. 42. Similar criteria may be defined and used by clients for utilizing more than two non-primary NFACs in some embodiments. In one embodiment, some NFACs of an RPPS may be configured for failover scenarios, and may not be used at all unless one of the other NFACs fails.

Figure 44:
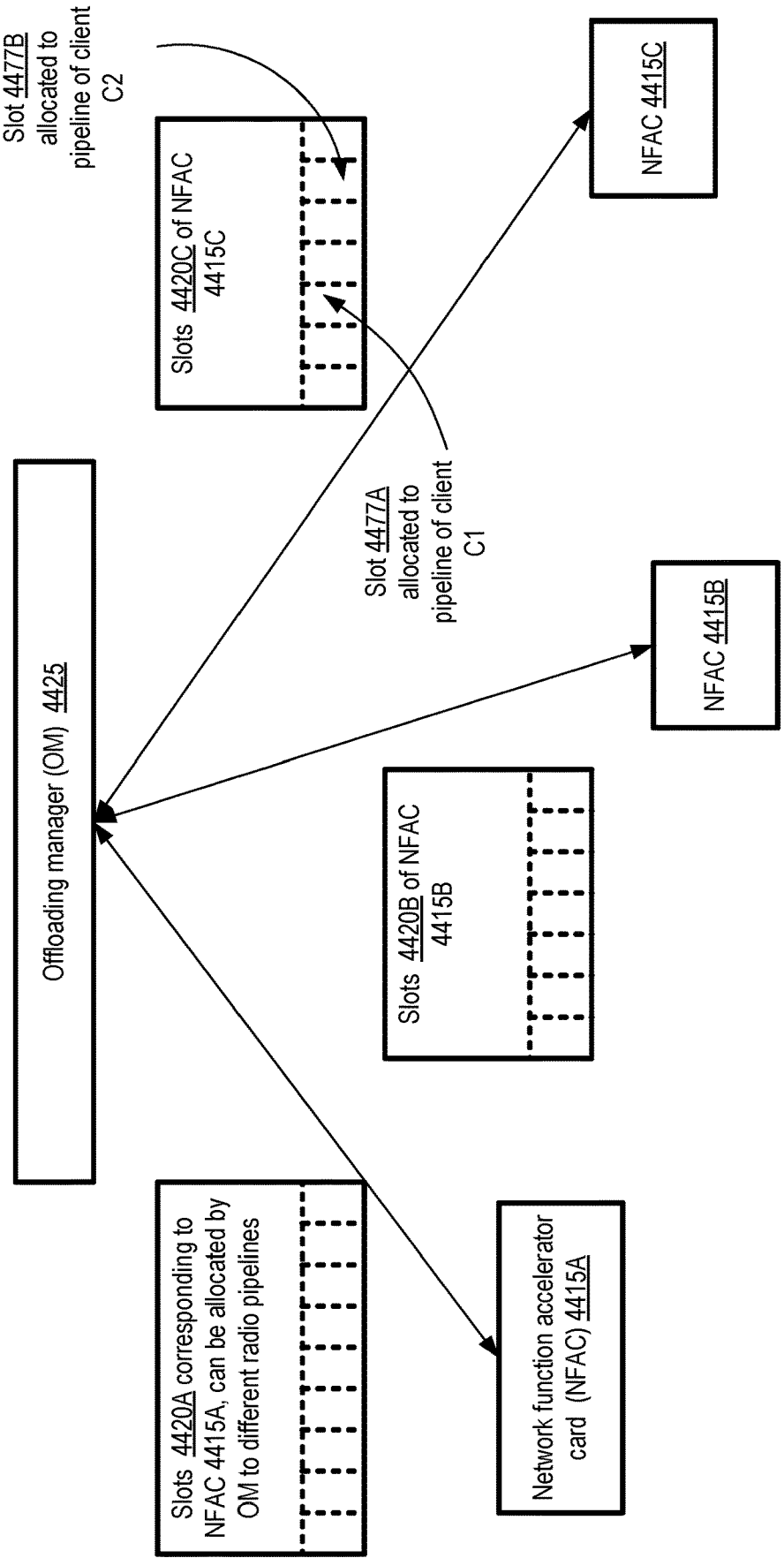
FIG. 44 illustrates an example technique for virtualization of network function accelerator cards, according to at least some embodiments.

FIG. 44 illustrates an example technique for virtualization of network function accelerator cards, according to at least some embodiments. In the depicted embodiment, a given radio-based pipeline accelerator card NFAC and/or an individual network function accelerator of such a card may be shared among several different application pipelines, with an offloading manager 4425 providing virtualized versions of the same underlying hardware to each of the pipelines. To simplify the presentation, assume that each NFAC shown in FIG. 44 comprises a single network function accelerator. Network function requests for several different pipelines are distributed among NFACs 4415A, 4415B and 4415C by OM 4425 in the scenario shown in FIG. 44, with a given NFAC potentially being accessed by multiple pipelines concurrently or near-concurrently using respective virtualization programmatic interfaces.

For each of the NFACs, the OM 4425 may maintain a data structure comprising a number of slots in some embodiments, with each slot representing a respective virtualized view of at least a portion of the computing and/or networking capacity of the NFAC, which can be allocated or assigned to a particular radio-based application's pipeline for at least some time period. Slots 4420A may be used to manage NFAC 4415A, slots 4420B may be used to manage NFAC 4415B, and slots 4420C may be used to manage NFAC 4415C. Individual slots may comprise elements in an array, linked-list, or other similar data structure in some embodiments. Slot 4477A of NFAC 4415C is currently allocated to a pipeline of client C1, while slot 4477B of the same NFAC 4415C is currently allocated to a pipeline of client C2, enabling both pipelines to share NFAC 4415C. In various embodiments, the OM may schedule the execution of individual network functions from multiple pipelines (i.e., different radio-based applications) at a shared NFAC in such a way that from the perspective of any given pipeline, it appears that the NFAC is being used exclusively for that pipeline. In some embodiments, the number of slots maintained by the OM for a given NFAC may be based at least in part on the total performance capacity of the NFAC along one or more dimensions, such as the network function processing capacity of the NFAC, the network bandwidth available for communicating with RUs from the NFAC, and so on.

Figure 45:
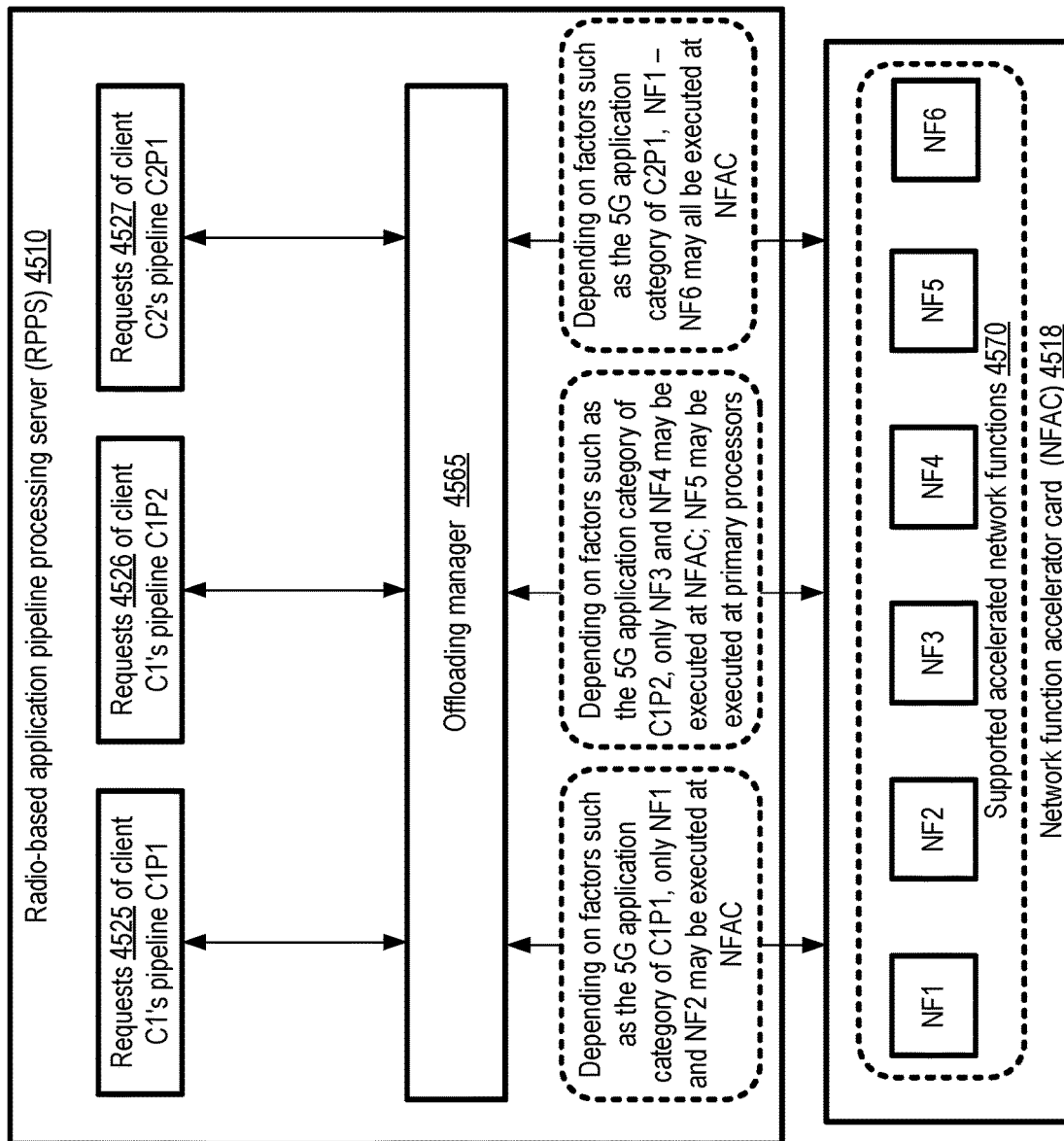
FIG. 45 illustrates an example scenario in which different subsets of network functions implemented at a network function accelerator card may be utilized on behalf of respective radio-based application pipelines, according to at least some embodiments.

In some cases, an NFAC installed at an RPPS may be capable of executing numerous types of network functions, but not all of its capabilities may be utilized for a given radio-based application. FIG. 45 illustrates an example scenario in which different subsets of network functions implemented at a network function accelerator card may be utilized on behalf of respective radio-based application pipelines, according to at least some embodiments. RPPS 4510 of FIG. 45 is configured with an NFAC 4518 at which at least size different types of network functions NF1, NF2, NF3, NF4, NF5 and NF6 can be executed, e.g., using one or more network function acceleration chipsets of the kind indicated earlier. The categories NF1-NF6 of supported network functions 4570 may include network functions corresponding to various stages of the downlink and uplink pipelines 401 and 451 of FIG. 4 in some embodiments. Requests 4525 for network functions of client C1's radio-based application pipeline C1P1, requests 4526 of client C1's radio-based application pipeline C1P2 and requests 4527 of client C2's radio-based application pipeline C2P1 may be obtained at an offloading manager 4565.

Depending on factors such as the 5G application category to which the respective pipelines belong (e.g., ITU-R's enhanced mobile broadband (eMBB), massive machine-type communications (mMTC), or ultra-reliable and Low Latency Communications (URLLC)), different combinations of the kinds of network functions which the NFAC 4518 is designed to support may actually be executed at the NFAC for a given pipeline in the depicted embodiment. For example, for pipeline C1P1, only NF1 and NF2 may be executed at the NFAC 4518. For pipeline CIP2, only NF3 and NF4 may be run at the NFAC, while for pipeline C2P1, all six types of network functions shown may be executed at the NFAC 4518. In various embodiments, one or more L1 network functions of one or more radio-based application pipelines may be executed using the primary processors (e.g., CPUs) of an RPPS, and not at an NFAC. For example, for pipeline C1P2, NF5 may be executed at the primary processors. A decision as to whether a given network function is executed at an NFAC or at a primary processor may be made based on a variety of factors in different embodiments—e.g., in some cases the decision may be based on policies indicated via programmatic interfaces by a client, in other cases the decision may be made dynamically (e.g., by an offloading manager 4565) based on analysis of metrics/failures/errors, and so on. In one embodiment, a client may provide custom software (e.g., in source code or executable code form) to execute some network functions that could otherwise be executed using built-in functionality of an NFAC 4518. For example, even though pipeline CIP1 may need to execute a particular network function belonging to category NF6, client C1 may have provided a software implementation of NF6 which is run on the primary CPUs of the RPPS for CIP1 rather than on the NFAC 4518 in such an embodiment. The custom code provided by a client may be deployed at one or more network function accelerators of an NFAC in such embodiments, and utilized for that client's applications. In some embodiments, as mentioned above, clients may indicate the kinds of network functions which are preferably to be accelerated for their radio-based applications, and an RPPS which has an NFAC at which those kinds of network functions may be selected for the client's applications.

FIG. 46, FIG. 47, FIG. 48, and FIG. 49 collectively illustrate example programmatic interactions, pertaining to radio-based applications, between clients and a provider network service, according to at least some embodiments. In the depicted embodiment, a provider network service 4612 (such as a VCS or a radio-based application management service (RBAMS)) may implement a set of programmatic interfaces 4677, such as web-based consoles, command-line tools, graphical user interfaces, APIs and the like, which can be utilized by service clients to submit messages or requests to the service and receive corresponding responses.

A client 4610 may use programmatic interfaces 4677 to send a RadioBasedApplicationsDescriptor message 4614 to the service 4612, indicating a set of locations of cells near which RPPSs may be required, the workloads expected at the locations (e.g., how many end user devices for the client's radio-based applications such as public 5G networks or private 5G networks are expected to be utilized at each location, what the approximate expected message rates from the end users are at various times of the day or days of the week, etc.), the quality of service (e.g., message latencies for different kinds of traffic) desired for the RBA, and the like. The RadioBasedApplicationsDescriptor message 4614 may also include the client's preferences about single-tenancy (e.g., whether the client wants exclusive use of an RPPS, exclusive use of NFACs, and/or exclusive use of the NFAs of such cards) versus multi-tenancy (e.g., that the client is willing to share RPPSs, accelerator cards, and/or network function accelerators with other clients), whether the client requires a particular vendor's accelerator cards or is willing to use any of several vendors, and so on. The information provided by the client may be analyzed at the provider network, e.g., by a configuration manager similar to the RBA configuration managers shown in FIG. 1, and a recommendation indicating a set of extension resource groups (ERGs) with respective sets of RPPSs that can be used to satisfy the estimated requirements of the client's applications may be prepared. In embodiments in which the disaggregated processing approach described earlier is utilized, the provider network service may determine the resource pool sizes (e.g., an NFAC pool and a primary processor pool) to be employed for the RBA based on the information included in the descriptor. The recommendation, which may for example indicate the count and types of RPPSs proposed for each of one or more specific locations (point-of-presence sites, client-owned premises, cell towers etc.), may be provided to the client in one or more RecommendedRPPSConfig messages 4615 in the depicted embodiment. Note that in some cases, some of the locations indicated in the recommendations may already have one or more RPPSs installed and configured, e.g., for other clients who have previously submitted information about their own radio-based application workloads.

If the client approves the recommendations, an RPPSConfigApproved message 4617 may be sent via interfaces 4677 to the service 4612. If new RPPSs have to be transported to and installed at the approved recommended sites, the process for doing so may be initiated by the provider network operator (note that this process may take some time, e.g., several days in some cases). In some cases, additional RPPSs may be added to a pre-installed set of RPPSs (used for other clients, or currently unused but set up in anticipation of client requirements) at one or more of the recommended sites to accommodate the additional workload indicated by the client. When the RPPSs that are to be used for the client (configured in multi-tenant mode, or in single-tenant mode, depending on the client's preferences or on default settings of the service 4612 if the client does not indicate a tenancy preference) have been identified, and after connectivity between the RPPSs and the control plane resources of the provider network has been verified, an RPPSsReady message 4621 may be sent to the client in some embodiments to indicate that the client can request the launch of compute instances for their radio-based applications. In some embodiments, respective identifiers of the RPPSs designated for the client's use may be provided in an RPPSsReady message, and such identifiers can be used by the client to request launches of radio-optimized compute instances at individual RPPSs. In at least one embodiment, a virtualization management component comprising an offloading manager (similar in functionality to the offloading manager 627 of FIG. 6) may be launched as part of the boot or initialization of an RPPS, prior to the launch of the compute instances. In some embodiments, before the client's radio-optimized compute instances (which may include respective request handlers similar in functionality to request handlers 626 of FIG. 6) are launched, the service 4612 may also verify that connectivity has also been established between the RPPSs designated for the client's use and (a) the RUs (radio units) at the cells which are to be used for the client's applications as well as (b) the resources to be used for centralized units (CUs) and/or other layers of the applications' stacks. In other embodiments, such verification of connectivity to RUs and/or CUs may be performed after the compute instances are launched.

Figure 46:
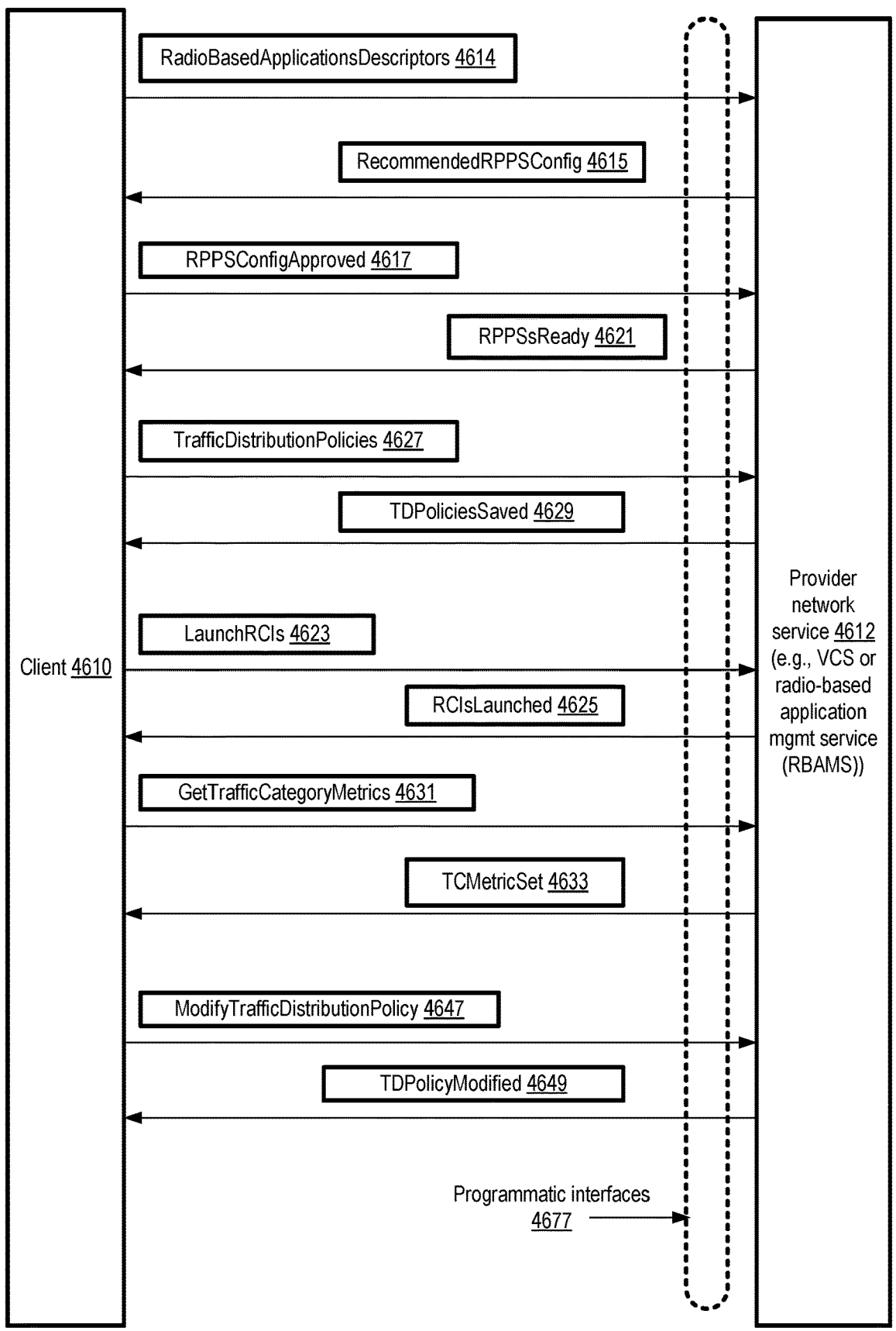
FIG. 46, FIG. 47, FIG. 48, and FIG. 49 collectively illustrate example programmatic interactions, pertaining to radio-based applications, between clients and a provider network service, according to at least some embodiments.

In the embodiment depicted in FIG. 46, a client 4610 may indicating preferences regarding the manner in which traffic of various categories (such as the categories shown in FIG. 14) is to be distributed across multiple NHDs at the RPPSs set up for the client, e.g., by submitting one or more TrafficDistributionPolicies messages 4627 to the service 4612. The policies indicated by the client may be stored at a repository of the service, and a TDSPoliciesSaved message 4629 may be sent to the client.

A client 4610 may submit one or more LaunchRCIs requests 4623 via the programmatic interfaces 4677 in various embodiments, indicating for example the sites, ERGs, or the specific RPPSs at which one or more RCIs of a specified category (such as the RCI types shown in FIG. 12) are to be instantiated for the client's applications. An RCIsLaunched message 4625 may be sent to the client 4610 in some embodiments, confirming that the RCIs have been launched. In some embodiments, configuration information about the launched RCIs may be provided to the client, such as instance identifiers, IP addresses etc. (which can be used to communicate with CUs, RUs and/or core network resources of the client's applications).

In at least one embodiment, a client may submit a GetTrafficCategoryMetrics request 4631 to the service 4612, requesting metrics collected for one or more of the traffic categories indicated in FIG. 14 at one or more RPPSs of an ERG. The requested set of metrics may be provided to the client via one or more TCMetricSet messages 4633 in the depicted embodiment. For example, a client may obtain metrics of front-haul traffic alone such as how many messages were transmitted to and from RUs during a time interval, the total amount of data transferred to and from RUs, the latencies for such messages, whether any messages were lost and so on. Similar sets of metrics may be provided for mid-haul traffic, intra-IVN traffic, and so on. In some implementations, the metrics may be further broken down by NHD—e.g., separate sets of metrics for a given category of traffic which is transmitted via two NHDs of an RPPS may be provided for each NHD if desired.

If a client wishes to modify a traffic distribution policy in effect for an RBA, a Modify TrafficDistributionPolicy message 4647 indicating the changes may be submitted in some embodiments. In response, the service may store the modified policies and send a TDPolicyModified message 4649 to the client in some embodiments.

Figure 47:
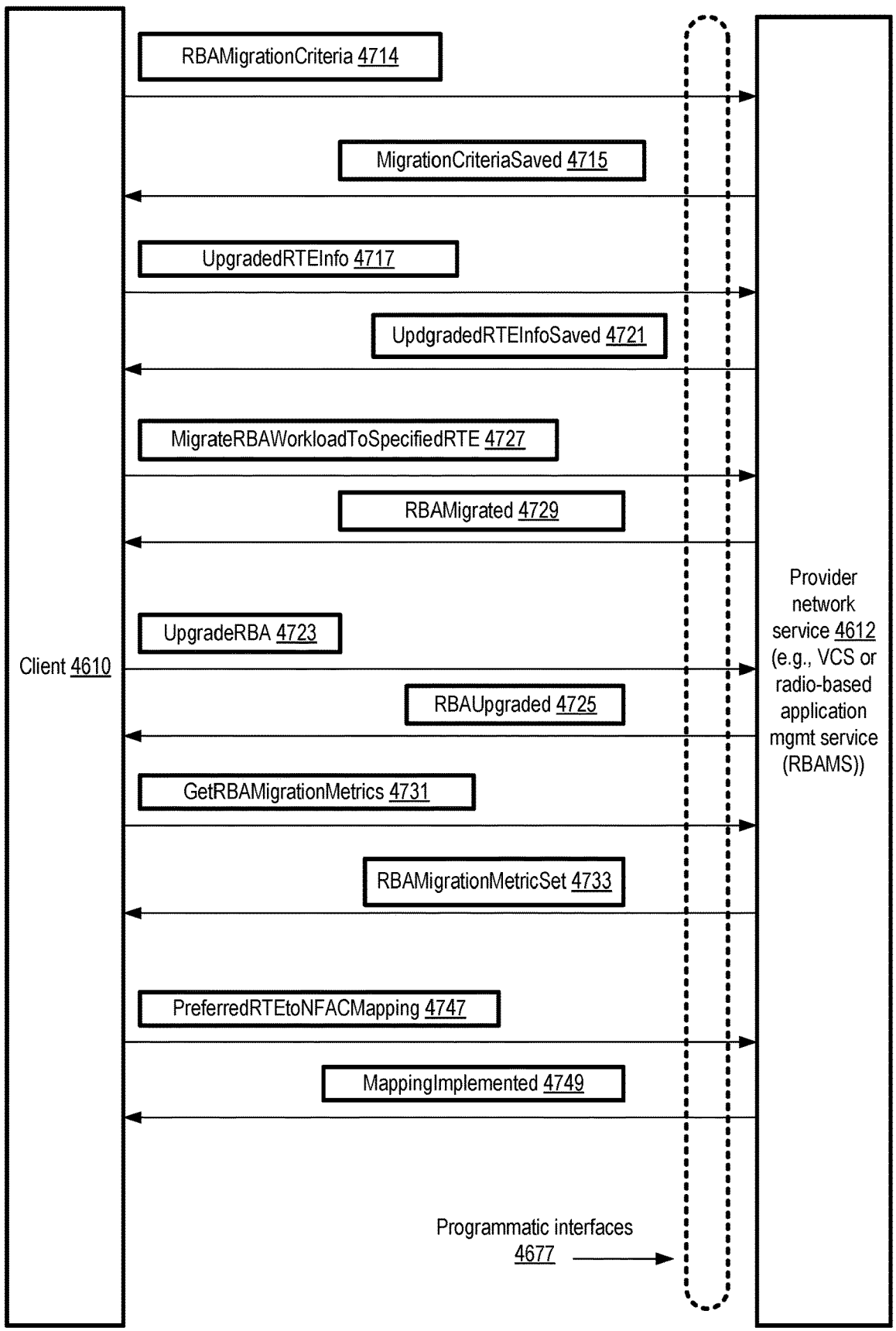

According to the embodiment depicted in FIG. 47, a client 4610 may submit an RBAMigrationCriteria messages 4714 to service 4612, indicating the triggering conditions under which a decision to migrate a portion of a radio-based application (RBA) from its current runtime environment (RTE) to another RTE is to be made. Such conditions may include determining that a threshold level of resource utilization (e.g., NFAC utilization) has been reached, that a threshold number or rate of errors or failures has been detected, that a new/upgraded version of an NFAC has become available, or that a new/upgraded version of software program(s) being used for the RBA have become available. Migrations of RBAs or their workloads from one RTE or server to another may be initiated in response to a determination that one or more of such metrics meets a threshold criterion in various embodiments. The migration triggering information may be stored at a repository of the service, and a MigrationCriteriaSaved message 4715 may be sent to the client in some embodiments. The migration criteria may also be propagated to one or more migration managers which can initiate migration procedures for the client's RBAs in at least some embodiments if/when the criteria/conditions indicated by the client are met.

In some embodiments, a client may obtain a new or upgraded version of software programs used for an RBA (e.g., for DU and/or CU operations), and cause a radio-optimized compute instance or RTE that includes the upgraded version to be launched, or start up the upgraded version of the software at an RTE to be used as a migration destination for the RBA. The client may notify the service 4612 about the RTE with the upgraded version (e.g., by providing the identifier of the RTE) using an UpgradedRTEInfo message 4717 in some embodiments. The information about the upgraded RTE may be stored at a repository of the service, and an UpgradedRTEInfoSaved message 4721 may be sent to the client. The client may then submit a MigrateRBAWorkloadToSpecifiedRTE request 4727 via the programmatic interfaces 4677 to request the transfer of the RBA from a source RTE to a destination RTE. The RBA may be migrated using the techniques discussed above, and an RBAMigrated response 4729 may be sent to the client in some embodiments. In other embodiments, separate messages 4717 and 4727 may not be needed to cause the service to migrate the RBA from one RTE to another; instead, the client may specify a migration destination RTE and source RTE in a single message, and the service may perform the requested migration.

According to at least one embodiment, a client may not launch the migration destination RTE-instead, the client may submit an upgrade request for the RBA via an UpgradeRBA request 4723 (which may for example indicate that a new version of a program used for the RBA is available). In response, the service may decide the approach to be used to upgrade the RBA—e.g., whether a new RTE is to be launched and the state information transfer techniques described above are to be used, and if so, at which RPPS the new RTE should be launched (the same RPPS as the one being used prior to migration, or a different RPPS). In some cases, an entire RTE may be migrated from one RPPS to another (e.g., when an upgraded version of an NFAC becomes available, which is not available at the original RPPS), and not just the RBA workload. Specific programmatic interfaces allowing clients to request the migration of RTEs (and not just workloads run at the RTEs) may be supported in some embodiments. The selected upgrade procedure may be implemented, and an RBAUpgraded message 4725 may be sent to the client in some embodiments.

A client may obtain metrics pertaining to RBA migrations, e.g., by submitting a GetRBAMigrationMetrics request 4731 in various embodiments. Such metrics may include, for example, the time between the decision to migrate and the initiation of RBA operations at the destination RTE, the performance, error or failure metrics (if any) which led to the decision to migrate, the distribution of RBA migrations by cause (e.g., how many RBA workloads were migrated due to upgrade requests versus failures/errors/performance metrics), how many RBA migrations were local (from one TE to another within the same RPPS) versus remote, and so on. One or more RBAMigrationMetricSet messages 4733 containing RMA metrics may be sent to the client in the embodiment shown in FIG. 47.

In some embodiments, only a subset of the RTEs running at an RPPS may be granted permission to access the NFACs of the RPPS, as described in the context of FIG. 25. A client 4610 may submit a PreferredRTEtoNFACMapping message 4747 to provide an indication of the mappings between RTEs and NFACs at an RPPS established for the client in some embodiments, indicating for example how many RTEs should be launched at the RPPS, how many of the RTEs should be granted access to the NFACs available, how many NFACs each RTE should be granted permission to access, how the workload of an RTE should be redistributed/migrated in the event that the RTE's access to NFACs is disrupted as a result of NFAC failures, etc. The mapping preferences may be saved and applied by service 4612, and a MappingImplemented message 4749 may be sent to the client in some embodiments.

Figure 48:
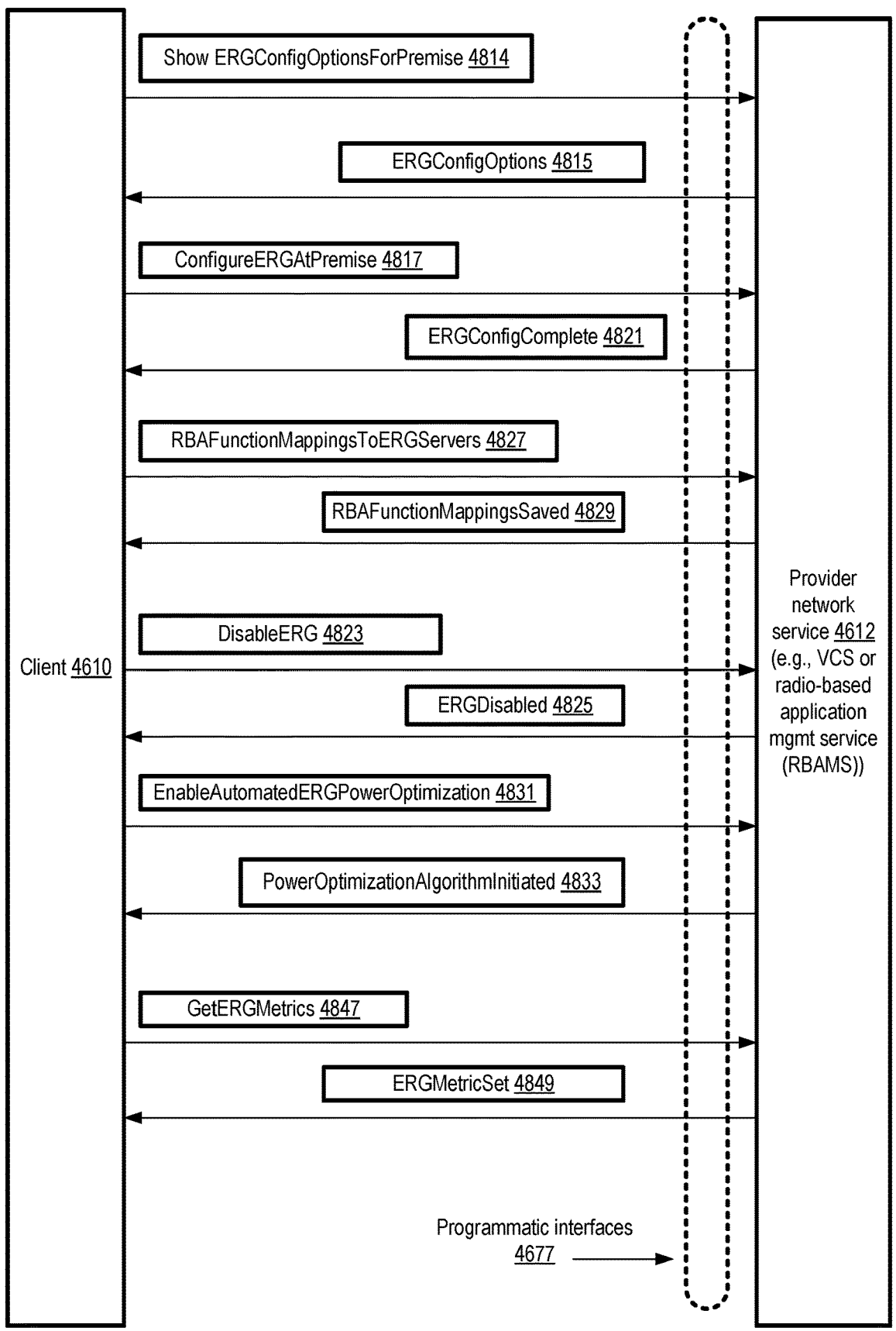

According to the embodiment depicted in FIG. 48, a client 4610 of a provider network may submit a ShowERGConfigOptionsForPremise request 4814 via programmatic interfaces 4677 to obtain information about the different ERG categories supported by the provider network, from which the client may choose one or more categories to be set up at specified premise. Information about the supported ERG configurations appropriate for the premise may be provided to the client via one or more ERGConfigOptions messages 4815; for example, depending on the information provided by the client about the premise, details about the contents of ERGs of one or more ERG categories of the kind shown in FIG. 27 which may be appropriate for the premise may be provided to the client. Note that depending on the location and size of the premise, it may not always be possible to fit all the different ERG categories into the premise in some cases.

A client 4610 may submit a ConfigureERGAtPremise request 4817 to request the establishment of one or more ERGs at a specified premise in some embodiments. Hardware components of the requested ERGs may be transported to the premise, and the ERG may be switched on and connected to the Internet (which in turn may lead to the establishment of secure connectivity to the provider network control plane as discussed earlier). An ERGConfigComplete message 4821 may be sent to the client to indicate that the ERG has been configured and is available to start the deployment of RBAs in some embodiments.

As discussed earlier, operations of several different layers (e.g., DU, CU etc.) of radio-based technology stacks may be implemented at a given ERG comprising several servers in some embodiments. The mappings between the types of operations and the servers of an ERG, indicating which specific servers are to be used at least initially for DU-layer operations, which specific servers (if any) are to be used CU-layer operations and so on, may be indicated by a client via one or more RBAFunctionMappingsToERGServers messages 4827. The specified preferences regarding the mappings may be stored at the provider network service 4612, and an RBAFunctionMappingsSaved message 4829 may be sent to the client in the depicted embodiment. The mappings may then be used to deploy the appropriate software for the different layers at the servers of the ERG and to verify connectivity between the servers at which layers that communicate directly with each other are implemented. For example, connectivity may be verified between the servers used for DU operations and those servers (if any) used for CU operations, in addition to verifying connectivity between NFAC-equipped servers and RUs.

A client may request that a particular ERG be disabled or de-configured in some embodiments, e.g., via a DisableERG request 4823 after the workload that was being executed at that ERG has been migrated to a different ERG or after the client determines that the ERG is no longer needed. The ERG may be disabled, and an ERGDisabled message 4825 may be sent to the client.

In some embodiments, a client 4610 may request that power consumption optimization operations similar to those discussed in the context of FIG. 31 be initiated for a set of ERGs and RBA workloads at a given premise. An EnableAutomatedERGPowerOptimization request 4831 may be submitted by a client to permit the automated migration of ERG runtime environments (RTEs) based on workload levels or other criteria in the depicted embodiment. In response, the service 4612 may initiate the analysis of collected metrics to determine whether or not the migration of RBA workloads to conserve power is a practicable idea or not in some embodiments. A PowerOptimizationAlgorthmInitiated message 4833 may be sent to the client to indicate that the algorithm for identifying migration candidates for power consumption reduction has been activated, and that automated migration of candidate RTEs which are identified will be performed in some embodiments.

A number of metrics may be collected at the ERG level for each ERG configured on behalf of a client in some embodiments. Such metrics may include, for example, measures of the resource utilization levels at all the servers of an ERG (including NFAC-equipped RPPSs as well as general-purpose servers included in the ERG, if any), uptime, failure and error metrics aggregated at the ERG level, power consumption metrics, and the like. A client may submit a GetERGMetrics request 4847 to obtain or view such metrics in different embodiments. The requested metrics may be provided in one or more ERGMetricSet messages 4849 in the embodiment depicted in FIG. 49.

Figure 49:
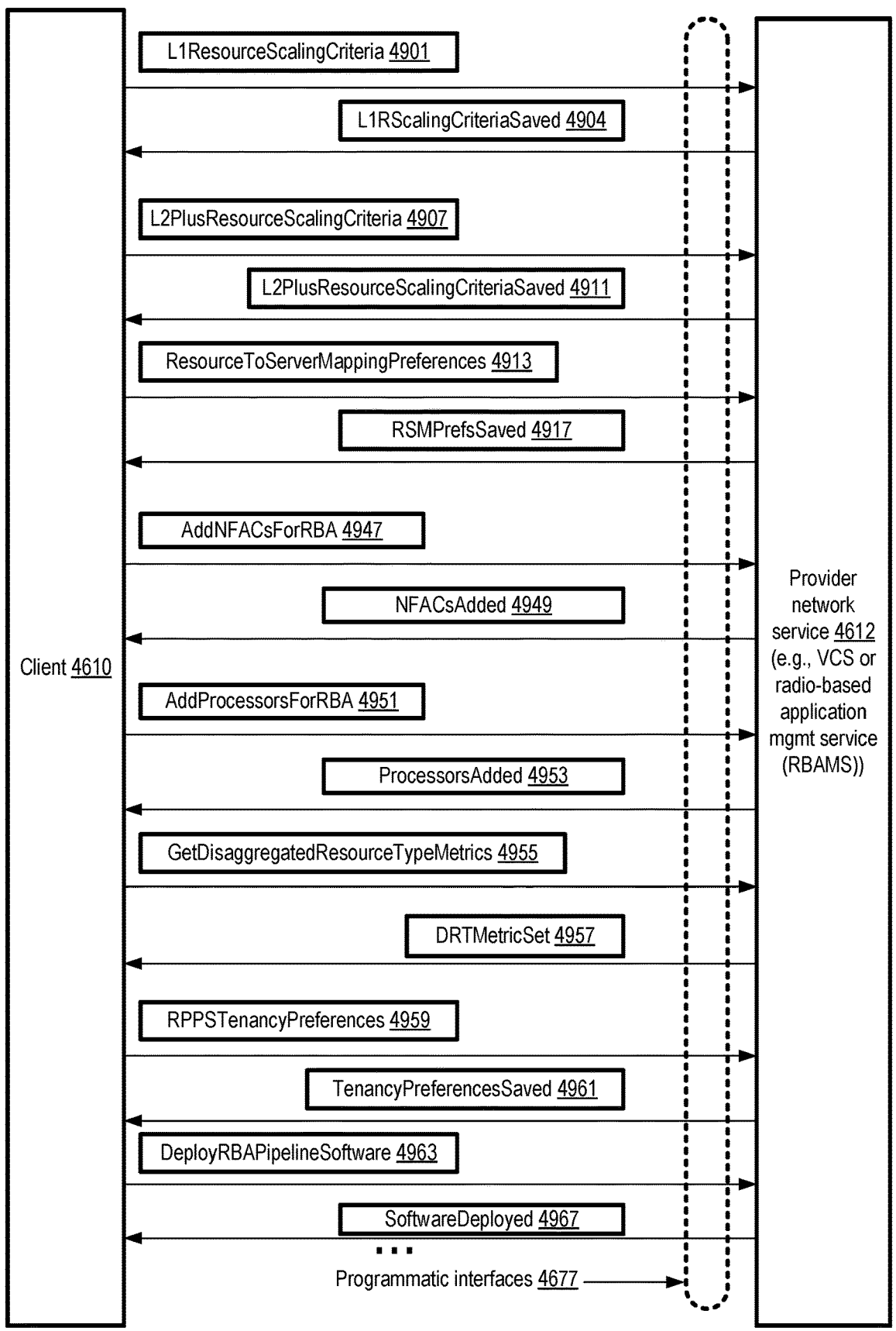

As discussed in the context of FIG. 34, in some embodiments the set of resources allocated for an RBA of a client of a provider network at an ERG may be modeled as disaggregated sets of L1 resources (such as NFACs) and resources used for L2 or higher layers (such as primary processors), and the two types of resources may be scaled up or down independently. As shown in FIG. 49, a client 4610 may submit an L1ResourecScalingCriteria message 4901 to indicate the logic and/or metrics to be used to decide whether to add L1 resources for an RBA. The information about L1 resource scaling may be stored at a repository of the service 4612, and an LIRScalingCriteriaSaved message 4904 may be sent to the client in at least some embodiments to indicate that the criteria have been saved and will be put into effect.

An L2PlusResourceScalingCriteria message 4907 may be submitted by the client to indicate the criteria or conditions to be checked before adding/removing resources intended for L2 and higher layers of the client's RBA in a disaggregated processing environment. The L2Plus criteria may be stored and put into effect, and an L2PLusResourceScalingCriteriaSaved messages 4911 may be sent to the client in some embodiments.

A ResourceToServerMappingPreferences message 4913 may be submitted via programmatic interfaces 4677 to indicate whether the client 4610 prefers to use servers which are already being used for L1 resources when additional L1 resources are to be deployed for scaling, or whether the client prefers to spread L1 resources across servers. In effect, message 4913 may be used by the client to help the service make scaling decisions like the ones illustrated in FIG. 38 or FIG. 39. The mapping preferences indicated by the client may be stored and put into effect by service 4612, and an RSMPrefsSaved message 4917 may be sent to the client in some embodiments.

A client may request additional NFACs for their RBA, e.g., in a disaggregated processing environment, via one or more AddNFACsForRBA requests 4947. The required configuration settings changes for adding the NFACs may be performed, and an NFACsAdded message 4949 may be sent to the client. Similarly, a client may request additional processors for non-L1 functions of their RBA, e.g., in a disaggregated processing environment, by submitting one or more AddProcessorsForRBA messages 4951 in the embodiment shown in FIG. 49. The additional processors requested may be configured, and a ProcessersAdded message 4953 may be sent to the client.

A client may request to view metrics for each of the different resource types separately in a disaggregated processing environment, e.g., by submitting a GetDisaggregatedResourceTypeMetrics request 4955 in various embodiments. Metrics pertaining to the specific resource type (e.g., the total number and types of NFACs configured, the total number and types of processors configured, their respective utilization levels, etc.) may be provided to clients in one or more DRTMetricSet messages 4957 in some embodiments.

In various embodiments, one or more RPPSs may be used in multi-tenant mode as discussed earlier. A client 4610 may submit preferences regarding the tenancy of their RPPSs via one or more RPPSTenancyPreferences messages 4959 in some embodiments. For example, a client may wish to ensure that all the RPPS configured at a client's ERGs, or a specified subset, be used in single-tenant mode, i.e., for RBAs and/or other applications of that client only. The tenancy preferences may be stored and put into effect by the service 4612, and a TenancyPreferencesSaved message 4961 may be sent to the client.

In at least some embodiments, a client may provide software to the provider network, to be employed for specified stages of their radio-based application pipelines. Such custom software may include programs implementing any of the layers of the radio-based application technology stack, such as programs that can be used for core servers, servers at which CUs are run, DU programs, and/or RU programs. The client may submit such software in one or more DeployRBAPipelineSoftware messages 4963 via programmatic interfaces 4677 in some embodiments. The software may be deployed at the RPPSs and/or other devices used for the client's RBAs, and one or more SoftwareDeployed messages 4967 may be sent back to the client. Note that in some embodiments, the software being provided by a client may in effect override or replace corresponding default software that is already included at the devices. For example, instead of using a default set of L2Ps (L2 implementation programs) that is included in an RCI launched on behalf of the client, the client may submit their own custom set of L2Ps. Clients may also submit software or firmware using messages 4963 that can be executed at the NFACs, and can for example be used to replace the default implementations of one or more types of network functions at the NFACs in some embodiments.

As mentioned earlier, in various embodiments, performance metrics, error-related metrics and/or failure-related metrics may be collected from the NFACs deployed at the RPPSs configured for a client in at least some embodiments. In response to a GetRPPSMetrics request, such metrics may be presented to a client in one or more MetricSet responses in at least some embodiments. Such metrics may also be utilized by an offloading manager to select network function accelerators at which to schedule network functions—e.g., if two accelerators are available at a given point of time, the one with better recent performance metrics (such a slower resource utilization levels) may be selected.

According to at least some embodiments, clients may request the termination of one or more of their RCIs at specified RPPSs, e.g., via TerminateRCIs requests sent to the provider network service 4612. The indicated RCIs may be cleanly shut down or terminated (e.g., after ensuring that any in-flight RBA requests that were being handled at the RCIs have been fully processed), and an RCIsTerminated message acknowledging the shutdown may be sent to the client in at least some embodiments.

Other types of programmatic interactions pertaining to implementation of radio-based applications' pipelines using provider network resources may be supported in some embodiments than those shown in FIGS. 46-49.

FIG. 50 is a flow diagram illustrating aspects of operations that may be performed to configure and utilize radio-based application pipeline processing servers for multiple radio-based applications, according to at least some embodiments. As shown in element 5004, a target configuration comprising some number of RPPSs (servers with one or more processors configured to run virtualized network functions) at one or more locations may be determined or identified at a service Svc1 (e.g., a VCS, or a RBAMS) of a provider network, based for example on anticipated workload levels indicated programmatically by one or more Svc1 clients in the depicted embodiment. The RPPSs may each be used to implement portions of radio-based application pipelines efficiently (e.g., using hardware network function accelerators incorporated within peripheral cards) on behalf of the clients.

If needed, the RPPSs (which may for example be installed within one or more standard server racks set up for one or more extension resource groups (ERGs)) may be installed at the identified locations as extensions of the data plane of Svc1, e.g., using techniques such as one-way network pathways to that ensure that commands to the Svc1 control plane cannot be issued from the RPPSs themselves in at least some embodiments (element 5007). In at least some embodiments, new RPPSs may not necessarily have to be shipped to some or all of the locations external to the provider network's data centers, as RPPSs with excess capacity for network function processing may in some cases already be available at the locations. Such RPPSs may have been pre-installed, for example, based on requirements of other clients, or in anticipation of growth in radio-based application workloads to be managed by Svc1. In some cases, the provider network operator may anticipate demand for radio-based applications in popular areas such as downtown streets of major cities, or parks at which festivals and/or other large events occur frequently, and may have set up RPPSs at such locations in preparation for potential client requests. A given RPPS may comprise one or more network function accelerators in some embodiments, which may be incorporated within one or more chipsets at a radio-based application pipeline accelerator card linked to the primary CPUs of the RPPS via a peripheral interconnect such as PCIe or USB.

Connectivity may be established and verified if needed between individual RPPSs and control plane servers of Svc1 in various embodiments, located for example in data centers of the provider network (element 5010). An offloading manager (OM) may be launched at an RPPS, for example as part of a virtualization management component such as a hypervisor in some embodiments. The OM may be launched prior to the launch of compute instances at the RPPSs in some implementations, e.g., as part of a boot or initialization phase of the RPPS. In other implementation, an OM may be launched at an RPPS after a decision to launch a radio-optimized compute instance at that RPPS has been made at the control plane. In at least some embodiments, the OM may be launched in response to one or more commands directed to the control plane by clients, such as commands to activate the RPPSs.

According to some embodiments, connectivity may be established and/or verified between an RPPS and radio units (RUs) of various clients whose application pipelines are to be executed at the RPPS. For example, in a scenario in which a given RPPS is going to be utilized in a multi-tenant manner for two radio-based applications RBA1 and RBA2, each of which has a respective set of cells at which RUs are to be executed, connectivity may be verified between the RPPS and RBA1's RUs (element 5013), and connectivity may also be verified between the RPPS and RBA2's RUs (element 5016). In some cases, RBA1 and RBA2 may be executed on behalf of different clients C1 and C2 of the provider network; in other cases, RBA1 and RBA2 may both be run on behalf of the same client. In some implementations, physical connectors such as Ethernet cables may be used to link the RPPS and a device at which an RU is implemented. Note that operations corresponding to element 5013 may not necessarily be performed at the same time, or in parallel with, the operations corresponding to element 5016.

Based at least in part on a command or request received via programmatic interfaces at the Svc1 control plane, e.g., via a network path which does not include the RPPS itself, a compute instance CI1 may be launched at the RPPS in the depicted embodiment (element 5019). CI1 may for example include an isolated request handler IRH1 for RBA1. In one implementation, for example, the request handler IRH1 may implement a programmatic interface at the L1-L2 interface of a radio-based technology stack.

Based at least in part on another command or request received via programmatic interfaces at the Svc1 control plane, e.g., via a network path which does not include the RPPS itself, a compute instance CI2 may be launched at the RPPS in the depicted embodiment (element 5022). The request for CI2 may be received asynchronously with respect to the request for CI1 in at least some embodiments. CI2 may also include an isolated request handler, IRH2, configured for RBA2 in the depicted embodiment. In one implementation, for example, the request handler IRH2 may also implement a programmatic interface at the L1-L2 interface of a radio-based technology stack.

When IRH1 receives a request from a different layer of the radio-based technology stack (e.g., L2 in the downlink case) than the layers implemented at the NFAs, an indication of the request may be passed on to the offloading manager in various embodiments. The offloading manager may cause or schedule a corresponding set of network functions to be executed at one or more NFAs on the RPPS in the depicted embodiment. Results of the network functions executed at the NFAs for RBA1 may be sent on to the appropriate destinations (such as RBA1's RUs) (element 5025), e.g., using NIC chipsets of the kind described earlier.

Similarly, when IRH2 receives a request from a different layer of the radio-based technology stack (e.g., L2 in the downlink case) than the layers implemented at the NFAs, and passes on the request to the offloading manager, a corresponding set of network functions may be executed at one or more NFAs on the RPPS in the depicted embodiment. In some cases, the network functions to be executed at the accelerators may be indicated in the requests sent to the IRHs; in other cases, the IRHs (or the offloading manager) may have to perform some computations on the requests to identify the specific network functions to be executed at the accelerators. Results of the network functions executed at the NFAs for RBA2 may also be sent on to the appropriate destinations (such as RBA2's RUs) (element 5028), e.g., using NIC chipsets of the kind described earlier. It is noted that in various embodiments, some of the operations shown in the flow charts of FIG. 18, FIG. 26, FIG. 33, FIG. 40 and/or FIG. 50 may be implemented in a different order than that shown in the figure, or may be performed in parallel rather than sequentially. Additionally, some of the operations shown in FIG. 18, FIG. 26, FIG. 33, FIG. 40 and/or FIG. 50 may not be required in one or more implementations.

Various techniques pertaining to the configuration and use of RPPSs and other types of servers at ERGs for radio-based applications described above may be combined in some embodiments. For example, any combination of the network traffic management techniques, seamless migration techniques, capacity management techniques involving the use of multiple ERGs, and/or disaggregated processing techniques may be employed when RPPSs are used to run radio-based application pipelines in either single-tenant or multi-tenant mode. In one embodiment in which a given RPPS with multiple NHDs is being used for two different RBAs, for example, a decision to use a different NHD for mid-haul traffic of one of the RBAs may be made by a networking manager, without changing the NHD used for the other RBA. Similarly, workload of one of the RBAs may be migrated from one RTE to another in response to a determination than a software upgrade is to be performed for that RBA, without migrating the workload of the second RBA. An entire RTE running the first RBA may be migrated from one ERG to another without migrating the second RBA. Different (potentially overlapping) sets of disaggregated primary processors and NFACs may be assigned to the pair of RBAs, with requests for network functions being transferred from one server to another for remote execution, independently of the transfer other RBA's network functions.

Figure 51:
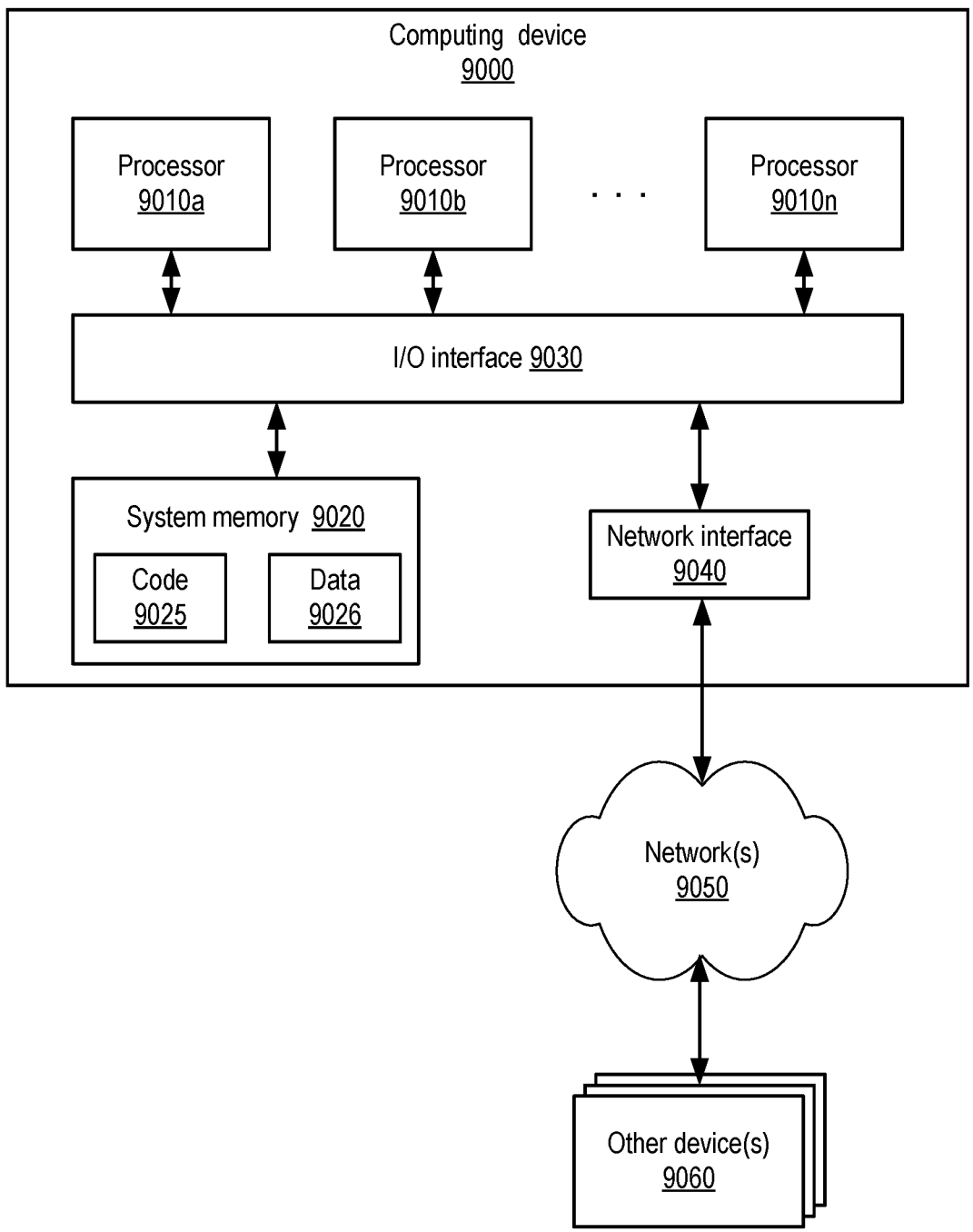
FIG. 51 is a block diagram illustrating an example computing device that may be used in at least some embodiments.

In at least some embodiments, a server that implements the types of techniques described herein (e.g., various functions of a provider network service such as a VCS, including functions within the provider network service as well as at extension sites), may include a general-purpose computer system that includes or is configured to access one or more computer-accessible media. FIG. 51 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 50, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 50. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 51 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
    causing at least a portion of a radio-based application to be executed at a first runtime environment launched at a radio-based application pipeline processing server of a cloud provider network, wherein the radio-based application comprises a plurality of layers including a centralized unit (CU) layer, a distributed unit (DU) layer and a radio unit (RU) layer, wherein the portion executed in the first runtime environment comprises a first version of a workload of the radio-based application that implements functionality to (a) process inter-layer messages between a first layer of the plurality of layers and a second layer of the plurality of layers and (b) maintain state information about the inter-layer messages, wherein the radio-based application pipeline processing server comprises a network function accelerator card at which one or more network functions of the radio-based application are executed, and wherein the radio-based application pipeline processing server is located at a premise external to a data center of the cloud provider network; and in response to determining that the workload of the radio-based application is to be executed at a second runtime environment, transferring at least a subset of the state information of the workload of the radio-based application from the first runtime environment to the second runtime environment, without pausing the workload of the radio-based application; and causing the workload of the radio-based application to be executed at the second runtime environment after the subset of the state information has been transferred.

2. The computer-implemented method as recited in claim 1, wherein the first runtime environment comprises one of: (a) a compute instance of a virtualized computing service of the cloud provider network, wherein one or more software programs of the compute instance access the network function accelerator card via a virtualization intermediary, (b) a bare-metal compute instance of a virtualized computing service, wherein one or more software programs of the bare-metal compute instance access the network function accelerator card without using a virtualization intermediary or (c) a software container.

3. The computer-implemented method as recited in claim 1, wherein the second runtime environment is used to execute an upgraded version of the workload.

4. The computer-implemented method as recited in claim 1, further comprising:

receiving, prior to transferring the subset of the state information, an indication from a client of the cloud provider network via a programmatic interface that the second runtime environment has been launched.

5. The computer-implemented method as recited in claim 1, further comprising:

receiving, via a programmatic interface, an upgrade request pertaining to the radio-based application; and launching the second runtime environment in response to receiving the upgrade request.

6. A system, comprising:

one or more computing devices;

wherein the one or more computing devices include instructions that upon execution on or across the one or more computing devices:

cause at least a portion of a radio-based application to be executed at a first runtime environment launched at a first radio-based application pipeline processing server of a provider network, wherein the radio-based application comprises a plurality of layers including a centralized unit (CU) layer, a distributed unit (DU) layer and a radio unit (RU) layer, wherein the portion executed in the first runtime environment comprises a first version of a workload of the radio-based application that implements functionality to (a) process inter-layer messages between a first layer of the radio-based application and a second layer of the radio-based application and (b) maintain state information about the inter-layer messages, and wherein the first radio-based application pipeline processing server is located at a premise external to a data center of the provider network; and in response to determining that the workload of the radio-based application is to be executed at a second runtime environment, cause a transfer of at least a subset of the state information of the workload of the radio-based application from the first runtime environment to the second runtime environment, without pausing the workload of the radio-based application; and cause the workload of the radio-based application to be executed at the second runtime environment after the subset of the state information has been transferred.

7. The system as recited in claim 6, wherein the second runtime environment is launched at a second radio-based application pipeline processing server at the premise external to the data center of the provider network.

8. The system as recited in claim 6, wherein the second runtime environment is used to execute an upgraded version of the workload.

9. The system as recited in claim 6, wherein the one or more computing devices include further instructions that upon execution on or across the one or more computing devices further cause the one or more computing devices to:

obtain, prior to transfer of the subset of the state information, an indication from a client of the provider network via a programmatic interface that the second runtime environment has been launched.

10. The system as recited in claim 6, wherein the one or more computing devices include further instructions that upon execution on or across the one or more computing devices further cause the one or more computing devices to:

obtain, via a programmatic interface, an upgrade request pertaining to the radio-based application; and launch the second runtime environment in response to receiving the upgrade request.

11. The system as recited in claim 6, wherein the subset of the state information pertains to front-haul messages between the RU layer and a DU layer and mid-haul messages between the DU layer and the CU layer of the radio-based application.

12. The system as recited in claim 6, wherein the one or more computing devices include further instructions that upon execution on or across the one or more computing devices further cause the one or more computing devices to:

analyze one or more metrics obtained from the radio-based application pipeline processing server, wherein determining that the workload of the radio-based application is to be executed at the second runtime environment is based at least in part on analysis of the one or more metrics.

13. The system as recited in claim 6, wherein the one or more computing devices include further instructions that upon execution on or across the one or more computing devices further cause the one or more computing devices to:

detect one or more errors or failures at the first radio-based application pipeline processing server, wherein determining that the workload of the radio-based application is to be executed at the second runtime environment is based at least in part on said detecting.

14. The system as recited in claim 6, wherein the one or more computing devices include further instructions that upon execution on or across the one or more computing devices further cause the one or more computing devices to:

initiate, prior to causing the workload of the radio-based application to be executed at the second runtime environment, a traffic transition algorithm to enable at least a portion of network traffic which was directed to the first runtime environment to be received at the second runtime environment, wherein the traffic transition algorithm utilizes one or more of: (a) a version of Generic Attribute Registration Protocol (GARP), (b) a version of Multiple Registration Protocol (MRP), (c) a traffic mirroring algorithm, or (d) virtual Media Access Control (MAC) addresses.

15. The system as recited in claim 6, wherein the second runtime environment is launched at the first radio-based application pipeline processing server.

16. One or more non-transitory computer-accessible storage media storing program instructions that when executed on or across one or more processors:
cause a first portion of a radio-based application to be executed at a first runtime environment launched at a radio-based application pipeline processing server of a provider network, wherein the radio-based application comprises a plurality of layers including a centralized unit (CU) layer, a distributed unit (DU) layer and a radio unit (RU) layer, wherein the first portion executed in the first runtime environment comprises a first version of a workload of the radio-based application that implements functionality to (a) process inter-layer messages between a first layer of the radio-based application and a second layer of the radio-based application and (b) maintain state information about the inter-layer messages, and wherein the radio-based application pipeline processing server is located at a premise external to a data center of the provider network; and
in response to determining that the workload of the radio-based application is to be executed at a second runtime environment,
cause a transfer of at least a subset of the state information of the workload of the radio-based application from the first runtime environment to the second runtime environment, without pausing the workload of the radio-based application; and
cause the workload of the radio-based application to be executed at the second runtime environment after the subset of the state information has been transferred.

17. The one or more non-transitory computer-accessible storage media as recited in claim 16, wherein the radio-based application pipeline processing server comprises a network function accelerator card, and wherein one or more non-transitory computer-accessible storage media store further program instructions that when executed on or across the one or more processors:
cause one or more network functions of the radio-based application to be executed at the network function accelerator card, wherein the one or more network functions executed at the network function accelerator card include one or more of: a coding function, a rate matching function, a scrambling function, a modulation layer mapping function, a precoding function, a resource mapping function, a digital beamforming function, a Fast Fourier Transform (FFT) function, a cyclic prefix insertion function, a cyclic prefix removal function, an inverse FFT function, a de-mapping function, a channel estimation function, a pre-filtering function, an equalization function, a demodulation function, a descrambling function, a rate de-matching function, or a decoding function.

18. The one or more non-transitory computer-accessible storage media as recited in claim 16, wherein the second runtime environment is used to execute a second version of the workload.

19. The one or more non-transitory computer-accessible storage media as recited in claim 16, storing further program instructions that when executed on or across the one or more processors further cause the one or more processors to:
transmit, prior to causing the workload of the radio-based application to be executed at the second runtime environment, a message to a computing device at which a second portion of the radio-based application runs, wherein the message indicates that the workload of the radio-based application is going to be migrated to the second runtime environment.

20. The one or more non-transitory computer-accessible storage media as recited in claim 16, storing further program instructions that when executed on or across the one or more processors further cause the one or more processors to:
launch, at the radio-based application pipeline processing server, a plurality of runtime environments including the first runtime environment and a third runtime environment, wherein the first runtime environment is granted access to a network function accelerator card of the first radio-based application pipeline processing server, and wherein the third runtime environment (a) is used for executing one or more programs which implement a second portion of the radio-based application and (b) is not granted access to the network function accelerator card.

* * * * *